USO05630022A

United States Patent [19]
Ono

[11] Patent Number: 5,630,022
[45] Date of Patent: May 13, 1997

[54] SELF-ORGANIZING PATTERN LEARNING OPTICAL SYSTEM

[75] Inventor: Shuji Ono, Kanagawa-ken, Japan

[73] Assignee: Fuji Photo Film Co., Ltd., Kanagawa, Japan

[21] Appl. No.: 208,988

[22] Filed: Mar. 9, 1994

[30] Foreign Application Priority Data

Mar. 10, 1993 [JP] Japan .................................. 5-048432

[51] Int. Cl.$^6$ ............................ G02F 15/76; G02F 1/135
[52] U.S. Cl. ................................. 395/25; 395/20; 395/23
[58] Field of Search .................................. 395/25, 20, 23

[56] References Cited

U.S. PATENT DOCUMENTS 5,428,711   6/1995   Akiyama et al. ......................... 395/25

OTHER PUBLICATIONS

Lu et al, "Self-organizing optical neural network for unsupervised Learning", Optical Engineering, vol. 29, No. 9, Sep.1990.
Ishikawa et al, "Experimental Studies on adaptive optical associative memory" Optical Computing 88, Toulon, France, Sep. 1988.
Kondo et al., "Hacho Henkan eno Oyo," (Application to Wavelength Conversion), Optronics (1990), pp. 132–139.
Chun et al., "Second–harmonic generation at 421 nm using injection–locked GaAIAs laser array and $KNbO_3$," Appl. Phys. Lett. 53 (13), Sep. 26, 1988, pp. 1170–1171.
T. Kohonen, "Self–Organization and Associative Memory," Springer–Verlag, 1984, pp. 125–161.
Tohma et al, "Identification of JIS First and Second Level Printed Characters by Comb NET," Dept. of Electrical and Computer Eng., Nagoya Institute of Technology.
T. Lu, et al, "Self–organizing optical neural network for unsupervised learning," Optical Engineering, Sep. 1990, vol. 29, No. 9, pp. 1107–1113.
Minemoto et al., "Investigation of Asymmetric Writing Characteristics of PROM Device," Dept. of Engineering, Kobe University, pp. 213–219.

*Primary Examiner*—George B. Davis
*Attorney, Agent, or Firm*—Sughrue, Mion, Zinn, Macpeak & Seas

[57] ABSTRACT

A pattern learning system uses a self-organizing optical neural network of the Kohonen variety for unsupervised learning. The learning system comprises an optical pattern correlation degree detector, which comprises a pattern storing device for storing a plurality of patterns, an input pattern displaying device for displaying a presented input pattern, and a photo detecting device. Two or more of the input pattern displaying devices, the pattern storing device, and the photo detecting device are located at positions adjacent to each other. The photo detecting device optically detects a degree of pattern correlation between the input pattern displayed on the input pattern displaying device and each of the memory patterns stored in the pattern storing device. A learning pattern creating device creates a group of learning patterns in accordance with the degrees of pattern correlation, which have been detected by the optical pattern correlation degree detecting device, and the input pattern. A memory pattern updating device updates the memory patterns, which are stored in the pattern storing device, in accordance with the learning patterns, which have been created by the learning pattern creating devices.

51 Claims, 21 Drawing Sheets

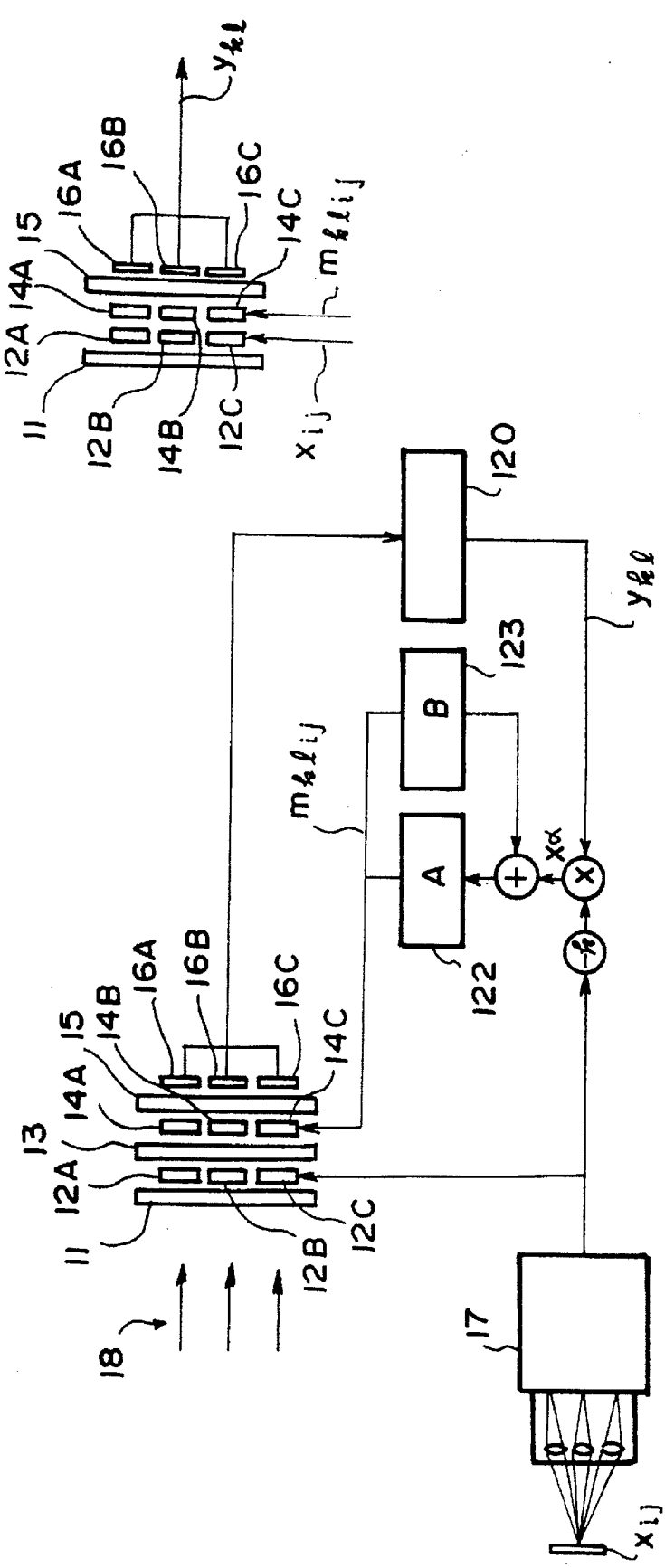

F I G. 18
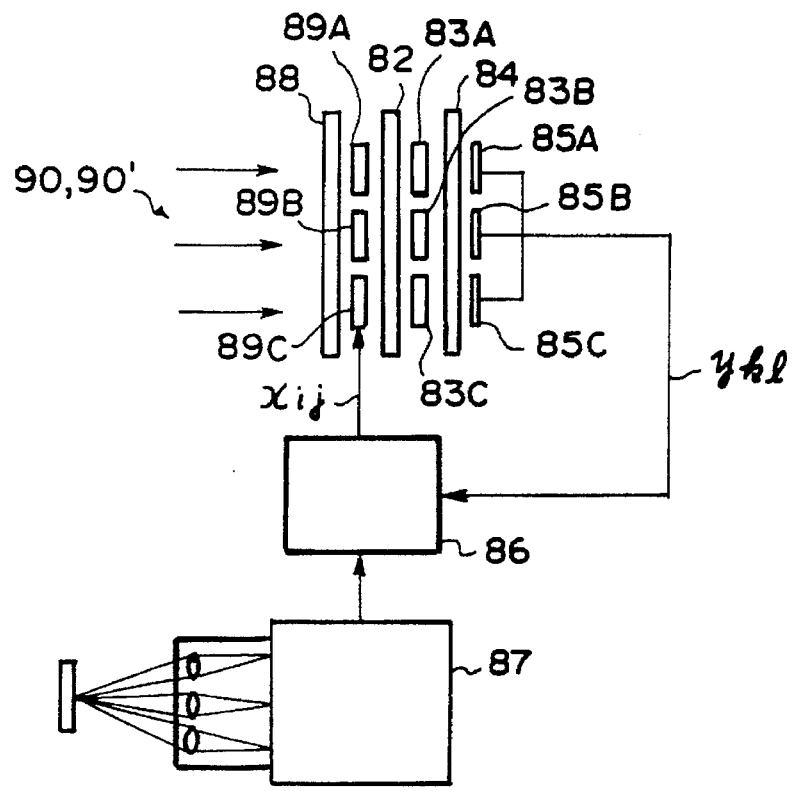
F I G. 19
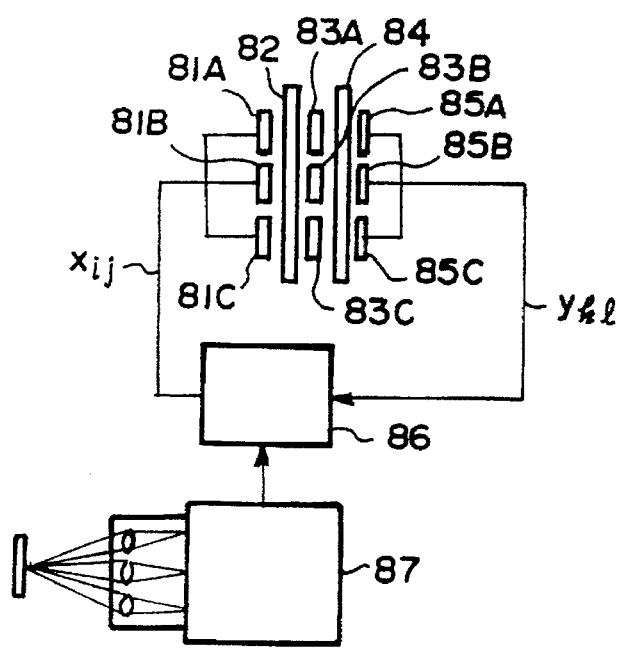

F I G. 34
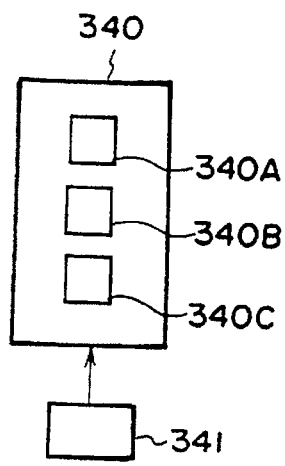
F I G. 35
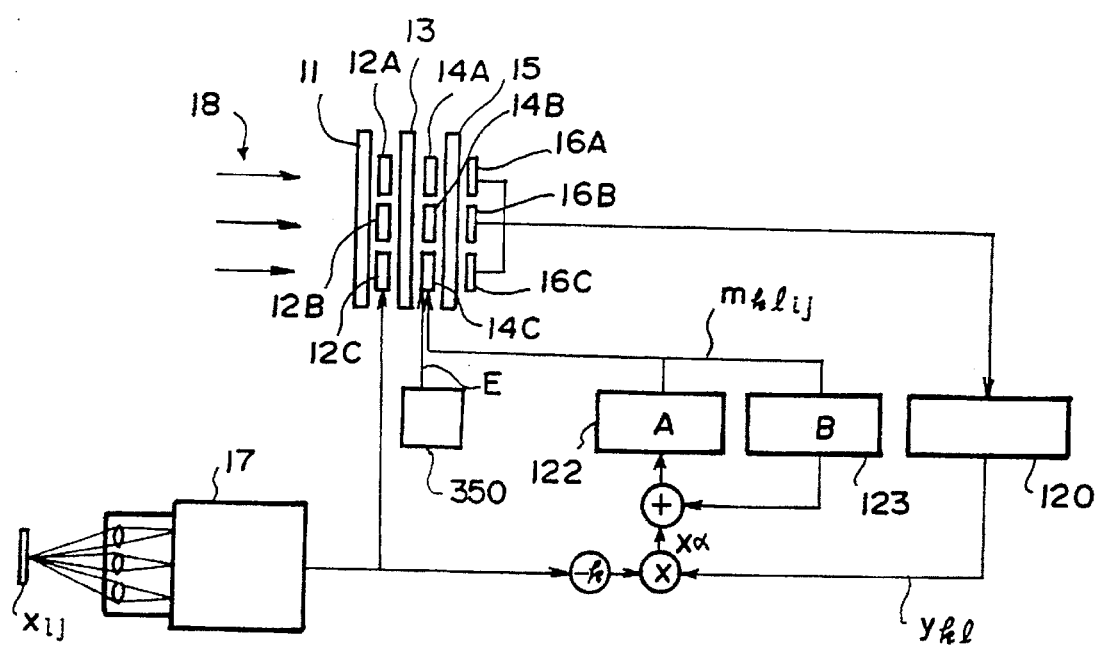

SELF-ORGANIZING PATTERN LEARNING OPTICAL SYSTEM

BACKGROUND OF THE INVENTION

1. Field of the Invention

This invention relates to a self-organizing pattern learning system. This invention particularly relates to a self-organizing pattern learning system for carrying out self-organizing learning operations on a plurality of optical patterns which are presented to the self-organizing pattern learning system.

2. Description of the Prior Art

Matching techniques have heretofore been used widely in the field of pattern recognition in image processing. One of the typical matching techniques is to accumulate image pattern models, which have been selected manually, as knowledge and to carry out discrimination of a target object by a matching operation. However, the matching technique has various drawbacks in that, for example, models of discrimination target objects are fixed, and therefore the technique cannot cope with a wide variety of changes in the target objects (such as changes in sizes, directions, and shapes of the target objects). Also, because ordering of image patterns is not effected, if the number of models of image patterns becomes large, it is difficult to ascertain whether or not a pattern necessary for discrimination of a target object is missing.

Recently, in order to solve the problems described above, a technique utilizing a neural network, which simulates the principle of information processing carried out by the brain of a human being, has been proposed. The technique utilizing a neural network, aims at carrying out the learning of models of image patterns by use of a learning model of the neural network and utilizing the results of the learning operation during the discrimination of a target object. Specifically, with the technique utilizing a neural network, an attempt is made to impart the flexible characteristics of the neural network to templates at the learning stage such that the templates can cope with a wide variety of changes in target objects.

By way of example, the learning models include Kohonen's self-organized mapping, which is described in, for example, "Self-Organization and Associative Memory" by T. Kohonen, Springer-Verlag, 1984. The Kohonen's self-organized mapping model learns topological mapping through self-organization. The topological mapping means that, for example, various signals which a human being has received from the outer world, i.e., various signals representing a certain group of patterns, are allocated to neurons on the cortex in accordance with a certain kind of rule reflecting the order of the patterns.

With the system in which the pattern learning technique utilizing Kohonen's self-organization is employed, instead of various pieces of information representing the patterns presented from the outer world being learned at random, such various pieces of information are classified in the system and learned (stored) in an arranged form in the neural network. In this manner, as many efficient pieces of information as possible can be stored in the system having a limited capacity. Therefore, recently, the system in which the pattern learning technique utilizing Kohonen's self-organization is employed has attracted particular attention.

Utilization of Kohonen's self-organization in rough classification pre-processing during character recognition has been reported in, for example, "Identification of JIS First and Second Level Printed Characters by Comb NET" by Toma, Iwata, et al., Nagoya Kogyo University, Autumn Collected Drafts of The Institute of Electronics and Communication Engineers of Japan, 1990.

Also, a technique for carrying out learning operations with Kohonen's self-organization as parallel processing by using optical devices, video devices, and a computer has been reported in, for example, "Self-Organizing Optical Neural Network for Unsupervised Learning" by Taiwei Lu, etc., Optical Engineering, Vol. 29, No. 9, pp. 1,107–1,113, 1990.

FIG. 37 shows an experimental system for self-organization carried out by Taiwei, et al.

As illustrated in FIG. 37, the experimental system is provided with an optical system. The optical system comprises a diffuser 114, a storing/displaying light valve layer 104, a multiple image forming lenses 105, an input light valve layer 109, an image forming lens 110, and correlation output detector arrays 111. The storing/displaying light valve layer 104 comprises polarizers 101 and 103. The storing/displaying light valve layer 104 also comprises k×1 number (in this example, 3×1 number) of storing/displaying light valves 102A, 102B, and 102C, which have i×j number of picture elements and are arrayed between the polarizers 101 and 103. The storing/displaying light valves 102A, 102B, and 102C display memory patterns mklij(t−1). The input light valve layer 109 comprises polarizers 106 and 107 and a light valve 108, which is located between the polarizers 106 and 107 and displays an input pattern xij(t) presented at the time t. The experimental system is also provided with a processing system having a computer 113. The computer 113 makes calculations for the memory patterns mklij(t), which is to be stored in the storing/displaying light valve layer 104 at the time t, from the information representing the values ykl(t), which are obtained from the correlation output detector arrays 111, and the input pattern xij(t).

First, the input pattern xij(t), which has been recorded by a camera 112, is presented through the computer 113 to the input light valve layer 109 and displayed thereon. Thereafter, reading light 115 passes through the diffuser 114 and is then irradiated to the storing/displaying light valve layer 104. The storing/displaying light valves 102A, 102B, and 102C of the storing/displaying light valve layer 104 store patterns, which have been presented before the time t, as memory patterns mklij(t−1) in accordance with a certain rule. Therefore, when the reading light 115 is irradiated to the storing/displaying light valve layer 104, each of the memory patterns mklij(t−1) stored in the storing/displaying light valves 102A, 102B, and 102C is read as an optical intensity pattern 116. An image of the optical intensity pattern 116, which has been radiated out of each of the storing/displaying light valves 102A, 102B, and 102C, is formed on the input light valve layer 109 by each of the multiple image forming lenses 105 and passes as light 117 through the input light valve layer 109. The light 117 passes through the image forming lens 110 and is detected by each of the correlation output detector arrays 111 as the degree of correlation between the input pattern and each of the memory patterns stored in the storing/displaying light valves 102A, 102B, and 102C.

In this case, the input pattern xij(t) is displayed on the input light valve layer 109. Therefore, the light 117 immediately after passing through the input light valve layer 109 carries each of the optical superposition patterns, which result from the superposition of the input pattern xij(t) upon the respective memory patterns mklij(t−1) displayed on the storing/displaying light valve layer 104. Specifically, the light 117 immediately after passing through the input light valve layer 109 carries each of k×1 number of optical patterns, which correspond to the results of product calculations represented by the formula $$m_{klij}(t-1) \times x_{ij}(t) \qquad (1)$$

Also, the light 117 is condensed to each of the correlation output detector arrays 111. Therefore, by each of the correlation output detector arrays 111, the sum of the amounts of light carrying each optical pattern, which corresponds to the result of the calculation made with Formula (1), is detected as the information about brightness and darkness. Specifically, the result of the calculations made with the formula $$y_{kl}(t) = \sum_{ij} (m_{klij}(t-1) \times x_{ij}(t)) \qquad (2)$$

is detected by each of the correlation output detector arrays 111. The result represents the degree of correlation ykl(t) between the input pattern xij(t) and each of the memory patterns mklij(t−1). Signals representing the degrees of correlation ykl(t), which have thus been detected, are fed into the computer 113.

The computer 113 weights patterns in accordance with the degrees of correlation ykl(t) and carries out the operations for updating the memory patterns stored in the storing/displaying light valve layer 104, i.e. the learning operations. For example, the character A is stored as the memory pattern in the storing/displaying light valve 102A of the storing/displaying light valve layer 104. Also, the characters B and C are respectively stored as the memory patterns in the storing/displaying light valves 102B and 102C. In such cases, if the input pattern xij(t) is A, the degree of correlation ykl(t) detected for the storing/displaying light valve 102A by the corresponding detector array of the correlation output detector arrays 111 will take a large value. Also, the degrees of correlation ykl(t) detected for the storing/displaying light valves 102B and 102C will take small values. Therefore, the pattern A is written with a new large weight in the storing/displaying light valve 102A. Also, the pattern A is not written or is written only with small weights in the storing/displaying light valves 102B and 102C. If the pattern presented to the input light valve layer 109 is B, the pattern B will be written with a large weight in the storing/displaying light valve 102B. Also, if the pattern presented to the input light valve layer 109 is C, the pattern C will be written with a large weight in the storing/displaying light valve 102C. In this manner, the operations for updating the memory patterns, i.e. the learning operations, are carried out.

The operations described above are iterated, and various patterns sequentially presented to the input light valve 109 are stored and learned in the storing/displaying light valve layer 104.

As described above, in the experimental system of Taiwei, et al., the self-organization of the patterns presented to the input light valve is effected in the storing/displaying light valve layer 104.

However, with the experimental system of Taiwei, et al., the optical operations between the storing/displaying light valves and the input light valve are carried out by using the multiple image forming lenses 105. Therefore, a certain length of the distance is required between the storing/displaying light valves and the input light valve. Accordingly, the scale of the apparatus for carrying out the self-organization cannot be kept small.

Also, with the experimental system of Taiwei, et al., the value of correlation between the output of each neuron (in the storing/displaying light valve layer) and the input pattern is detected optically in accordance with the Kohonen's self-organization. The operations for updating the memory patterns in accordance with the values of correlation are carried out by using the computer. Therefore, even if the calculations of the values of correlation are carried out in parallel and quickly by using the optical system, the entire processing for the self-organizing learning operations cannot be carried out quickly.

Further, with the experimental system of Taiwei, et al., 8×8 number of correlation degree detectors are used. Therefore, the number of the degrees of correlation detected in the experimental system of Taiwei, et al. is 64. Therefore, signals representing the detected degrees of correlation are fed from the correlation output detector arrays through 64 wires into the computer.

If the number of the correlation degree detectors is as small as 8×8, the number of the wires, through which the signals representing the degrees of correlation are fed into the computer, can be kept comparatively small. However, in cases where a larger number (e.g., 64×64 number) of correlation degree detectors are used and more complicated operation processing is to be carried out, a very large number (e.g. 64×64=4,096 number) of wires must be used. As a result, problems occur in that the size of the system for carrying out the self-organizing learning operations cannot be kept small, and in that the cost of the system cannot be kept low.

SUMMARY OF THE INVENTION

The primary object of the present invention is to provide a self-organizing pattern learning system, wherein transmission of all pieces of information in the system for carrying out self-organizing learning operations is carried out in parallel, calculations on all pieces of information in the system for carrying out the self-organizing learning operations are carried out in parallel, and the entire processing for the self-organizing learning operations is thereby carried out quickly.

Another object of the present invention is to provide a self-organizing pattern learning system, wherein the size of the apparatus for carrying out the self-organizing learning operations is kept small, and the cost of the apparatus is kept low.

The present invention provides a first self-organizing pattern learning system for learning a plurality of different patterns, comprising:

i) an optical pattern correlation degree detecting means, which comprises a pattern storing means for storing a plurality of patterns, an input pattern displaying means for displaying a presented input pattern, and a photo detecting means, in which all or two of the input pattern displaying means, the pattern storing means, and the photo detecting means are located at positions adjacent to each other, and in which the photo detecting means optically detects a degree of pattern correlation between the input pattern displayed on the input pattern displaying means and each of memory patterns stored in the pattern storing means, ii) a learning pattern creating means for creating a group of learning patterns in accordance with the degrees of pattern correlation, which have been detected by the optical pattern correlation degree detecting means, and the input pattern, and iii) a memory pattern updating means for updating the memory patterns, which are stored in the pattern storing means, in accordance with the learning patterns, which have been created by the learning pattern creating means.

The present invention also provides a second self-organizing pattern learning system, wherein the first self-organizing pattern learning system in accordance with the present invention is modified such that the input pattern displaying means, the pattern storing means, and the photo detecting means may be located in this order in the optical pattern correlation degree detecting means.

The present invention further provides a third self-organizing pattern learning system, wherein the first self-organizing pattern learning system in accordance with the present invention is modified such that the pattern storing means, the input pattern displaying means, and the photo detecting means may be located in this order in the optical pattern correlation degree detecting means.

The present invention still further provides a fourth self-organizing pattern learning system, wherein the first self-organizing pattern learning system in accordance with the present invention is modified such that the learning pattern creating means may comprise:

a) a learning pattern operation means for creating a group of learning patterns, which have been weighted by electric operations, in accordance with the degrees of pattern correlation, which have been detected by the optical pattern correlation degree detecting means, and b) a learning pattern displaying means for displaying the learning patterns, which have been created by the learning pattern operation means.

The present invention also provides a fifth self-organizing pattern learning system, wherein the first self-organizing pattern learning system in accordance with the present invention is modified such that the learning pattern creating means may comprise:

a) a correlation degree light output means for radiating out a group of correlation degree light in accordance with the degrees of pattern correlation, which have been detected by the optical pattern correlation degree detecting means, and b) an input pattern displaying means for modulating each correlation degree light of the correlation degree light group, which has been radiated out of the correlation degree light output means, into pattern light in accordance with the input pattern.

The present invention further provides a sixth self-organizing pattern learning system, wherein the first self-organizing pattern learning system in accordance with the present invention is modified such that the learning pattern creating means may comprise:

a) an input pattern output means for radiating out pattern light in accordance with the input pattern, and b) a correlation degree light modulating means for modulating the input pattern light, which has been radiated out of the input pattern output means, in accordance with each of the degrees of pattern correlation, which have been detected by the optical pattern correlation degree detecting means.

The present invention still further provides a seventh self-organizing pattern learning system, wherein the first self-organizing pattern learning system in accordance with the present invention is modified such that the memory pattern updating means may optically update the memory patterns, which are stored in the pattern storing means, in accordance with the learning patterns, which have been created by the learning pattern creating means.

The present invention also provides an eighth self-organizing pattern learning system, wherein the first self-organizing pattern learning system in accordance with the present invention is modified such that the memory pattern updating means may electrically update the memory patterns, which are stored in the pattern storing means, in accordance with the learning patterns, which have been created by the learning pattern creating means.

The present invention further provides a ninth self-organizing pattern learning system, wherein the first self-organizing pattern learning system in accordance with the present invention is modified such that the memory pattern updating means may be constituted of the pattern storing means, which constitutes the optical pattern correlation degree detecting means.

The self-organizing pattern learning system in accordance with the present invention may be embodied in various ways as defined in Claims 2 through 51.

With the self-organizing pattern learning system in accordance with the present invention, basically, the optical pattern correlation degree detecting means comprises the pattern storing means, the input pattern displaying means, and the photo detecting means. All or two of the pattern storing means, the input pattern displaying means, and the photo detecting means are located at positions adjacent to each other. The photo detecting means optically detects the degree of correlation between a new input pattern displayed on the input pattern displaying means and each of memory patterns stored in the pattern storing means. The learning pattern creating means creates the learning patterns in accordance with the degrees of correlation, which have been detected by the optical pattern correlation degree detecting means, and the input pattern. Also, the memory pattern updating means updates the memory patterns, which are stored in the pattern storing means, in accordance with the learning patterns, which have been created by the learning pattern creating means.

Therefore, with the self-organizing pattern learning system in accordance with the present invention, a large number of wires, which are required to transfer signals representing the degrees of correlation as in the experimental system of Taiwei, et al., need not be used, and the operations for updating the memory patterns stored in the pattern storing means, i.e. the self-organizing learning operations, can be carried out in accordance with the newly presented input pattern. Also, many pieces of information representing the degrees of correlation are transferred in parallel, and the learning patterns to be used in updating the memory patterns are created in parallel. Additionally, the operations for updating (writing) the memory patterns are carried out in parallel. Therefore, the self-organizing learning operations can be carried out more quickly than with the experimental system of Taiwei, et al. in which the operations for updating the memory are carried out by a computer. Further, the self-organizing pattern learning system in accordance with the present invention, wherein a large number of wires for transferring the signals representing the degrees of correlation need not be used, can be kept small in size and can be manufactured at a low cost.

Moreover, with the self-organizing pattern learning system in accordance with the present invention, image forming lens systems for transferring the input pattern, the learning patterns, and the like, as in the experimental system of Taiwei, et al. need not be located among all of the layers, and the self-organizing learning operations on the memory patterns stored in the pattern storing means can be carried out by creating the learning patterns in accordance with the input pattern. Also, with the self-organizing pattern learning system in accordance with the present invention, wherein image forming lens systems need not be utilized, the system can be kept small in size. Additionally, problems with regard to lens aberrations, external light noise, accuracies with which the lenses are located, and alignments of the lenses in the image forming lens systems need not be taken into consideration. Therefore, the cost of the self-organizing pattern learning system in accordance with the present invention can be kept low. Further, with the self-organizing pattern learning system in accordance with the present invention wherein the image forming lens systems need not be provided, a self-organizing pattern learning system can be built up which is not affected by vibrations and which has a high optical transfer efficiency.

With the second self-organizing pattern learning system in accordance with the present invention, the first self-organizing pattern learning system in accordance with the present invention is modified such that the input pattern displaying means, the pattern storing means, and the photo detecting means may be located in this order in the optical pattern correlation degree detecting means. Also, with the third self-organizing pattern learning system in accordance with the present invention, the first self-organizing pattern learning system in accordance with the present invention is modified such that the pattern storing means, the input pattern displaying means, and the photo detecting means may be located in this order in the optical pattern correlation degree detecting means. With the second and third self-organizing pattern learning systems in accordance with the present invention, the self-organizing learning operations in the pattern storing means can be carried out in the same manner as that in the first self-organizing pattern learning system in accordance with the present invention. During the self-organizing learning operations, a pattern can be transferred either as an optical intensity pattern or as a polarized optical pattern between the pattern storing means and the input pattern displaying means.

Also, the learning pattern creating means may be constituted of the learning pattern operation means for creating a group of learning patterns, which have been weighted by electric operations, in accordance with the degrees of pattern correlation, and the learning pattern displaying means for displaying the learning patterns, which have been created by the learning pattern operation means. The memory patterns stored in the pattern storing means may be updated by the memory pattern updating means in accordance with the learning patterns, which are displayed on the learning pattern displaying means.

As another alternative, the learning pattern creating means may be constituted of the correlation degree light output means for radiating out a group of correlation degree light in accordance with the degrees of pattern correlation, and the input pattern displaying means for modulating each correlation degree light of the correlation degree light group into pattern light in accordance with the input pattern. In such cases, input patterns according to the correlation degree light group can be obtained and used in updating the memory patterns stored in the pattern storing means.

As a further alternative, the learning pattern creating means may be constituted of the input pattern output means for radiating out pattern light in accordance with the input pattern, and the correlation degree light modulating means for modulating the input pattern light, which has been radiated out of the input pattern output means, in accordance with each of the degrees of pattern correlation.

The memory pattern updating means may optically update the memory patterns, which are stored in the pattern storing means, in accordance with the learning patterns, which have been created by the learning pattern creating means. Alternatively, the memory pattern updating means may electrically update the memory patterns, which are stored in the pattern storing means, in accordance with the learning patterns, which have been created by the learning pattern creating means. Also, the self-organizing pattern learning system in accordance with the present invention may be provided with an erasing means, which erases all or some of the memory patterns stored in the pattern storing means. In such cases, unnecessary patterns appearing in the pattern storing means during the self-organizing learning operations can be erased, and the self-organizing learning operations can be carried out more accurately.

Further, the input pattern displaying means of the optical pattern correlation degree detecting means may also serve as the input pattern displaying means of the learning pattern creating means. In such cases, the self-organizing pattern learning system in accordance with the present invention can be kept smaller in size. Furthermore, the memory pattern updating means may serve as the pattern storing means of the optical pattern correlation degree detecting means.

Two kinds of light having different wavelength distributions in accordance with the optical characteristics of the pattern storing means may be utilized respectively as light, which is capable of being detected by the photo detecting means, and light, with which the memory patterns stored in the pattern storing means are capable of being updated. In such cases, the detection of the degrees of correlation and the operations for updating the memory patterns can be carried out simultaneously. Therefore, the self-organizing learning operations can be carried out more quickly.

BRIEF DESCRIPTION OF THE DRAWINGS

FIG. 4 is a schematic view showing a first embodiment of the self-organizing pattern learning system in accordance with the present invention;

FIG. 5 is a schematic view showing a second embodiment of the self-organizing pattern learning system in accordance with the present invention;

FIG. 18 is a schematic view showing a fifth embodiment of the self-organizing pattern learning system in accordance with the present invention;

FIG. 19 is a schematic view showing a modification of the fifth embodiment of the self-organizing pattern learning system in accordance with the present invention, wherein light emitting devices are employed in lieu of optical control light valves;

FIG. 34 is a schematic view showing a modification of each embodiment of the self-organizing pattern learning system in accordance with the present invention, wherein a pattern storing means is provided with a pattern erasing means;

FIG. 35 is a schematic view showing a modification of the first embodiment of the self-organizing pattern learning system in accordance with the present invention, which is provided with a pattern erasing means;

DESCRIPTION OF THE PREFERRED EMBODIMENTS

The present invention will hereinbelow be described in further detail with reference to the accompanying drawings.

Figure 1:
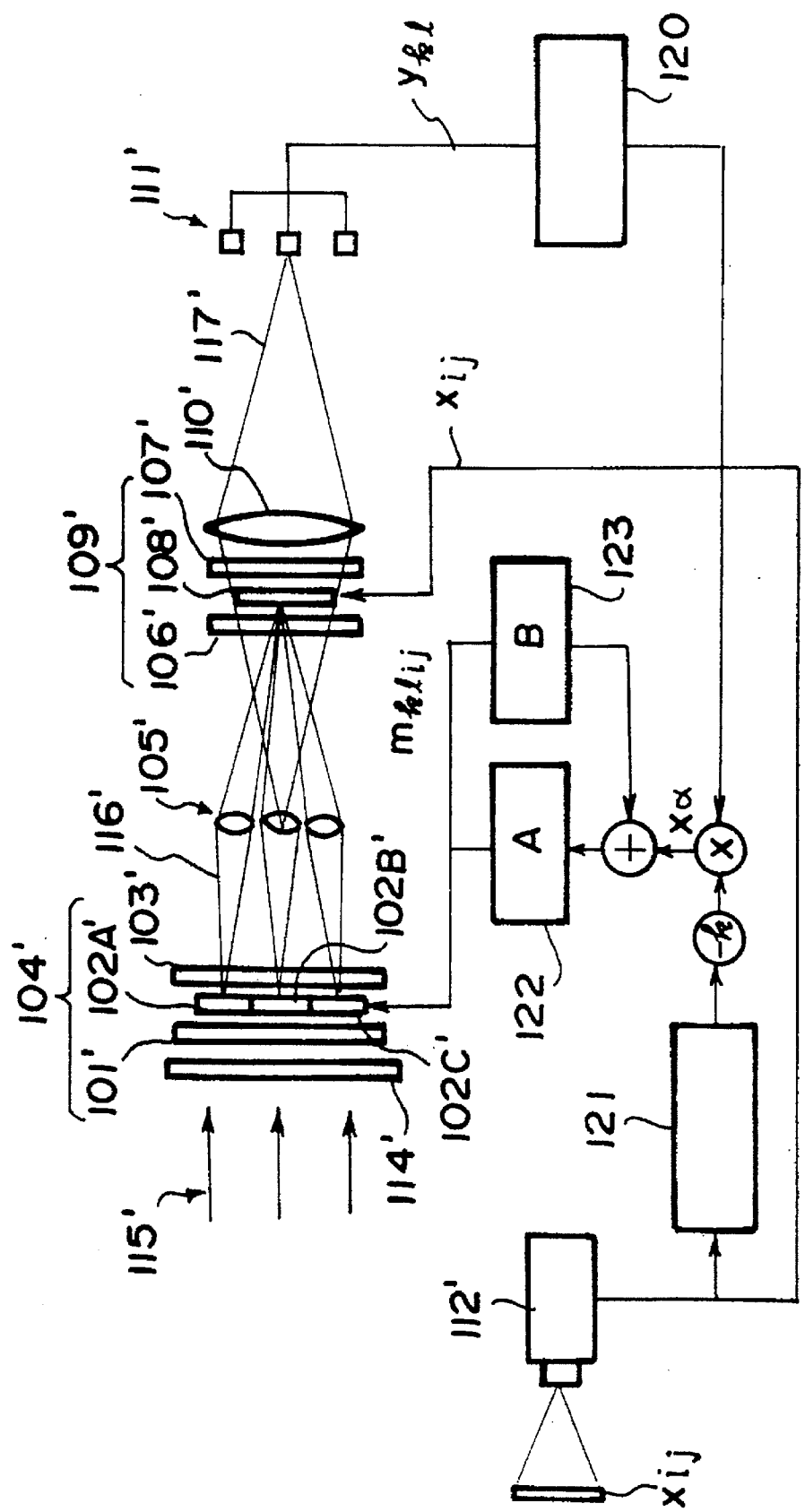
FIG. 1 is a schematic view showing an experimental system of Taiwei, et al., the view serving as an aid in explaining a conventional technique.
Figure 37:
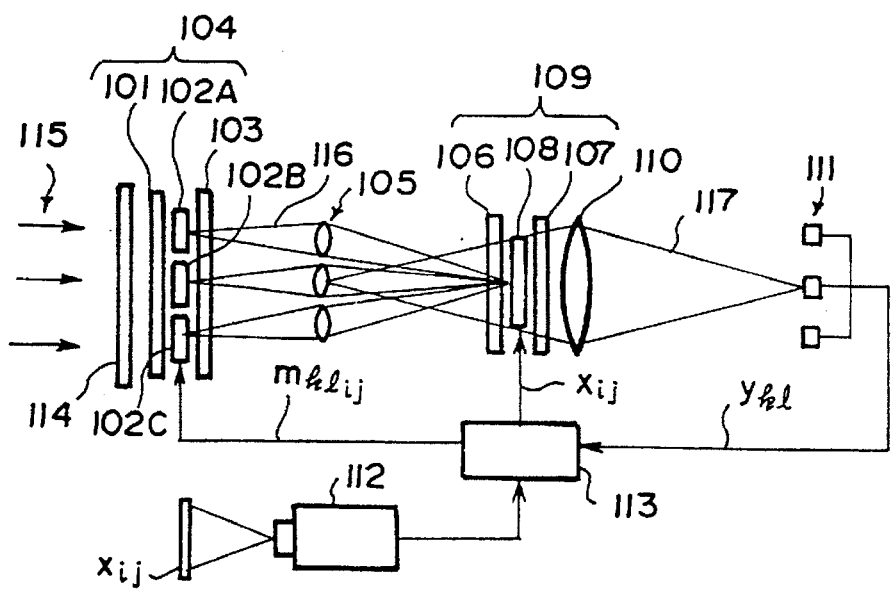
FIG. 37 is a schematic view showing the experimental system of Taiwei, et al.

FIG. 1 is a schematic view showing a self-organizing pattern learning system of Taiwei, et al. shown in FIG. 37, wherein the functions of a computer 113 shown in FIG. 37 are illustrated in detail with a technique for representing functional blocks of electric hardware.

Elements constituting an optical system in the self-organizing pattern learning system of FIG. 1 are basically equivalent to those constituting the optical system shown in FIG. 37, and are therefore numbered with corresponding primed reference numerals in FIG. 1. With reference to FIG. 1, at a time t, memory patterns mklij(t−1), which have been learned before the time t, are stored in a memory pattern buffer B 123. The memory patterns mklij(t−1) are displayed at a storing/displaying light valve layer 104'. Also, at the time t, an input image xij(t) at the time t is displayed at an input light valve layer 109'. In this state, correlation output reading light 115' passes through the storing/displaying light valve layer 104' and the input light valve layer 109'. The correlation output reading light 115' is then condensed by a condensing lens 110' and impinges upon correlation output detector arrays 111'. The correlation output detector arrays 111' generate signals, which represent values of correlation ykl(t) between the memory patterns mklij(t−1) and the input pattern xij(t). The signals, which represent the values of correlation ykl(t) between the memory patterns mklij(t−1) and the input pattern xij(t), are temporarily stored in a learning enabling pattern buffer 120.

An input image multi-pattern buffer 121 temporarily stores multiple patterns xklij(t) of the input pattern xij(t) presented at the time t. The multiple patterns are formed in a number corresponding to the number of storing/displaying light valves 102A', 102B', and 102C' in the storing/displaying light valve layer 104'.

After the signals, which represent the values of correlation ykl(t), have been stored in the learning enabling pattern buffer 120, a bias component k is subtracted from each of the multiple patterns xklij(t), which are stored in the input image multi-pattern buffer 121. Thereafter, a scalar multiplication is carried out on each of the values of correlation ykl(t), which are stored in the learning enabling pattern buffer 120, and each of the multiple patterns xklij(t)−k, which have been obtained by subtracting the bias component k from the multiple patterns xklij(t). A scalar multiplication is then carried out on each of the multiple patterns (xklij(t)−k)×ykl(t), which have been obtained from the multiplication of the multiple patterns xklij(t)−k and the values of correlation ykl(t), and a factor α. Thereafter, the memory patterns mklij(t−1), which are stored in the memory pattern buffer B 123, and the multiple patterns α×((xklij(t)−k)×ykl(t)), which have been obtained from the multiplication of the multiple patterns (xklij(t)−k)×ykl(t) and the factor α, are added to each other. In this manner, new memory patterns mklij(t) are calculated. The calculation is expressed as $$m_{klij}(t)=m_{klij}(t-1)+\alpha \times ((x_{klij}(t)-k)\times y_{kl}(t)) \quad (3)$$

The new memory patterns mklij(t) are stored in a memory pattern buffer A 122 and the memory pattern buffer B 123.

Thereafter, at a time t+1, a new input pattern xij(t+1) is presented from an input camera 112'. The new input pattern xij(t+1) is displayed at the input light valve layer 109'. At the same time, the memory patterns mklij(t), which have been learned before the time t+1, are read from the memory pattern buffer B 123 and displayed at the storing/displaying light valve layer 104'. Also, the input image multi-pattern buffer 121 temporarily stores multiple patterns xklij(t+1) of the new input pattern xij(t+1).

Thereafter, the correlation output reading light 115' is irradiated, and new values of correlation ykl(t+1) are detected by the correlation output detector arrays 111' in the same manner as that described above. The calculation is carried out with a formula which is equivalent to Formula (3), and new memory patterns are thereby calculated.

The operations described above are iterated, and operations for updating the weights in the memory pattern buffer A 122 and the memory pattern buffer B 123, which weights correspond to the light valves of the storing/displaying light valve layer 104', i.e. the learning operations, are thereby carried out.

Embodiments of the self-organizing pattern learning system in accordance with the present invention will be described hereinbelow.

Figure 2:
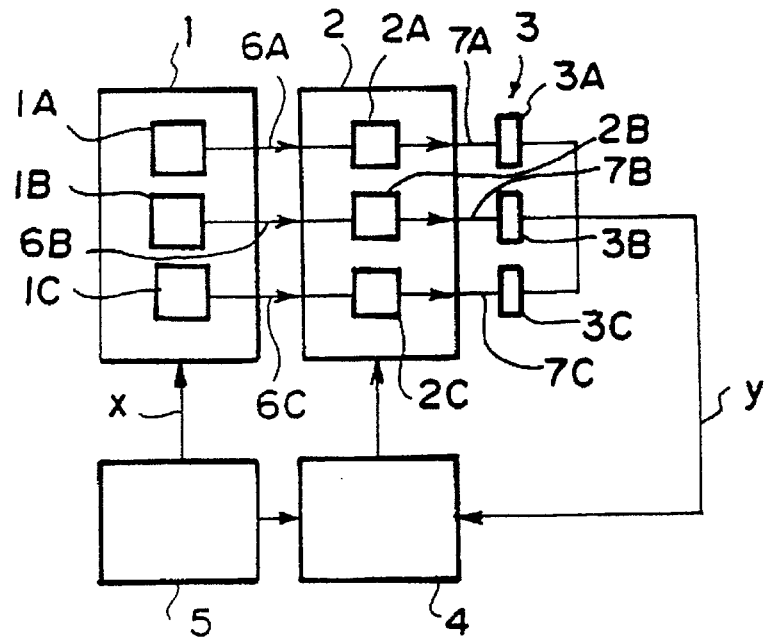
FIG. 2 is a schematic view showing a first fundamental concept behind the self-organizing pattern learning system in accordance with the present invention.

FIG. 2 is a schematic view showing a first fundamental concept behind the self-organizing pattern learning system in accordance with the present invention.

As illustrated in FIG. 2, in the first fundamental concept in accordance with the present invention, the self-organizing pattern learning system comprises a pattern input means 1, an optical modulating device group 2, a correlation detecting device group 3, and an operation means 4.

The optical modulating device group 2 serves as a pattern storing means and comprises a plurality of optical modulating devices 2A, 2B, and 2C, which store patterns presented thereto and modulate incident light in accordance with the stored patterns. The plurality of the optical modulating devices 2A, 2B, and 2C are arrayed in one direction or in two directions (in this case, three optical modulating devices 2A, 2B, and 2C are arrayed in one direction).

The pattern input means 1 serves as an input pattern displaying means and comprises a plurality of optical input devices 1A, 1B, and 1C, which are respectively located at positions adjacent to the optical modulating devices 2A, 2B, and 2C and which present a new input pattern x to the optical modulating devices 2A, 2B, and 2C. The pattern input means 1 also comprises an input means 5, which presents the input pattern x to each of the optical input devices 1A, 1B, and 1C.

The correlation detecting device group 3 serves as a photo detecting means and comprises a plurality of correlation detecting devices 3A, 3B, and 3C, which are respectively located at positions adjacent to the optical modulating devices 2A, 2B, and 2C. The correlation detecting devices 3A, 3B, and 3C detect degrees of correlation y between the input pattern x, which has been presented to each of the optical input devices 1A, 1B, and 1C, and the memory patterns, which are stored in the optical modulating devices 2A, 2B, and 2C of the optical modulating device group 2.

The operation means 4 comprises a learning pattern creating means and a memory pattern updating means. The learning pattern creating means creates learning patterns in accordance with the degrees of correlation y, which have been detected by the correlation detecting devices 3A, 3B, and 3C, and the input pattern x. The memory pattern updating means updates the memory patterns, which are stored in the optical modulating devices 2A, 2B, and 2C, in accordance with the learning patterns, which have been created by the learning pattern creating means.

First, the input pattern x is presented by the input means 5 to each of the optical input devices 1A, 1B, and 1C of the pattern input means 1. By way of example, light is irradiated to the optical input devices 1A, 1B, and 1C, and light carrying the input pattern x is thereby radiated out of each of the optical input devices 1A, 1B, and 1C. In this manner, the input pattern x is presented to each of the optical modulating devices 2A, 2B, and 2C of the optical modulating device group 2. The optical modulating devices 2A, 2B, and 2C store memory patterns, which have been learned in accordance with input patterns having been presented previously. Light 6A, light 6B, and light 6C, which have been radiated out of the optical input devices 1A, 1B, and 1C, respectively pass through the optical modulating devices 2A, 2B, and 2C. As a result, optical superposition patterns 7A, 7B, and 7C are obtained from the superposition of the input pattern x upon the memory patterns, which are stored in the optical modulating devices 2A, 2B, and 2C. Each of the correlation detecting devices 3A, 3B, and 3C of the correlation detecting device group 3 detects the sum of the amounts of light carrying the corresponding optical superposition pattern. The sum of the amounts of light carrying each of the optical superposition patterns 7A, 7B, and 7C is thus detected as the degree of correlation y by each of the correlation detecting devices 3A, 3B, and 3C. The signals representing the degrees of correlation y, which have been detected by the correlation detecting devices 3A, 3B, and 3C, are fed into the operation means 4. The operation means 4 stores the input pattern x presented by the input means 5. The operation means 4 weights the input pattern x with the degrees of correlation y, which have been detected by the correlation detecting devices 3A, 3B, and 3C, and learning patterns are thereby created. Thereafter, the memory patterns, which are stored in the optical modulating devices 2A, 2B, and 2C of the optical modulating device group 2, are updated in accordance with the learning patterns, which have been created by the operation means 4.

Figure 3:
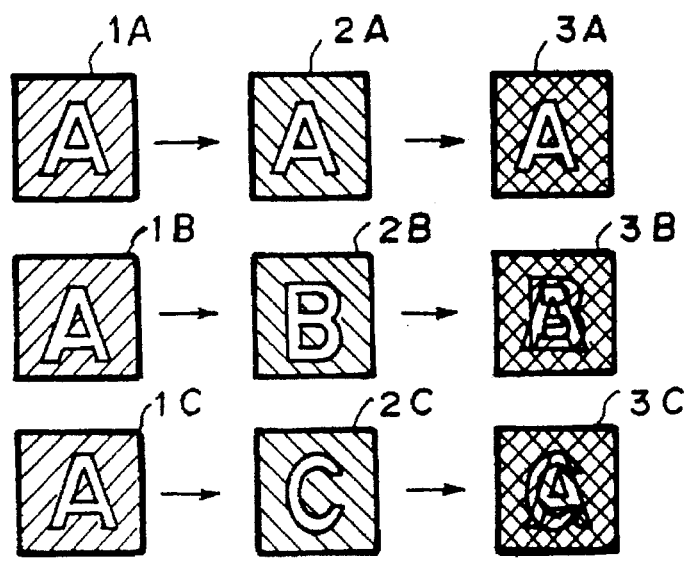
FIG. 3 is an explanatory view showing correlations between an input pattern and memory patterns, which have been stored in optical modulating devices.

By way of example, as illustrated in FIG. 3, the character A is displayed as the input pattern on each of the optical input devices 1A, 1B, and 1C. Also, characters A, B, and C are respectively stored as memory patterns in the optical modulating devices 2A, 2B, and 2C. In such cases, as illustrated in FIG. 3, the correlation detecting device 3A detects the superposition pattern of A and A as a first degree of correlation. The correlation detecting device 3B detects the superposition pattern of A and B as degree of correlation. Also, the correlation detecting device 3C detects the superposition pattern of A and C as a third degree of correlation. Therefore, the degree of correlation detected by the correlation detecting device 3A takes a large value, and the degrees of correlation detected by the correlation detecting devices 3B and 3C take a value smaller than the degree of correlation detected by the correlation detecting device 3A. Accordingly, the pattern A is written with a large weight in the optical modulating device 2A. In the optical modulating devices 2B and 2C, the pattern A is not written or is written only with a small weight. In cases where the input pattern is B, the pattern B is written with a large weight in the optical modulating device 2B. Also, in cases where the input pattern is C, the pattern C is written with a large weight in the optical modulating device 2C. In this manner, the operations for updating the memory patterns, i.e. the learning operations, are carried out. Specifically, the memory patterns are updated with the weights corresponding to the degrees of correlation.

The operations described above are iterated, and various patterns presented to the optical modulating devices 2A, 2B, and 2C of the optical modulating device group 2 are stored in the optical modulating devices 2A, 2B, and 2C with the weights corresponding to the degrees of correlation. Also, the memory patterns stored in the optical modulating devices 2A, 2B, and 2C are updated. In this manner, self-organizing learning operations are carried out on the patterns presented one after another.

Embodiments of the self-organizing pattern learning system in accordance with the present invention, wherein the first fundamental concept described above is employed, will be described hereinbelow.

FIG. 4 is a schematic view showing a first embodiment of the self-organizing pattern learning system in accordance with the present invention, wherein the first fundamental concept described above is employed.

With reference to FIG. 4, the first embodiment of the self-organizing pattern learning system in accordance with the present invention is provided with an optical system. The optical system comprises a polarizer 11, which receives and polarizes reading light 18 produced by a light source (not shown). The optical system also comprises k×l number (in this embodiment, 3×1 number) of input light valves 12A, 12B, and 12C, which have i×j number of picture elements and are arrayed at positions adjacent to the polarizer 11. The optical system further comprises a polarizer 13, which is adjacent to the input light valves 12A, 12B, and 12C. The optical system still further comprises k×1 number (in this embodiment, 3×1 number) of storing/displaying light valves 14A, 14B, and 14C, which have i×j number of picture elements and are arrayed at positions adjacent to the polarizer 13 so as to correspond to the input light valves 12A, 12B, and 12C. The optical system also comprises a polarizer 15, which is adjacent to the storing/displaying light valves 14A, 14B, and 14C. The optical system further comprises k×1 number (in this embodiment, 3×1 number) of correlation output detector arrays 16A, 16B, and 16C, which are arrayed at positions adjacent to the polarizer 15 so as to correspond to the storing/displaying light valves 14A, 14B, and 14C.

In this embodiment, a liquid crystal display device (LCD) is employed as each of the light valves.

This embodiment is also provided with a processing system for updating the memory patterns. The processing system comprises a memory pattern buffer A 122, a memory pattern buffer B 123, and a learning enabling pattern buffer 120, which are basically equivalent to those shown in FIG. 1. In this embodiment, an input pattern xij(t) is presented by a multiple image forming camera 17.

First, the input pattern xij(t), which has been recorded by the multiple image forming camera 17, is displayed on each of the input light valves 12A, 12B, and 12C. Thereafter, the reading light 18 passes through the polarizer 11 and is then irradiated to the input light valves 12A, 12B, and 12C. The reading light 18, which has been irradiated to the input light valves 12A, 12B, and 12C, is modulated with the input pattern xij(t), which is displayed on each of the input light valves 12A, 12B, and 12C. The reading light 18, which has thus been modulated, passes through the polarizer 13 and is then irradiated as an optical intensity pattern to each of the storing/displaying light valves 14A, 14B, and 14C. The memory pattern buffer B 123 store patterns, which have been presented before the time t, as memory patterns mklij (t−1) in accordance with a certain rule. The storing/displaying light valves 14A, 14B, and 14C display the memory patterns, which are stored in the memory pattern buffer B 123. In each of the storing/displaying light valves 14A, 14B, and 14C, the optical pattern of the reading light 18, which has passed through each of the input light valves 12A, 12B, and 12C, is superposed upon each of the memory patterns, which are displayed on the storing/displaying light valves 14A, 14B, and 14C. By way of example, as illustrated in FIG. 3, the pattern of the character A is displayed on each of the input light valves 12A, 12B, and 12C, and the patterns of the characters A, B, and C are respectively displayed as the memory patterns on the storing/displaying light valves 14A, 14B, and 14C. In such cases, optical superposition patterns indicated by 3A, 3B, and 3C in FIG. 3 are obtained from the superpositions of the input pattern A upon the memory patterns A, B, and C.

Each of the optical superposition patterns passes through the polarizer 15. Thereafter, the sum of the amounts of light carrying each optical superposition pattern is detected by each of the correlation output detector arrays 16A, 16B, and 16C. By each of the correlation output detector arrays 16A, 16B, and 16C, the information representing the brightness of the entire area of the superposition pattern, which is obtained from the superposition of the input pattern xij(t) upon each of the memory patterns mklij(t−1), is detected as the degree of correlation ykl(t) between the input pattern xij(t) and each of the memory patterns mklij(t−1). Specifically, the result of the product calculations represented by the formula $$y_{kl}(t) = \sum_{ij} (x_{ij}(t) \times m_{klij}(t-1))  \quad (4)$$

is detected as the degree of correlation ykl(t) between the input pattern xij(t) and each of the memory patterns mklij (t−1).

The signals representing the degrees of correlation ykl(t), which have been detected by the correlation output detector arrays 16A, 16B, and 16C, are fed into and temporarily stored in the learning enabling pattern buffer 120 of the processing system. In the processing system, a bias component k is subtracted from the input pattern xij(t), which has been presented by the multiple image forming camera 17. The subtraction is represented by the formula xij(t)−k. Thereafter, a scalar multiplication is carried out on each of the degrees of correlation ykl(t), which are stored in the learning enabling pattern buffer 120, and the value of xij(t)−k. The scalar multiplication is represented by the formula ykl(t)×(xij(t)−k). A scalar multiplication is then carried out on each of the scalar products ykl(t)×(xij(t)−k) and a learning factor α. This scalar multiplication is represented by the formula α×(ykl(t)×(xij(t)−k)). Thereafter, the scalar product thus obtained for each light valve and the memory pattern mklij(t−1), which is stored for the same light valve in the memory pattern buffer B 123, are added to each other. In this manner, learning patterns mklij(t), which serve as new memory patterns, are calculated. The calculation is represented by the formula $$m_{klij}(t) = m_{klij}(t-1) + \alpha \times ((x_{ij}(t)-k) \times y_{kl}(t))) \quad (5)$$

The new memory patterns mklij(t) are stored in the memory pattern buffer A 122 and used during the operations for updating the memory patterns, i.e. during the learning operations. Also, the contents of the memory pattern buffer A 122 are copied to the memory pattern buffer B 123.

In the embodiment described above, the input pattern presented at the time t is A. As illustrated in FIG. 3, the pattern A is stored as the memory pattern in the storing/displaying light valve 14A. Also, the pattern B is stored as the memory pattern in the storing/displaying light valve 14B, and the pattern C is stored as the memory pattern in the storing/displaying light valve 14C. Therefore, the degree of correlation between the input pattern A and the memory pattern, which is stored in the storing/displaying light valve 14A, is high. Also, the degree of correlation between the input pattern A and each of the memory patterns, which are stored in the storing/displaying light valves 14B and 14C, is low. Accordingly, the pattern A is written as a new memory pattern with a large weight in the storing/displaying light valve 14A. Also, in the storing/displaying light valves 14B and 14C, the pattern A is not written or is written only with a small weight. In cases where the input pattern is B, the pattern B is written with a large weight in the storing/displaying light valve 14B. In cases where the input pattern is C, the pattern C is written with a large weight in the storing/displaying light valve 14C. In this manner, the operations for updating the memory patterns, i.e. the learning operations, are carried out. Specifically, the memory patterns are updated in accordance with the degrees of correlation.

The operations described above are iterated, and the memory patterns mklij(t−1) are thereby updated with the weights corresponding to the degrees of correlation between various input patterns, which are presented to the input light valves 12A, 12B, and 12C, and the patterns, which are displayed on the storing/displaying light valves 14A, 14B, and 14C in accordance with the contents stored in the memory pattern buffer A 122 and the memory pattern buffer B 123. in this manner, the self-organizing learning operations are carried out.

In the embodiment described above, image forming lens systems need not be utilized. Therefore, the self-organizing pattern learning system in accordance with the present invention can be kept small in size. Also, problems with regard to lens aberrations, external light noise, accuracies with which the lenses are located, and alignments of the lenses in the image forming lens systems need not be taken into consideration. Therefore, the cost of the self-organizing pattern learning system in accordance with the present invention can be kept low. Further, with the self-organizing pattern learning system in accordance with the present invention wherein the image forming lens systems need not be provided, a self-organizing pattern learning system can be built up which is not affected by vibrations and which has a high optical transfer efficiency.

In the embodiment described above, the degrees of correlation between the input pattern and the memory patterns are calculated with Formula (4)

$$y_{kl}(t) = \sum_{ij} (x_{ij}(t) \times m_{klij}(t-1))  \quad (4)$$

Specifically, the degrees of correlation calculated from products are obtained from the input light valves 12A, 12B, and 12C and the storing/displaying light valves 14A, 14B, and 14C. Alternatively, the degrees of correlation calculated from differences may be obtained by modifying the optical system.

FIG. 5 shows an optical system employed in a second embodiment of the self-organizing pattern learning system in accordance with the present invention, wherein the degrees of correlation calculated from differences between an input pattern and memory patterns are obtained.

As illustrated in FIG. 5, the optical system, which is employed in the second embodiment of the self-organizing pattern learning system in accordance with the present invention, is equivalent to the optical system, which is employed in the first embodiment of the self-organizing pattern learning system in accordance with the present invention shown in FIG. 4, except that the polarizer 13 located between the input light valves 12A, 12B, and 12C and the storing/displaying light valves 14A, 14B, and 14C is omitted. In the aforesaid first embodiment shown in FIG. 4, the reading light 18, which has passed through each of the input light valves 12A, 12B, and 12C, passes through the polarizer 13 and is presented as an optical intensity pattern to each of the storing/displaying light valves 14A, 14B, and 14C. In the second embodiment shown in FIG. 5, the reading light, which has passed through each of the input light valves 12A, 12B, and 12C, is presented as a polarized optical pattern to each of the storing/displaying light valves 14A, 14B, and 14C. Specifically, in the first embodiment shown in FIG. 4, the sum of the products xij(t)×mklij(t−1) of the input pattern xij(t) and each of the memory patterns mklij (t−1), which are stored in the storing/displaying light valves 14A, 14B, and 14C, is given to each of the correlation output detector arrays 16A, 16B, and 16C. In the second embodiment shown in FIG. 5, the sum of the absolute values |xij(t)−mklij(t−1)| of the differences between the input pattern xij(t) and each of the memory patterns mklij(t−1), which are stored in the storing/displaying light valves 14A, 14B, and 14C, is given to each of the correlation output detector arrays 16A, 16B, and 16C.

Figure 6A:
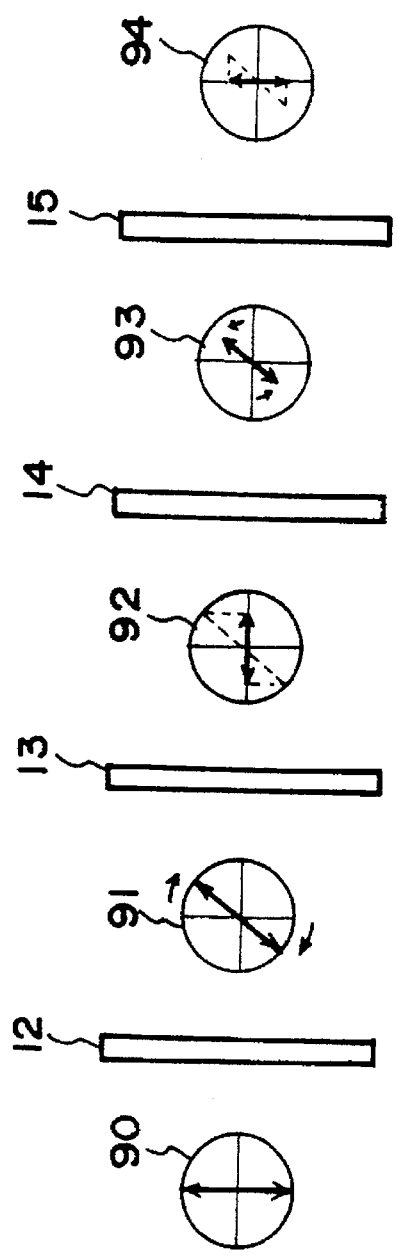
FIG. 6A is an explanatory view showing how a product correlation is detected.

FIG. 6A is an explanatory view showing how a product correlation is detected. Specifically, as illustrated in FIG.

6A, in the first embodiment of the self-organizing pattern learning system in accordance with the present invention, light 90, which is irradiated to an input light valve 12, has been polarized in the direction indicated by the double headed arrow. The light 90 is then modulated with the input pattern, which is displayed on the input light valve 12, and the direction of polarization of the light 90 is rotated in the direction indicated by the arrows for light 91. In this manner, the light 91 is radiated out of the input light valve 12. Thereafter, the light 91 passes through the polarizer 13. The polarizer 13 transmits only the light component having the direction of polarization, which is normal to the direction of polarization of the light 90. Therefore, light 92, which has passed through the polarizer 13, has an optical intensity pattern corresponding to the rotation angle of the direction of polarization, which has been rotated by the input light valve 12. Also, the direction of polarization of the light 92 is normal to the direction of polarization of the light 90. The light 92 is then irradiated to a storing/displaying light valve 14. The light 92 irradiated to the storing/displaying light valve 14 has a pattern representing the intensity of the light carrying the input pattern information displayed on the input light valve 12. When the light 92 passes through the storing/displaying light valve 14, the direction of polarization of the light 92 is partially rotated in accordance with the memory pattern, which is stored in the storing/displaying light valve 14. Light 93, which is radiated out of the storing/displaying light valve 14, impinges upon the polarizer 15. The polarizer 15 transmits only the light component having the direction of polarization, which is parallel to the direction of polarization of the light 90. In this manner, light 94 is radiated out of the polarizer 15. The light 94 carries the optical intensity pattern obtained from the multiplication of the pattern information, which is carried by the light 92, by the memory pattern information, which is stored in the storing/displaying light valve 14. The light 94 is collected, and the sum of the amounts of the light carrying the optical pattern is detected by a correlation output detector array 16.

Figure 6B:
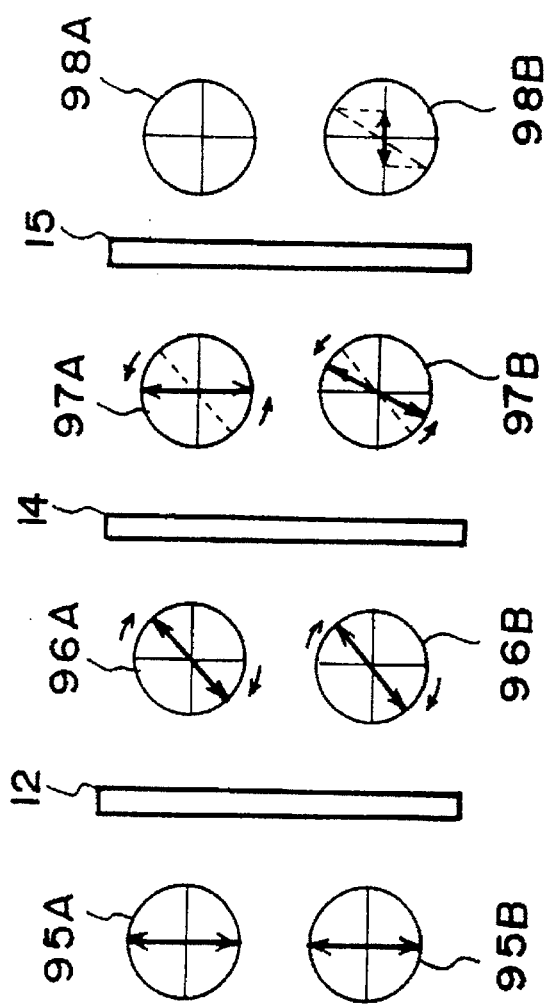
FIG. 6B is an explanatory view showing how a difference correlation is detected.

FIG. 6B is an explanatory view showing how a difference correlation is detected. Specifically, as illustrated in FIG. 6B, in the second embodiment of the self-organizing pattern learning system in accordance with the present invention, light 95A or light 95B, which is irradiated to an input light valve 12, has been polarized in the direction indicated by the double headed arrow in the same manner as that for the light 90 shown in FIG. 6A.

The direction of polarization of the light 95A or the light 95B is rotated in accordance with the input pattern, which is displayed on the input light valve 12. In this manner, light 96A or light 96B is radiated out of the input light valve 12. Thereafter, the light 96A or the light 96B is irradiated to a storing/displaying light valve 14. The direction of polarization of the light 96A or the light 96B is further rotated in accordance with the memory pattern, which is stored in the storing/displaying light valve 14. In this manner, light 97A or light 97B is radiated out of the storing/displaying light valve 14. The light 97A or the light 97B impinges upon a polarizer 15. The polarizer 15 transmits only the light component having the direction of polarization, which is normal to the direction of polarization of the light 95A or the light 95B. In this manner, of the light 97A or the light 97B, only the light component having the direction of polarization, which is normal to the direction of polarization of the light 95A or the light 95B, passes through the polarizer 15. As a result, light 98A or light 98B is radiated out of the polarizer 15.

The input light valve 12 and the storing/displaying light valve 14 are located such that the direction, along which the direction of polarization is rotated by the input light valve 12, and the direction, along which the direction of polarization is rotated by the storing/displaying light valve 14, may be opposite to each other. Therefore, in cases where the input pattern, which is displayed on the input light valve 12, and the memory pattern, which is stored in the storing/displaying light valve 14, are approximately identical with each other, the direction of polarization of the light 96A having been rotated by the input light valve 12 is rotated reversely by the storing/displaying light valve 14, and the light 97A is thereby obtained. As a result, the direction of polarization of the light 96A is returned to the original direction of polarization of the light 95A. Therefore, the direction of polarization of the light 97A is parallel to the direction of polarization of the light 95A. Accordingly, the amount of the light 98A, which has passed through the polarizer 15 for transmitting only the light component having the direction of polarization, which is normal to the direction of polarization of the light 95A or the light 95B, becomes approximately zero.

In cases where the input pattern, which is displayed on the input light valve 12, and the memory pattern, which is stored in the storing/displaying light valve 14, are different from each other, the rotation angle, by which the direction of polarization of the light 95B is rotated to the direction of polarization of the light 96B, and the rotation angle, by which the direction of polarization of the light 96B is reversely rotated to the direction of polarization of the light 97B, become different from each other at various positions in the pattern area. As a result, at various positions in the pattern area, the direction of polarization of the light having passed through the storing/displaying light valve 14 does not return to the original direction of polarization of the light 95B. Therefore, at various positions in the pattern area, as in the case of the light 97B, the direction of polarization of the light having passed through the storing/displaying light valve 14 does not become parallel to the direction of polarization of the light 95B. Accordingly, the amount of the light 98B, which has passed through the polarizer 15 for transmitting only the light component having the direction of polarization, which is normal to the direction of polarization of the light 95A or the light 95B, does not become zero. The amount of the light 98B, which has passed through the polarizer 15, corresponds to the difference between the input pattern, which is displayed on the input light valve 12, and the memory pattern, which is stored in the storing/displaying light valve 14.

Specifically, the light, which is radiated out of the polarizer 15 and detected by a correlation output detector array 16, represents the absolute values of the differences between the input pattern $x_{ij}(t)$, which is displayed on the input light valve 12, and the memory pattern $mk_{lij}(t-1)$, which is stored in the storing/displaying light valve 14. Therefore, in cases where the amount of light detected by the correlation output detector array 16 is small, it may be judged that the degree of correlation between the input pattern, which is displayed on the input light valve 12, and the memory pattern, which is stored in the storing/displaying light valve 14, is high. In cases where the amount of light detected by the correlation output detector array 16 is large, it may be judged that the degree of correlation between the input pattern, which is displayed on the input light valve 12, and the memory pattern, which is stored in the storing/displaying light valve 14, is low.

More specifically, the relationship between the degree of correlation calculated from products and the degree of correlation calculated from the absolute values of differences is represented by the formulas $$O_1 = \Sigma W \cdot i \quad (6)$$

$$O_2 = \Sigma |W - i| \quad (7)$$

wherein i represents the new input pattern, W represents the memory pattern stored in the optical modulating device, O1 represents the degree of correlation calculated from products, and O2 represents the degree of correlation calculated from the absolute values of differences. The square of |W−i| in Formula (7) is expressed as $$|W - i|^2 = W^2 + i^2 - 2 \cdot W \cdot i \quad (8)$$

Formula (8) indicates that, in order for the value of |W−i| to be small, the value of W·i must be large. Therefore, in cases where the degree of correlation calculated from products is higher, the degree of correlation calculated from differences becomes lower.

As described above, in the second embodiment of the self-organizing pattern learning system in accordance with the present invention, the degree of correlation is calculated in a manner different from that in the first embodiment. However, with the second embodiment, the learning operations in the optical modulating devices 2A, 2B, and 2C, i.e. the operations for updating the memory patterns, can be carried out in the same manner as that in the first embodiment.

In the aforesaid first and second embodiments of the self-organizing pattern learning system in accordance with the present invention, the reading light 18, which has been produced by a light source (not shown), is irradiated to the input light valves 12A, 12B, and 12C. The input pattern is thereby presented to each of the storing/displaying light valves 14A, 14B, and 14C. The presentation of the input pattern may be carried out in a different manner.

Figure 7:
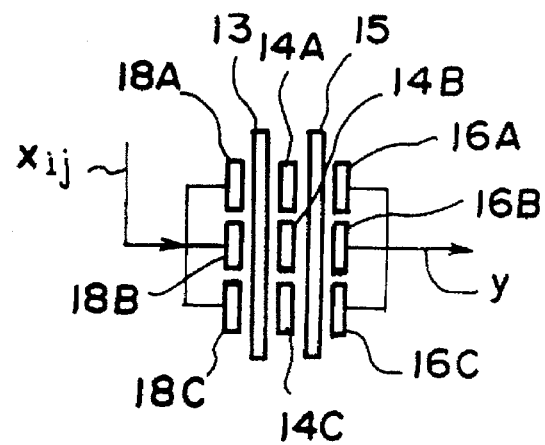
FIG. 7 is a schematic view showing a modification of the first or second embodiment of the self-organizing pattern learning system in accordance with the present invention, wherein light emitting devices are employed in lieu of optical input devices.

For example, as illustrated in FIG. 7, the optical input devices 1A, 1B, and 1C shown in FIG. 2 may be constituted of light emitting devices 18A, 18B, and 18C, which emit light in accordance with an input pattern. The light emitting devices 18A, 18B, and 18C may be constituted of LED arrays, or the like. With the modification of FIG. 7, light carrying the input pattern xij(t) is emitted by each of the light emitting devices 18A, 18B, and 18C. The input pattern xij(t) is presented via the polarizer 13 to each of the storing/displaying light valves 14A, 14B, and 14C. The degrees of correlation between the input pattern xij(t) and the memory patterns, which are stored in the storing/displaying light valves 14A, 14B, and 14C, are detected by the correlation output detector arrays 16A, 16B, and 16C. Alternatively, in the same manner as that shown in FIG. 5, the polarizer 13 shown in FIG. 7 may be omitted, and the degrees of correlation may be obtained which are calculated from the absolute values of the differences between the input pattern xij(t) and the memory patterns mklij(t−1) stored in the storing/displaying light valves 14A, 14B, and 14C.

A second fundamental concept behind the self-organizing pattern learning system in accordance with the present invention will be described hereinbelow.

Figure 8:
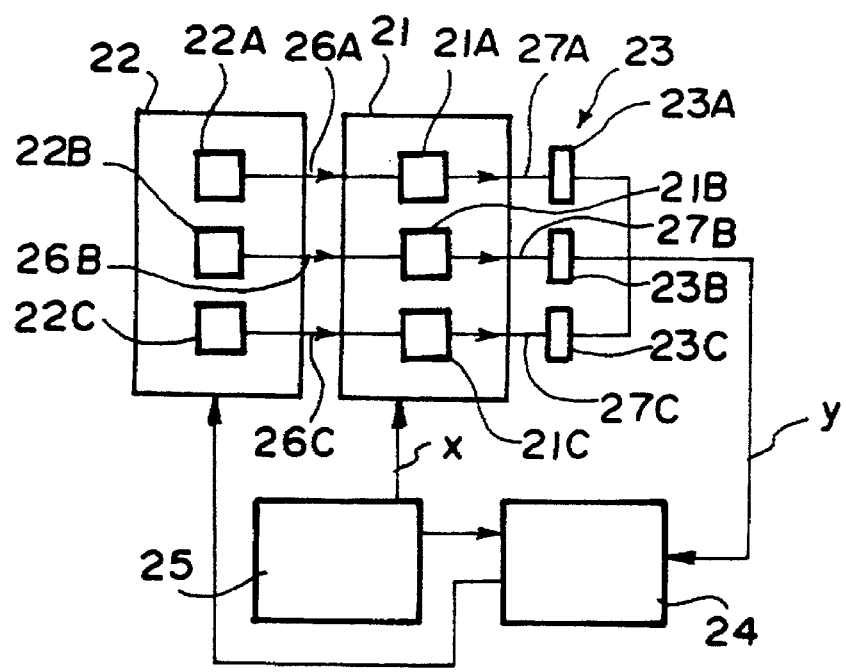
FIG. 8 is a schematic view showing a second fundamental concept behind the self-organizing pattern learning system in accordance with the present invention.

FIG. 8 is a schematic view showing the second fundamental concept behind the self-organizing pattern learning system in accordance with the present invention.

As illustrated in FIG. 8, in the second fundamental concept in accordance with the present invention, the self-organizing pattern learning system comprises a pattern input means 21, an optical modulating device group 22, a correlation detecting device group 23, and an operation means 24.

The optical modulating device group 22 serves as a pattern storing means and comprises a plurality of optical modulating devices 22A, 22B, and 22C, which store patterns presented thereto and modulate incident light in accordance with the stored patterns. The plurality of the optical modulating devices 22A, 22B, and 22C are arrayed in one direction or in two directions (in this case, three optical modulating devices 22A, 22B, and 22C are arrayed in one direction).

The pattern input means 21 serves as an input pattern displaying means and comprises a plurality of optical input devices 21A, 21B, and 21C, which are respectively located at positions adjacent to the optical modulating devices 22A, 22B, and 22C and which present a new input pattern x to the optical modulating devices 22A, 22B, and 22C. The pattern input means 21 also comprises an input means 25, which presents the input pattern x to each of the optical input devices 21A, 21B, and 21C.

The correlation detecting device group 23 serves as a photo detecting means and comprises a plurality of correlation detecting devices 23A, 23B, and 23C, which are respectively located at positions adjacent to the optical input devices 21A, 21B, and 21C. The correlation detecting devices 23A, 23B, and 23C detect degrees of correlation y between the memory patterns, which are stored in the optical modulating devices 22A, 22B, and 22C of the optical modulating device group 22 and the input pattern x, which has been presented to each of the optical input devices 21A, 21B, and 21C.

The operation means 24 comprises a learning pattern creating means and a memory pattern updating means. The learning pattern creating means creates learning patterns in accordance with the degrees of correlation y, which have been detected by the correlation detecting devices 23A, 23B, and 23C, and the input pattern x. The memory pattern updating means updates the memory patterns, which are stored in the optical modulating devices 22A, 22B, and 22C, in accordance with the learning patterns, which have been created by the learning pattern creating means.

First, the input pattern x is presented by the input means 25 to each of the optical input devices 21A, 21B, and 21C of the pattern input means 21. By way of example, light is irradiated to each of the optical modulating devices 22A, 22B, and 22C of the optical modulating device group 22. The optical modulating devices 22A, 22B, and 22C store memory patterns, which have been learned in accordance with input patterns presented previously. In this manner, light carrying each of the memory patterns, which are stored in the optical modulating devices 22A, 22B, and 22C, is radiated out of each of the optical modulating devices 22A, 22B, and 22C. Each of the memory patterns is thereby presented to each of the optical input devices 21A, 21B, and 21C of the pattern input means 21. Light 26A, light 26B, and light 26C, which have been radiated out of the optical modulating devices 22A, 22B, and 22C, respectively pass through the optical input devices 21A, 21B, and 21C. As a result, optical superposition patterns 27A, 27B, and 27C are obtained from the superposition of the memory patterns, which are stored in the optical modulating devices 22A, 22B, and 22C, upon the input pattern x. Each of the correlation detecting devices 23A, 23B, and 23C of the correlation detecting device group 23 detects the sum of the amounts of light carrying the corresponding optical superposition pattern. The sum of the amounts of light carrying each of the optical superposition patterns 27A, 27B, and 27C is thus detected as the degree of correlation y by each of the correlation detecting devices 23A, 23B, and 23C. The signals representing the degrees of correlation y, which have been detected by the correlation detecting devices 23A, 23B, and 23C, are fed into the operation means 24. The operation means 24 stores the input pattern x presented by the input means 25. The operation means 24 weights the input pattern x with the degrees of correlation y, which have been detected by the correlation detecting devices 23A, 23B, and 23C, and learning patterns are thereby created. Thereafter, the memory patterns, which are stored in the optical modulating devices 22A, 22B, and 22C of the optical modulating device group 22, are updated in accordance with the learning patterns, which have been created by the operation means 24.

As described above, the second fundamental concept in accordance with the present invention is basically equivalent to the first fundamental concept in accordance with the present invention, except that the position of the optical modulating device group, which serves as the pattern storing means, and the position of the pattern input means, which serves as the input pattern displaying means, are reversed.

Embodiments of the self-organizing pattern learning system in accordance with the present invention, wherein the second fundamental concept described above is employed, will be described hereinbelow.

Figure 9:
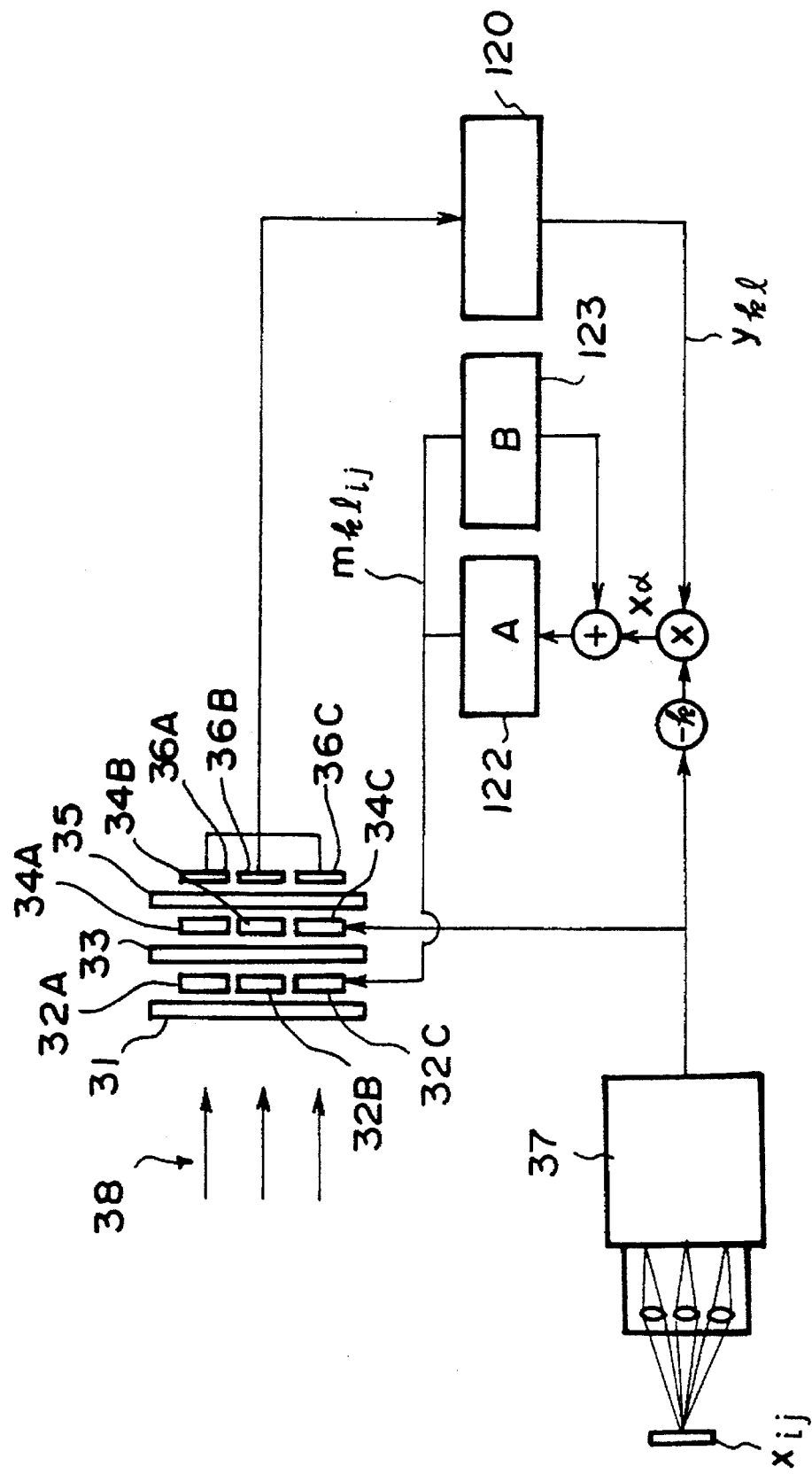
FIG. 9 is a schematic view showing a third embodiment of the self-organizing pattern learning system in accordance with the present invention.

FIG. 9 is a schematic view showing a third embodiment of the self-organizing pattern learning system in accordance with the present invention, wherein the second fundamental concept described above is employed.

With reference to FIG. 9, the third embodiment of the self-organizing pattern learning system in accordance with the present invention is provided with an optical system. The optical system comprises a polarizer 31, which receives and polarizes reading light 38 having been produced by a light source (not shown). The optical system also comprises k×1 number (in this embodiment, 3×1 number) of storing/displaying light valves 32A, 32B, and 32C, which have i×j number of picture elements and are arrayed at positions adjacent to the polarizer 31. The optical system further comprises a polarizer 33, which is adjacent to the storing/displaying light valves 32A, 32B, and 32C. The optical system still further comprises k×1 number (in this embodiment, 3×1 number) of input light valves 34A, 34B, and 34C, which have i×j number of picture elements and are arrayed at positions adjacent to the polarizer 33 so as to correspond to the storing/displaying light valves 32A, 32B, and 32C. The optical system also comprises a polarizer 35, which is adjacent to the input light valves 34A, 34B, and 34C. The optical system further comprises correlation output detector arrays 36A, 36B, and 36C, which are arrayed at positions adjacent to the polarizer 35 so as to correspond to the input light valves 34A, 34B, and 34C.

In the third embodiment, as in the aforesaid first embodiment, a liquid crystal display device (LCD) is employed as each of the light valves.

The third embodiment is also provided with a processing system for updating the memory patterns. The processing system comprises a memory pattern buffer A 122, a memory pattern buffer B 123, and a learning enabling pattern buffer 120, which are basically equivalent to those shown in FIG. 1 and FIG. 4. In this embodiment, an input pattern xij(t) is presented by a multiple image forming camera 37.

First, the input pattern xij(t), which has been recorded by the multiple image forming camera 37, is displayed on each of the input light valves 34A, 34B, and 34C. Thereafter, the reading light 38 passes through the polarizer 31 and is then irradiated to the storing/displaying light valves 32A, 32B, and 32C. The memory pattern buffer A 122 store patterns, which have been presented before the time t, as memory patterns mklij(t−1) in accordance with a certain rule. The storing/displaying light valves 32A, 32B, and 32C display the memory patterns, which are stored in the memory pattern buffer A 122. The reading light 38, which has been irradiated to the storing/displaying light valves 32A, 32B, and 32C, is modulated with each of the memory patterns mklij(t−1), which are stored in each of the storing/displaying light valves 32A, 32B, and 32C. The reading light 38, which has thus been modulated, passes through the polarizer 33 and is then irradiated as an optical intensity pattern to each of the input light valves 34A, 34B, and 34C. In each of the input light valves 34A, 34B, and 34C, the optical pattern of the reading light 38, which has passed through each of the storing/displaying light valves 32A, 32B, and 32C, is superposed upon the input pattern, which is displayed on each of the input light valves 34A, 34B, and 34C. The memory patterns mklij(t−1), which are stored in the memory pattern buffer A 122, are moved into the memory pattern buffer B 123. By way of example, as illustrated in FIG. 3, the pattern of the character A is displayed on each of the input light valves 34A, 34B, and 34C, and the patterns of the characters A, B, and C are respectively displayed as the memory patterns on the storing/displaying light valves 32A, 32B, and 32C. In such cases, optical superposition patterns indicated by 3A, 3B, and 3C in FIG. 3 are obtained from the superpositions of the input pattern A upon the memory patterns A, B, and C.

Each of the optical superposition patterns passes through the polarizer 35. Thereafter, the sum of the amounts of light carrying each optical superposition pattern is detected by each of the correlation output detector arrays 36A, 36B, and 36C. By each of the correlation output detector arrays 36A, 36B, and 36C, the information about brightness and darkness of the superposition pattern, i.e. the information representing the brightness of the entire area of the superposition pattern, which is obtained from the superposition of the input pattern xij(t) upon each of the memory patterns mklij(t−1), is detected as the degree of correlation ykl(t) between the input pattern xij(t) and each of the memory patterns mklij(t−1). Specifically, the result of the product calculations represented by the formula $$y_{kl}(t) = \sum_{ij} (x_{ij}(t) \times m_{klij}(t-1)) \quad (4)$$

is detected as the degree of correlation ykl(t) between the input pattern xij(t) and each of the memory patterns mklij (t−1).

The signals representing the degrees of correlation ykl(t), which have been detected by the correlation output detector arrays 36A, 36B, and 36C, are fed into and temporarily stored in the learning enabling pattern buffer 120 of the processing system. In the processing system, a bias component k is subtracted from the input pattern xij(t), which has been presented by the multiple image forming camera 37. The subtraction is represented by the formula xij(t)−k. Thereafter, a scalar multiplication is carried out on each of the degrees of correlation ykl(t), which are stored in the learning enabling pattern buffer 120, and the value of xij(t)−k. The scalar multiplication is represented by the formula ykl(t)×(xij(t)−k). A scalar multiplication is then carried out on each of the scalar products ykl(t)×(xij(t)−k) and a learning factor α. This scalar multiplication is represented by the formula α×(ykl(t)×(xij(t)−k)). Thereafter, the scalar product thus obtained for each light valve and the memory pattern mklij(t−1), which is stored for the same light valve in the memory pattern buffer B 123, are added to each other. In this manner, new memory patterns mklij(t) are calculated as the learning patterns. The calculation is represented by the formula $$m_{klij}(t) = m_{klij}(t-1) + \alpha((x_{ij}(t) - k) \times y_{kl}(t))) \quad (9)$$

The new memory patterns mklij(t) are stored in the memory pattern buffer A 122 and used during the operations for updating the memory patterns, i.e. during the learning operations. Also, the contents of the memory pattern buffer A 122 are copied to the memory pattern buffer B 123.

In the third embodiment described above, the input pattern presented at the time t is A. As illustrated in FIG. 3, the pattern A is stored as the memory pattern in the storing/displaying light valve 32A. Also, the pattern B is stored as the memory pattern in the storing/displaying light valve 32B, and the pattern C is stored as the memory pattern in the storing/displaying light valve 32C. Therefore, the degree of correlation between the input pattern A and the memory pattern, which is stored in the storing/displaying light valve 32A, is high. Also, the degree of correlation between the input pattern A and each of the memory patterns, which are stored in the storing/displaying light valves 32B and 32C, is low. Accordingly, the pattern A is written as a new memory pattern with a large weight in the storing/displaying light valve 32A. Also, in the storing/displaying light valves 32B and 32C, the pattern A is not written or is written only with a small weight. In cases where the input pattern is B, the pattern B is written with a large weight in the storing/displaying light valve 32B. In cases where the input pattern is C, the pattern C is written with a large weight in the storing/displaying light valve 32C. In this manner, the operations for updating the memory patterns, i.e. the learning operations, are carried out. Specifically, the memory patterns are updated in accordance with the degrees of correlation.

The operations described above are iterated, and the memory patterns mklij(t−1) are thereby updated with the weights corresponding to the degrees of correlation between various input patterns, which are presented to the input light valves 34A, 34B, and 34C, and the patterns, which are displayed on the storing/displaying light valves 32A, 32B, and 32C in accordance with the contents stored in the memory pattern buffer A 122 and the memory pattern buffer B 123. In this manner, the self-organizing learning operations are carried out.

In the third embodiment described above, the degrees of correlation between the input pattern and the memory patterns are calculated with Formula (4)

$$y_{kl}(t) = \sum_{ij} (x_{ij}(t) \times m_{klij}(t-1)) \quad (4)$$

Specifically, the degrees of correlation calculated from products are obtained from the storing/displaying light valves 32A, 32B, and 32C and the input light valves 34A, 34B, and 34C. Alternatively, the degrees of correlation calculated from differences may be obtained by modifying the optical system.

Specifically, the polarizer 33 may be omitted from the optical system shown in FIG. 9. With such a modification, as in the second embodiment of the self-organizing pattern learning system in accordance with the present invention, which is shown in FIG. 5, the degrees of correlation, which are calculated from the absolute values of the differences between the memory patterns mklij(t−1) stored in the storing/displaying light valves 32A, 32B, and 32C and the input pattern xij(t) displayed on each of the input light valves 34A, 34B, and 34C, are detected by the correlation output detector arrays 36A, 36B, and 36C.

In this manner, the degrees of correlation may be detected as the absolute values of the differences between the memory patterns mklij(t−1), which are stored in the storing/displaying light valves 32A, 32B, and 32C, and the input pattern xij(t), which is displayed on each of the input light valves 34A, 34B, and 34C. In such cases, the learning operations in the storing/displaying light valves 32A, 32B, and 32C, i.e. the operations for updating the memory patterns, can be carried out in the same manner as that in the third embodiment.

In the aforesaid third embodiment of the self-organizing pattern learning system in accordance with the present invention, the reading light 38, which has been produced by a light source (not shown), is irradiated to the storing/displaying light valves 32A, 32B, and 32C. The memory patterns are thereby presented to the input light valves 34A, 34B, and 34C. The presentation of the memory patterns may be carried out in a different manner.

Figure 10:
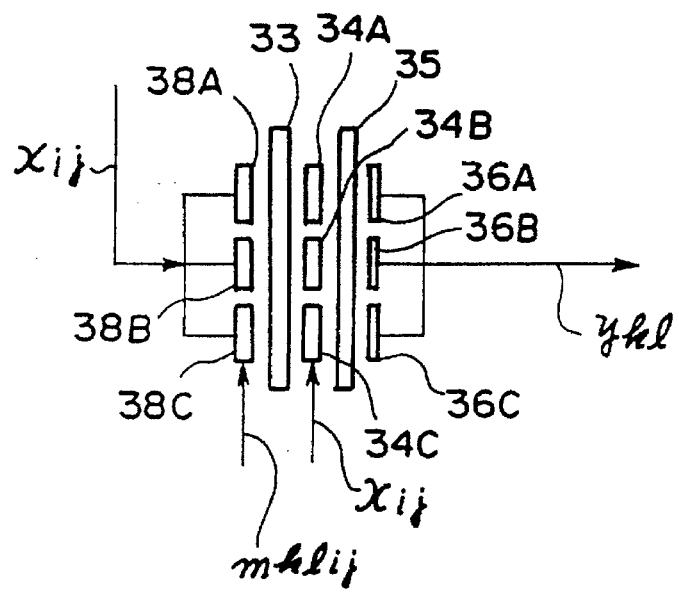
FIG. 10 is a schematic view showing a modification of the third embodiment of the self-organizing pattern learning system in accordance with the present invention, wherein light emitting devices are employed in lieu of optical input devices.

For example, as illustrated in FIG. 10, the storing/displaying light valves 32A, 32B, and 32C shown in FIG. 9 may be replaced by light emitting devices 38A, 38B, and 38C, which emit light in accordance with memory patterns. The light emitting devices 38A, 38B, and 38C may be constituted of LED arrays, or the like. With the modification of FIG. 10, light carrying each of the memory patterns mklij(t−1) is emitted by each of the light emitting devices 38A, 38B, and 38C. Each of the memory patterns mklij(t−1) is presented via the polarizer 33 to each of the input light valves 34A, 34B, and 34C. The degrees of correlation between the memory patterns mklij(t−1) and the input pattern xij(t), which is displayed on each of the input light valves 34A, 34B, and 34C, are detected by the correlation output detector arrays 36A, 36B, and 36C. Alternatively, the polarizer 33 shown in FIG. 10 may be omitted, and the degrees of correlation may be obtained which are calculated from the absolute values of the differences between the memory patterns mklij(t−1) and the input pattern xij(t).

A third fundamental concept behind the self-organizing pattern learning system in accordance with the present invention will be described hereinbelow.

Figure 11:
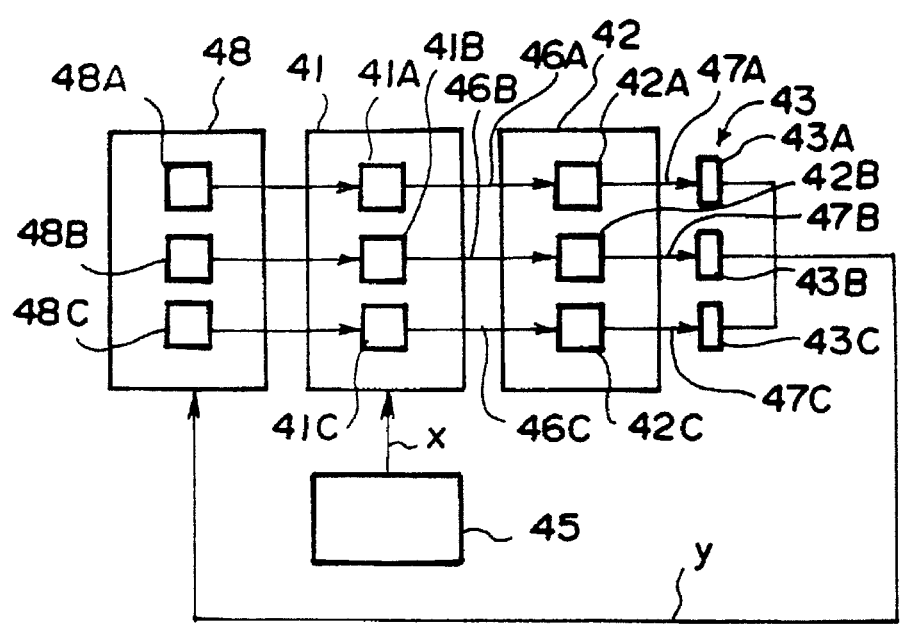
FIG. 11 is a schematic view showing a third fundamental concept behind the self-organizing pattern learning system in accordance with the present invention.

FIG. 11 is a schematic view showing the third fundamental concept behind the self-organizing pattern learning system in accordance with the present invention.

As illustrated in FIG. 11, in the third fundamental concept in accordance with the present invention, the self-organizing pattern learning system comprises a pattern input means 41, an optical modulating device group 42, a correlation detecting device group 43, and an optical control means 48.

The optical modulating device group 42 serves as a pattern storing means and comprises a plurality of optical modulating devices 42A, 42B, and 42C. The plurality of the optical modulating devices 42A, 42B, and 42C optically store patterns, which are presented thereto by light having a predetermined wavelength distribution. Also, the plurality of the optical modulating devices 42A, 42B, and 42C modulate incident light, which has a wavelength distribution different from the predetermined wavelength distribution, in accordance with the stored patterns. The plurality of the optical modulating devices 42A, 42B, and 42C are arrayed in one direction or in two directions (in this case, three optical modulating devices 42A, 42B, and 42C are arrayed in one direction).

The pattern input means 41 serves as an input pattern displaying means and comprises a plurality of optical input devices 41A, 41B, and 41C, which are respectively located at positions adjacent to the optical modulating devices 42A, 42B, and 42C and which present a new input pattern x to the optical modulating devices 42A, 42B, and 42C. The pattern input means 41 also comprises an input means 45, which presents the input pattern x to each of the optical input devices 41A, 41B, and 41C.

The correlation detecting device group 43 serves as a photo detecting means and comprises a plurality of correlation detecting devices 43A, 43B, and 43C, which are respectively located at positions adjacent to the optical modulating devices 42A, 42B, and 42C. The correlation detecting devices 43A, 43B, and 43C detect degrees of correlation y between the input pattern x, which has been presented to each of the optical input devices 41A, 41B, and 41C, and the memory patterns, which are stored in the optical modulating devices 42A, 42B, and 42C of the optical modulating device group 42.

The optical control means 48 comprises a plurality of optical control devices 48A, 48B, and 48C, which are respectively located at positions adjacent to the optical input devices 41A, 41B, and 41C. The optical control devices 48A, 48B, and 48C alternately present the light, which has the predetermined wavelength distribution, and the light having the wavelength distribution different from the predetermined wavelength distribution, to the optical modulating devices 42A, 42B, and 42C. The optical control means 48 is provided with a learning pattern creating means and a memory pattern updating means. The learning pattern creating means and the memory pattern updating means weight the intensity of the light, which has the predetermined wavelength distribution, in accordance with degrees of correlation y, which have been detected by the correlation detecting devices 43A, 43B, and 43C. The learning pattern creating means and the memory pattern updating means thus control the intensity of the light, which has the predetermined wavelength distribution, with respect to each of the optical input devices 41A, 41B, and 41C. In this manner, the learning pattern creating means and the memory pattern updating means present the light, which has the predetermined wavelength distribution, as learning patterns corresponding to the degrees of correlation to the optical modulating devices 42A, 42B, and 42C and update the memory patterns, which are stored in the optical modulating devices 42A, 42B, and 42C.

First, the input pattern x is presented by the input means 45 to each of the optical input devices 41A, 41B, and 41C of the pattern input means 41. Thereafter, the light having the wavelength distribution different from the predetermined wavelength distribution is irradiated by the optical control devices 48A, 48B, and 48C of the optical control means 48 to the optical input devices 41A, 41B, and 41C. The light is modulated in accordance with the input pattern x, which is displayed on each of the optical input devices 41A, 41B, and 41C. The modulated light is presented to each of the optical modulating devices 42A, 42B, and 42C of the optical modulating device group 42.

The optical modulating devices 42A, 42B, and 42C store memory patterns, which have been learned in accordance with input patterns having been presented previously. Light 46A, light 46B, and light 46C, which have been radiated out of the optical input devices 41A, 41B, and 41C, respectively pass through the optical modulating devices 42A, 42B, and 42C. As a result, optical superposition patterns 47A, 47B, and 47C are obtained from the superposition of the input pattern x upon the memory patterns, which are stored in the optical modulating devices 42A, 42B, and 42C. Each of the correlation detecting devices 43A, 43B, and 43C of the correlation detecting device group 43 detects the sum of the amounts of light carrying the corresponding optical superposition pattern. The sum of the amounts of light carrying each of the optical superposition patterns 47A, 47B, and 47C is thus detected as the degree of correlation y by each of the correlation detecting devices 43A, 43B, and 43C. The signals representing the degrees of correlation y, which have been detected by the correlation detecting devices 43A, 43B, and 43C, are fed into the optical control means 48. In each of the optical control devices 48A, 48B, and 48C of the optical control means 48, the intensity control is carried out such that the light having the predetermined wavelength distribution may be weighted in accordance with each of the degrees of correlation y, which have been detected by the correlation detecting devices 43A, 43B, and 43C. The weighted light having the predetermined wavelength distribution is irradiated by each of the optical control devices 48A, 48B, and 48C to each of the optical input devices 41A, 41B, and 41C and modulated in accordance with the input pattern, which is displayed on each of the optical input devices 41A, 41B, and 41C. The modulated light is presented to each of the optical modulating devices 42A, 42B, and 42C of the optical modulating device group 42. Each of the optical modulating devices 42A, 42B, and 42C is capable of optically storing a pattern, which is presented by the light having the predetermined wavelength distribution. Therefore, the memory pattern carried by the light having the predetermined wavelength distribution, which has been modulated in each of the optical input devices 41A, 41B, and 41C, is superposed upon the memory pattern stored in each of the optical modulating devices 42A, 42B, and 42C. The superposition pattern resulting from the superposition of the memory patterns upon each other is stored in each of the optical modulating devices 42A, 42B, and 42C. The operations described above are iterated, and the memory patterns, which are stored in the optical modulating devices 42A, 42B, and 42C of the optical modulating device group 42, are thereby updated (i.e. the learning operations are thereby carried out).

Embodiments of the self-organizing pattern learning system in accordance with the present invention, wherein the third fundamental concept described above is employed, will be described hereinbelow.

Figure 12:
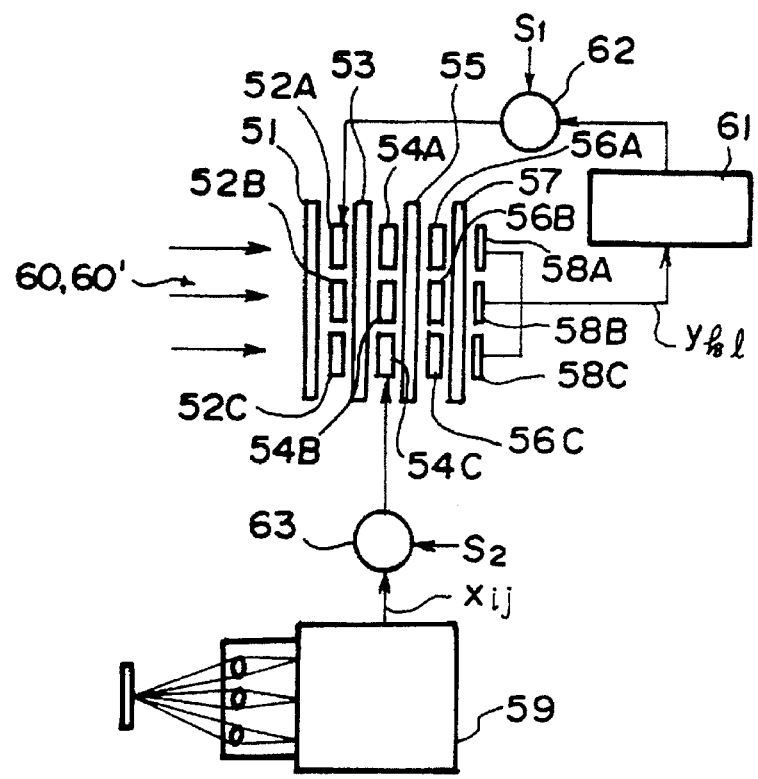
FIG. 12 is a schematic view showing a fourth embodiment of the self-organizing pattern learning system in accordance with the present invention.

FIG. 12 is a schematic view showing a fourth embodiment of the self-organizing pattern learning system in accordance with the present invention, wherein the third fundamental concept described above is employed.

In the fourth embodiment, the light having the predetermined wavelength distribution falls within the range of blue light to ultraviolet light. The light having the wavelength distribution different the predetermined wavelength distribution falls within the range of red light to infrared light. As each of the optical modulating devices, a storing/displaying light valve, in which the information can be written with light falling within the range of blue light to ultraviolet light and which transmits light falling within the range of red light to infrared light, is employed. The storing/displaying light valve may be constituted of a bismuth silicon oxide photo refractive optical modulator (BSO-PROM), or the like. Also, a light valve, such as a liquid crystal display device (LCD), is employed as each of the optical input devices and each of the optical control devices.

With reference to FIG. 12, the fourth embodiment of the self-organizing pattern learning system in accordance with the present invention is provided with an optical system. The optical system comprises a polarizer 51, which receives and polarizes reading light 60 having been produced by a light source (not shown). The optical system also comprises k×1 number (in this embodiment, 3×1 number) of optical control light valves 52A, 52B, and 52C, which are arrayed at positions adjacent to the polarizer 51. The optical system further comprises a polarizer 53, which is adjacent to the optical control light valves 52A, 52B, and 52C. The optical system still further comprises k−1 number (in this embodiment, 3×1 number) of input light valves 54A, 54B, and 54C, which have i×j number of picture elements and are arrayed at positions adjacent to the polarizer 53 so as to correspond to the optical control light valves 52A, 52B, and 52C. The optical system also comprises a polarizer 55, which is adjacent to the input light valves 54A, 54B, and 54C. The optical system further comprises k×1 number (in this embodiment, 3×1 number) of storing/displaying light valves 56A, 56B, and 56C, which have i×j number of picture elements and are arrayed at positions adjacent to the polarizer 55 so as to correspond to the input light valves 54A, 54B, and 54C. The optical system still further comprises a polarizer 57, which is adjacent to the storing/displaying light valves 56A, 56B, and 56C. The optical system also comprises correlation output detector arrays 58A, 58B, and 58C, which are arrayed at positions adjacent to the polarizer 57 so as to correspond to the storing/displaying light valves 56A, 56B, and 56C. In this embodiment, an input pattern xij(t) is presented by a multiple image forming camera 59.

First, the input pattern xij(t), which has been recorded by the multiple image forming camera 59, is displayed on each of the input light valves 54A, 54B, and 54C. Thereafter, the reading light 60, which falls within the range of red light to infrared light, is produced by a light source (not shown). The reading light 60 passes through the polarizer 51 and the optical control light valves 52A, 52B, and 52C and is then irradiated to the input light valves 54A, 54B, and 54C. At this time, a uniform signal S1 is fed through a switch 62 into the optical control light valves 52A, 52B, and 52C. Therefore, at this time, no modulation is carried out in the optical control light valves 52A, 52B, and 52C, and the optical control light valves 52A, 52B, and 52C merely transmit light. The reading light 60, which has been irradiated to the input light valves 54A, 54B, and 54C, is modulated with the input pattern xij(t), which is displayed on each of the input light valves 54A, 54B, and 54C. The reading light 60, which has thus been modulated, passes through the polarizer 55 and is then irradiated as an optical intensity pattern to each of the storing/displaying light valves 56A, 56B, and 56C. The storing/displaying light valves 56A, 56B, and 56C store patterns, which have been presented before the time t, as memory patterns mklij(t−1) in accordance with a certain rule. Therefore, in each of the storing/displaying light valves 56A, 56B, and 56C, the optical pattern of the reading light 60, which has passed through each of the input light valves 54A, 54B, and 54C, is superposed upon each of the memory patterns, which are displayed on the storing/displaying light valves 56A, 56B, and 56C. By way of example, as illustrated in FIG. 3, the pattern of the character A is displayed on each of the input light valves 54A, 54B, and 54C, and the patterns of the characters A, B, and C are respectively displayed as the memory patterns on the storing/displaying light valves 56A, 56B, and 56C. In such cases, optical superposition patterns indicated by 3A, 3B, and 3C in FIG. 3 are obtained from the superpositions of the input pattern A upon the memory patterns A, B, and C.

Each of the optical superposition patterns passes through the polarizer 57. Thereafter, the sum of the amounts of light carrying each optical superposition pattern is detected by each of the correlation output detector arrays 58A, 58B, and 58C. By each of the correlation output detector arrays 58A, 58B, and 58C, the information about brightness and darkness of the superposition pattern, i.e. the information representing the brightness of the entire area of the superposition pattern, which is obtained from the superposition of the input pattern xij(t) upon each of the memory patterns mklij(t−1), is detected as the degree of correlation ykl(t) between the input pattern xij(t) and each of the memory patterns mklij(t−1). Specifically, the result of the product calculations represented by the formula $$y_{kl}(t) = \sum_{ij} (x_{ij}(t) \times m_{klij}(t-1)) \quad (4)$$

is detected as the degree of correlation ykl(t) between the input pattern xij(t) and each of the memory patterns mklij (t−1).

The signals representing the degrees of correlation ykl(t), which have been detected by the correlation output detector arrays 58A, 58B, and 58C, are fed into and temporarily stored in a learning enabling pattern buffer 61 of a processing system.

Thereafter, the setting of the switch 62 is changed over, and the signals representing the degrees of correlation ykl(t), which have been detected by the correlation output detector arrays 58A, 58B, and 58C, are fed from the learning enabling pattern buffer 61 into the optical control light valves 52A, 52B, and 52C. In the optical control light valves 52A, 52B, and 52C, density modulations are carried out in accordance with the degrees of correlation ykl(t), which have been detected by the corresponding correlation output detector arrays 58A, 58B, and 58C. Specifically, in an optical control light valve corresponding to a correlation output detector array, which detected a high degree of correlation, little density modulation is carried out. In an optical control light valve corresponding to a correlation output detector array, which detected a low degree of correlation, density modulation is carried out to a high extent.

Thereafter, writing light 60', which falls within the range of blue light to ultraviolet light, is produced by a light source (not shown). The writing light 60' passes through the polarizer 51 and is irradiated to the optical control light valves 52A, 52B, and 52C. In each of the optical control light valves 52A, 52B, and 52C, density modulation has been carried out in accordance with the received degree of correlation. Therefore, the intensity of the writing light 60' is modulated in each of the optical control light valves 52A, 52B, and 52C. The writing light 60', the intensity of which has thus been modulated, passes through the polarizer 53 and is irradiated to each of the input light valves 54A, 54B, and 54C. The writing light 60' is thus modulated in accordance with the input pattern xij(t), which is displayed on each of the input light valves 54A, 54B, and 54C. The writing light 60', which has thus been modulated in accordance with the input pattern xij(t), passes through the polarizer 55 and is presented as an optical intensity pattern to each of the storing/displaying light valves 56A, 56B, and 56C. At this time, to a storing/displaying light valve, which stores a memory pattern that has been detected as having a high degree of correlation with the input pattern, the input pattern, which has a high intensity, i.e. which has been weighted strongly, is presented as a learning pattern by the corresponding optical control light valve 52A, 52B, or 52C. Also, to a storing/displaying light valve, which stores a memory pattern that has been detected as having a low degree of correlation with the input pattern, the input pattern, which has a low intensity, i.e. which has been weighted weakly (or which has not been weighted), is presented as a learning pattern by the corresponding optical control light valve 52A, 52B, or 52C. The writing light 60' falls within the range of blue light to ultraviolet light, and an optical pattern can be written with the writing light 60' in each of the storing/displaying light valves 56A, 56B, and 56C. Therefore, the learning pattern, which has been weighted in accordance with the degree of correlation between each of the memory patterns stored in the storing/displaying light valves 56A, 56B, and 56C and the input pattern, is written upon each of the memory patterns stored in the storing/displaying light valves 56A, 56B, and 56C. In this manner, the operations for updating the memory patterns, i.e. the learning operations, are carried out.

The operations described above are iterated, and the memory patterns mklij(t−1) are thereby updated with the weights corresponding to the degrees of correlation between various input patterns, which are presented to the input light valves 54A, 54B, and 54C, and the memory patterns, which are stored in the storing/displaying light valves 56A, 56B, and 56C. In this manner, the self-organizing learning operations are carried out.

In the fourth embodiment described above, the degrees of correlation between the input pattern and the memory patterns are calculated with Formula (4). Specifically, the degrees of correlation calculated from products are obtained from the input light valves 54A, 54B, and 54C and the storing/displaying light valves 56A, 56B, and 56C. Alternatively, the degrees of correlation calculated from differences may be obtained by modifying the optical system shown in FIG. 12.

Figure 13:
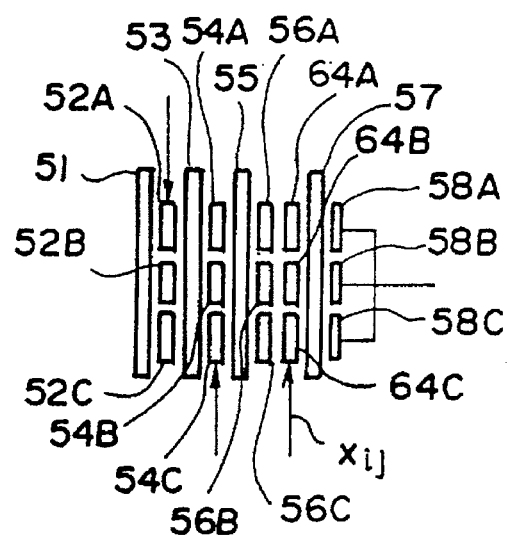
FIG. 13 is a schematic view showing a modification of the fourth embodiment of the self-organizing pattern learning system in accordance with the present invention, wherein difference correlations are detected.

Specifically, as illustrated in FIG. 13, second input light valves 64A, 64B, and 64C may be located between the storing/displaying light valves 56A, 56B, and 56C and the polarizer 57 of the self-organizing pattern learning system shown in FIG. 12. The second input light valves 64A, 64B, and 64C are respectively located at positions adjacent to the storing/displaying light valves 56A, 56B, and 56C. When the degrees of correlation are to be detected, a uniform signal is fed into the first input light valves 54A, 54B, and 54C such that they may merely transmit the reading light 60. Also, an input pattern is displayed on each of the second input light valves 64A, 64B, and 64C. With such a modification, as in the second embodiment of the self-organizing pattern learning system in accordance with the present invention, which is shown in FIG. 5, the degrees of correlation, which are calculated from the absolute values of the differences between the memory patterns stored in the storing/displaying light valves 56A, 56B, and 56C and the input pattern displayed on each of the second input light valves 64A, 64B, and 64C, are detected by the correlation output detector arrays 58A, 58B, and 58C.

In this manner, the degrees of correlation may be detected as the absolute values of the differences between the memory patterns, which are stored in the storing/displaying light valves 56A, 56B, and 56C, and the input pattern. In such cases, the learning operations in the storing/displaying light valves 56A, 56B, and 56C, i.e. the operations for updating the memory patterns, can be carried out in the same manner as that in the fourth embodiment.

Also, in the fourth embodiment, when the learning operations are iterated, the setting of a switch 63 shown in FIG. 12 may be changed over such that a uniform signal S2 may be fed into the input light valves 54A, 54B, and 54C. When the uniform signal S2 is fed into the input light valves 54A, 54B, and 54C, a uniform pattern is displayed on each of the input light valves 54A, 54B, and 54C. Therefore, the uniform pattern is stored in each of the storing/displaying light valves 56A, 56B, and 56C. In cases where patterns, which were stored at the initial stage of the learning operations of the storing/displaying light valves 56A, 56B, and 56C, remain faintly, the remaining patterns can be erased by presenting the uniform pattern to each of the storing/displaying light valves 56A, 56B, and 56C. In this manner, the patterns stored faintly in the storing/displaying light valves 56A, 56B, and 56C can be erased by feeding the uniform signal S2 into the input light valves 54A, 54B, and 54C during the learning operations. Accordingly, it is possible to eliminate the problems in that, when the learning operations are finished, a pattern other than the final memory pattern is superposed upon the final memory pattern in each of the storing/displaying light valves 56A, 56B, and 56C. Further, in such cases, instead of the uniform electric signal S2 being fed into the input light valves 54A, 54B, and 54C, the erasing of remaining patterns may be carried out by irradiating uniform light to the storing/displaying light valves 56A, 56B, and 56C.

Further, the fourth embodiment described above may be modified as illustrated in FIG. 14 such that the polarizer 53 may be omitted. In such cases, the information representing the degrees of correlation calculated from the absolute values of the differences is transferred from the optical control light valves 52A, 52B, and 52C to the input light valves 54A, 54B, and 54C.

Moreover, the fourth embodiment described above may be modified such that, instead of the illumination means (not shown) being used, light emitting devices, which emit light carrying an input pattern, may be located for the corresponding optical control light valves 52A, 52B, and 52C. The intensity of the light carrying the input pattern emitted by each of the light emitting devices is modulated by each of the optical control light valves 52A, 52B, and 52C, which have been modulated in accordance with the degrees of correlation. In this manner, learning patterns are created and used in the operations for updating the memory patterns stored in the storing/displaying light valves 56A, 56B, and 56C.

Figure 15:
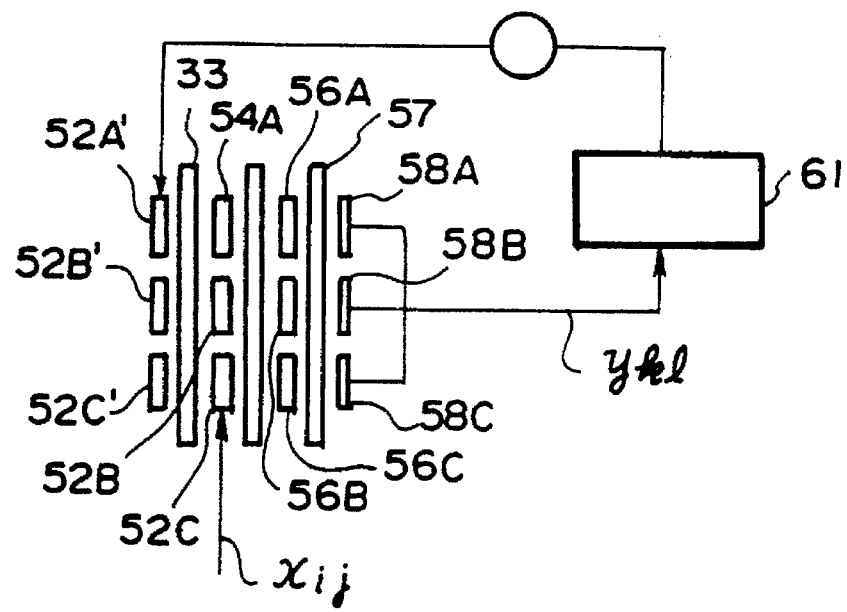
FIG. 15 is a schematic view showing a further different modification of the fourth embodiment of the self-organizing pattern learning system in accordance with the present invention, wherein light emitting devices are employed in lieu of optical control light valves.

Also, in the fourth embodiment described above, the optical control light valves 52A, 52B, and 52C are modulated in accordance with the degrees of correlation, and the light produced by the light source (not shown) is modulated by the optical control light valves 52A, 52B, and 52C. Alternatively, as illustrated in FIG. 15, in lieu of the optical control light valves 52A, 52B, and 52C, light emitting devices 52A', 52B', and 52C', each of which emits light having the intensity corresponding to the degree of correlation, may be located so as to correspond to the input light valves 54A, 54B, and 54C.

Figure 16:
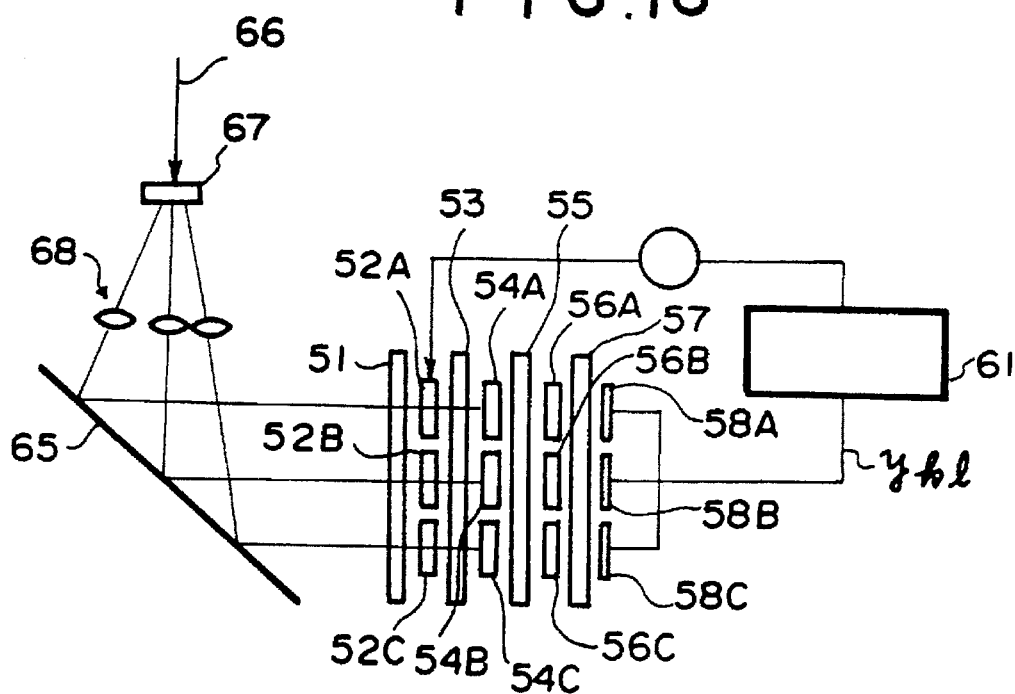
FIG. 16 is a schematic view showing a still further different modification of the fourth embodiment of the self-organizing pattern learning system in accordance with the present invention, wherein an input pattern is optically presented to input light valves.

Further, in the fourth embodiment described above, the multiple image forming camera 59 is employed as the means for displaying the input pattern xij(t) on each of the input light valves 54A, 54B, and 54C. Alternatively, as illustrated in FIG. 16, the input pattern xij(t) may be displayed on a single input light valve 67. Writing light 66, which falls within the range of blue light to ultraviolet light and is capable of writing information in the input light valves 54A, 54B, and 54C, is irradiated to the input light valve 67. The writing light 66 carrying the input pattern xij(t) passes through multiple image forming lenses 68 and is then reflected by a reflection mirror 65. The input pattern xij(t) is thereby stored and displayed on each of the input light valves 54A, 54B, and 54C.

A fourth fundamental concept behind the self-organizing pattern learning system in accordance with the present invention will be described hereinbelow.

Figure 17:
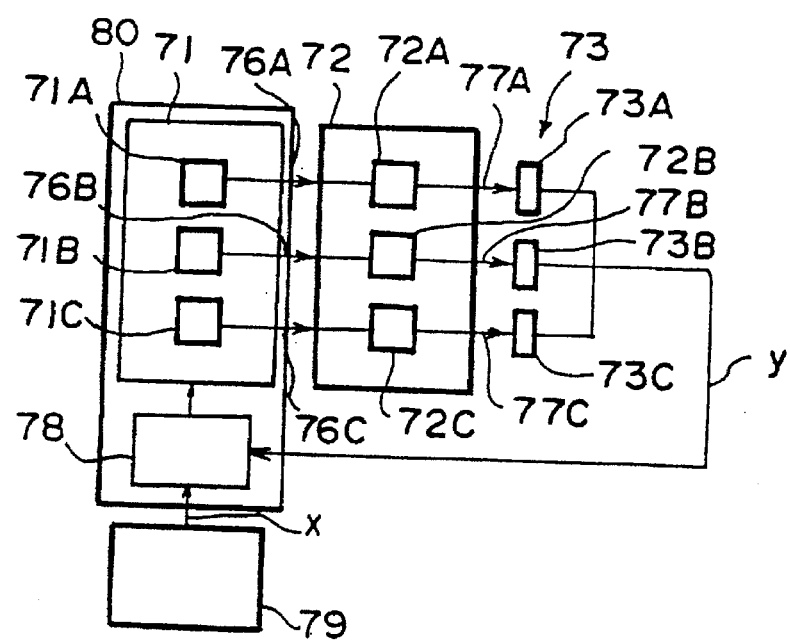
FIG. 17 is a schematic view showing a fourth fundamental concept behind the self-organizing pattern learning system in accordance with the present invention.

FIG. 17 is a schematic view showing the fourth fundamental concept behind the self-organizing pattern learning system in accordance with the present invention.

As illustrated in FIG. 17, in the fourth fundamental concept in accordance with the present invention, the self-organizing pattern learning system comprises a learning pattern creating means 80, an optical modulating device group 72, and a correlation detecting device group 73.

The optical modulating device group 72 serves as a pattern storing means and comprises a plurality of optical modulating devices 72A, 72B, and 72C. The plurality of the optical modulating devices 72A, 72B, and 72C optically store patterns, which are presented thereto by light having a predetermined wavelength distribution. Also, the plurality of the optical modulating devices 72A, 72B, and 72C modulate incident light, which has a wavelength distribution different from the predetermined wavelength distribution, in accordance with the stored patterns. The plurality of the optical modulating devices 72A, 72B, and 72C are arrayed in one direction or in two directions (in this case, three optical modulating devices 72A, 72B, and 72C are arrayed in one direction).

The learning pattern creating means 80 is provided with an optical control means 71 serving as an input pattern/ learning pattern displaying means. The optical control means 71 comprises a plurality of optical control devices 71A, 71B, and 71C, which are respectively located at positions adjacent to the optical modulating devices 72A, 72B, and 72C. The optical control devices 71A, 71B, and 71C alternately display learning patterns and a new input pattern x with the light, which has the predetermined wavelength distribution, and the light, which has the wavelength distribution different from the predetermined wavelength distribution, on the optical modulating devices 72A, 72B, and 72C.

The correlation detecting device group 73 serves as a photo detecting means and comprises a plurality of correlation detecting devices 73A, 73B, and 73C, which are respectively located at positions adjacent to the optical modulating devices 72A, 72B, and 72C. The correlation detecting devices 73A, 73B, and 73C detect degrees of correlation y between the input pattern x, which has been presented by each of the optical control devices 71A, 71B, and 71C and is carried by the light having the wavelength distribution different from the predetermined wavelength distribution, and the memory patterns, which are stored in the optical modulating devices 72A, 72B, and 72C of the optical modulating device group 72.

A learning pattern operation means 78, which is provided with a memory pattern updating means, is located in the learning pattern creating means 80. The learning pattern operation means 78 controls the light having the predetermined wavelength distribution for each of the optical control devices 71A, 71B, and 71C such that the intensity of the light having the predetermined wavelength distribution may be weighted in accordance with each of the degrees of correlation, which have been detected by the correlation detecting devices 73A, 73B, and 73C.

First, the input pattern x is presented by the input means 79 to the learning pattern creating means 80. Thereafter, with the light having the wavelength distribution different from the predetermined wavelength distribution, the input pattern x is radiated as light 76A, light 76B, and light 76C out of the optical control devices 7tA, 71B, and 71C. The light 76A, the light 76B, and the light 76C, which have been radiated out of the optical control devices 71A, 71B, and 71C, are respectively presented to the optical modulating devices 72A, 72B, and 72C of the optical modulating device group 72.

The optical modulating devices 72A, 72B, and 72C store memory patterns, which have been learned in accordance with input patterns having been presented previously. The light 76A, the light 76B, and the light 76C, which have been radiated out of the optical control devices 71A, 71B, and 71C, respectively pass through the optical modulating devices 72A, 72B, and 72C. As a result, optical superposition patterns 77A, 77B, and 77C are obtained from the superposition of the input pattern x upon the memory patterns, which are stored in the optical modulating devices 72A, 72B, and 72C. Each of the correlation detecting devices 73A, 73B, and 73C of the correlation detecting device group 73 detects the sum of the amounts of light carrying the corresponding optical superposition pattern. The sum of the amounts of light carrying each of the optical superposition patterns 77A, 77B, and 77C is thus detected as the degree of correlation y by each of the correlation detecting devices 73A, 73B, and 73C. The signals representing the degrees of correlation y, which have been detected by the correlation detecting devices 73A, 73B, and 73C, are fed into the learning pattern creating means 80. In the learning pattern operation means 78 of the learning pattern creating means 80, the intensity of the light having the predetermined wavelength distribution, which light is radiated out of each of the optical control devices 71A, 71B, and 71C, is weighted in accordance with each of the degrees of correlation y, which have been detected by the correlation detecting devices 73A, 73B, and 73C. In this manner, the intensity of the input pattern x, which is carried by the light having the predetermined wavelength distribution and is radiated out of each of the optical control devices 71A, 71B, and 71C, is controlled. The input pattern x, the intensity of which has thus been controlled, serves as the learning pattern for updating the memory pattern.

Thereafter, the input pattern is radiated with the light having the predetermined wavelength distribution, which light has the weighted intensity, out of each of the optical control devices 71A, 71B, and 71C. In this manner, the weighted input pattern is superposed upon the memory pattern stored in each of the optical modulating devices 72A, 72B, and 72C. The superposition pattern resulting from the superposition of the input pattern upon the memory pattern is stored in each of the optical modulating devices 72A, 72B, and 72C. The memory patterns stored in the optical modulating devices 72A, 72B, and 72C are thereby updated. The operations described above are iterated, and various patterns presented to the optical modulating devices 72A, 72B, and 72C are weighted in accordance with the degrees of correlation and stored in the optical modulating devices 72A, 72B, and 72C. The memory patterns stored in the optical modulating devices 72A, 72B, and 72C are thereby updated. In this manner, the self-organizing learning operations are carried out on the patterns presented sequentially.

Embodiments of the self-organizing pattern learning system in accordance with the present invention, wherein the fourth fundamental concept described above is employed, will be described hereinbelow.

FIG. 18 is a schematic view showing a fifth embodiment of the self-organizing pattern learning system in accordance with the present invention, wherein the fourth fundamental concept described above is employed.

In the fifth embodiment, the light having the predetermined wavelength distribution falls within the range of blue light to ultraviolet light. The light having the wavelength distribution different the predetermined wavelength distribution falls within the range of red light to infrared light. As each of the optical modulating devices, a storing/displaying light valve, in which the information can be written with light falling within the range of blue light to ultraviolet light and cannot be written with light falling within the range of red light to infrared light, is employed. The storing/displaying light valve may be constituted of a bismuth silicon oxide photo refractive optical modulator (BSO-PROM), or the like.

With reference to FIG. 18, the fifth embodiment of the self-organizing pattern learning system in accordance with the present invention is provided with an optical system. The optical system comprises a polarizer 88, which receives and polarizes reading light 90 having been produced by a light source (not shown). The optical system also comprises a learning pattern creating means. The learning pattern creating means is composed of k×1 number (in this embodiment, 3×1 number) of optical control light valves 89A, 89B, and 89C, which serve as the optical control devices and are arrayed at positions adjacent to the polarizer 88, and a learning pattern operation means 86. The optical system further comprises a polarizer 82, which is adjacent to the optical control light valves 89A, 89B, and 89C. The optical system still further comprises k×1 number (in this embodiment, 3×1 number) of storing/displaying light valves 83A, 83B, and 83C, which have i×j number of picture elements and are arrayed at positions adjacent to the polarizer 82 so as to correspond to the optical control light valves 89A, 89B, and 89C. The optical system also comprises a polarizer 84, which is adjacent to the storing/displaying light valves 83A, 83B, and 83C. The optical system further comprises correlation output detector arrays 85A, 85B, and 85C, which are arrayed at positions adjacent to the polarizer 84 so as to correspond to the storing/displaying light valves 83A, 83B, and 83C. In this embodiment, an input pattern xij(t) is presented by a multiple image forming camera 87.

First, the input pattern xij(t), which has been recorded by the multiple image forming camera 87, is presented via the learning pattern operation means 86 to each of the optical control light valves 89A, 89B, and 89C, and displayed on each of the optical control light valves 89A, 89B, and 89C. Thereafter, the reading light 90, which falls within the range of red light to infrared light, is produced by a light source (not shown). The reading light 90 passes through the polarizer 88 and is then irradiated to the optical control light valves 89A, 89B, and 89C, each of which displays the input pattern xij(t). The reading light 90, which has been irradiated to the optical control light valves 89A, 89B, and 89C, is modulated with the input pattern xij(t), which is displayed on each of the optical control light valves 89A, 89B, and 89C. The reading light 90, which has thus been modulated, passes through the polarizer 82 and is then irradiated to each of the storing/displaying light valves 83A, 83B, and 83C. The storing/displaying light valves 83A, 83B, and 83C store patterns, which have been presented before the time t, as memory patterns mklij(t−1) in accordance with a certain rule. Therefore, in each of the storing/displaying light valves 83A, 83B, and 83C, the input pattern xij(t), which is emitted by each of the optical control light valves 89A, 89B, and 89C, is superposed upon each of the memory patterns, which are stored in the storing/displaying light valves 83A, 83B, and 83C. By way of example, as illustrated in FIG. 3, the pattern of the character A is emitted by each of the optical control light valves 89A, 89B, and 89C, and the patterns of the characters A, B, and C are respectively displayed as the memory patterns on the storing/displaying light valves 83A, 83B, and 83C. In such cases, optical superposition patterns indicated by 3A, 3B, and 3C in FIG. 3 are obtained from the superpositions of the input pattern A upon the memory patterns A, B, and C.

Each of the optical superposition patterns passes through the polarizer 84. Thereafter, the sum of the amounts of light carrying each optical superposition pattern is detected by each of the correlation output detector arrays 85A, 85B, and 85C. By each of the correlation output detector arrays 85A, 85B, and 85C, the information about brightness and darkness of the superposition pattern, i.e. the information representing the brightness of the entire area of the superposition pattern, which is obtained from the superposition of the input pattern xij(t) upon each of the memory patterns mklij(t−1), is detected as the degree of correlation ykl(t) between the input pattern xij(t) and each of the memory patterns mklij(t−1). Specifically, the result of the product calculations represented by the formula $$y_{kl}(t) = \sum_{ij} (x_{ij}(t) \times m_{klij}(t-1)) \qquad (4)$$

is detected as the degree of correlation ykl(t) between the input pattern xij(t) and each of the memory patterns mklij(t−1).

Thereafter, the signals representing the degrees of correlation ykl(t), which have been detected by the correlation output detector arrays 85A, 85B, and 85C, are fed into the learning pattern operation means 86. In the learning pattern operation means 86, the densities of the learning patterns, which are displayed on the optical control light valves 89A, 89B, and 89C, are modulated in accordance with the degrees of correlation ykl(t), which have been detected by the corresponding correlation output detector arrays 85A, 85B, and 85C. Specifically, on an optical control light valve corresponding to a correlation output detector array, which detected a high degree of correlation, the input pattern is displayed with a high density. On an optical control light valve corresponding to a correlation output detector array, which detected a low degree of correlation, the input pattern is displayed with a low density, or is not displayed, depending on the degree of correlation.

After the optical control light valves 89A, 89B, and 89C have been controlled in the manner described above, writing light 90', which falls within the range of blue light to ultraviolet light, is produced by a light source (not shown). The writing light 90' passes through the polarizer 88 and is irradiated to the optical control light valves 89A, 89B, and 89C. The writing light 90', which has been irradiated to each of the optical control light valves 89A, 89B, and 89C, is modulated in accordance with the learning pattern, which is displayed on each of the optical control light valves 89A, 89B, and 89C. The modulated writing light 90' passes through the polarizer 82 and is irradiated to each of the storing/displaying light valves 83A, 83B, and 83C. At this time, to a storing/displaying light valve, which stores a memory pattern that has been detected as having a high degree of correlation with the input pattern, the input pattern, which has a high intensity, i.e. which has been weighted strongly, is presented as a learning pattern by the corresponding optical control light valve 89A, 89B, or 89C. Also, to a storing/displaying light valve, which stores a memory pattern that has been detected as having a low degree of correlation with the input pattern, the input pattern, which has a low intensity, i.e. which has been weighted weakly (or which has not been weighted), is presented as a learning pattern by the corresponding optical control light valve 89A, 89B, or 89C. The writing light 90' irradiated to the optical control light valves 89A, 89B, and 89C falls within the range of blue light to ultraviolet light, and an optical pattern can be written with the writing light 90' in each of the storing/displaying light valves 83A, 83B, and 83C. Therefore, the learning pattern, which has been weighted in accordance with the degree of correlation between each of the memory patterns stored in the storing/displaying light valves 83A, 83B, and 83C and the input pattern, is written upon each of the memory patterns stored in the storing/displaying light valves 83A, 83B, and 83C. In this manner, the operations for updating the memory patterns, i.e. the learning operations, are carried out.

The operations described above are iterated, and the memory patterns mklij(t−1) are thereby updated with the weights corresponding to the degrees of correlation between various input patterns, which are presented to the optical control light valves 89A, 89B, and 89C, and the memory patterns, which are stored in the storing/displaying light valves 83A, 83B, and 83C. In this manner, the self-organizing learning operations are carried out.

In the fifth embodiment described above, the optical control light valves 89A, 89B, and 89C are modulated in accordance with the degrees of correlation, and the light produced by the light source (not shown) is modulated by the optical control light valves 89A, 89B, and 89C. Alternatively, as illustrated in FIG. 19, in lieu of the optical control light valves 89A, 89B, and 89C, light emitting devices 81A, 81B, and 81C, each of which emits the learning pattern and the input pattern with the light having the predetermined wavelength distribution and the light having the wavelength distribution different from the predetermined wavelength distribution, may be located so as to correspond to the storing/displaying light valves 83A, 83B, and 83C. The light emitting devices 81A, 81B, and 81C may be constituted of LED arrays, or the like. In such cases, the input pattern xij(t) is emitted by each of the light emitting devices 81A, 81B, and 81C with the light having the wavelength distribution different from the predetermined wavelength distribution. Also, the learning pattern is emitted by each of the light emitting devices 81A, 81B, and 81C with the light having the predetermined wavelength distribution, which light has the intensity corresponding to each of the detected degrees of correlation. In this manner, the detection of the degrees of correlation and the operations for updating the memory patterns, i.e. the learning operations, are carried out.

Also, in the fifth embodiment described above, the light having the predetermined wavelength distribution and the light having the wavelength distribution different from the predetermined wavelength distribution are alternately irradiated to the optical control light valves 89A, 89B, and 89C. Also, in the modification shown in FIG. 19, the light having the predetermined wavelength distribution and the light having the wavelength distribution different from the predetermined wavelength distribution are alternately emitted by the light emitting devices 81A, 81B, and 81C. In this manner, the detection of the degrees of correlation and the operations for writing the learning patterns, which are obtained by weighting the input pattern, are carried out alternately. Alternatively, each of the correlation output detector arrays 85A, 85B, and 85C may be provided with a filter for filtering out the light having the predetermined wavelength distribution and transmitting only the light having the wavelength distribution different from the predetermined wavelength distribution. Also, the learning pattern and the input pattern may be radiated simultaneously out of each of the optical control light valves 89A, 89B, and 89C or each of the light emitting devices 81A, 81B, and 81C with the light having the predetermined wavelength distribution and the light having the wavelength distribution different from the predetermined wavelength distribution. In this manner, the light having the predetermined wavelength distribution and the light having the wavelength distribution different from the predetermined wavelength distribution need not be changed over, and the detection of the degrees of correlation and the operations for updating the memory patterns can be carried out simultaneously.

A fifth fundamental concept behind the self-organizing pattern learning system in accordance with the present invention will be described hereinbelow.

Figure 20:
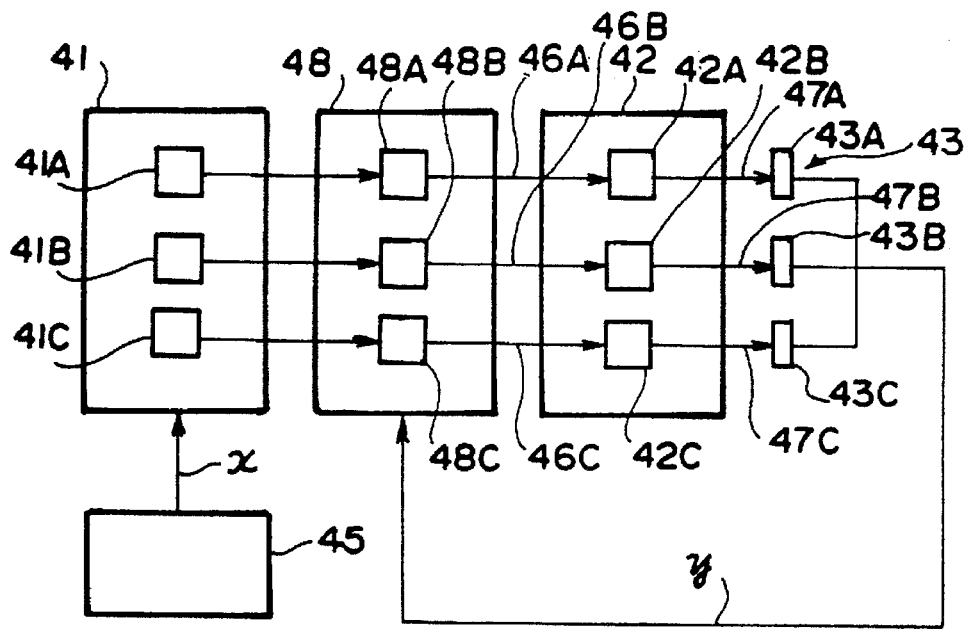
FIG. 20 is a schematic view showing a fifth fundamental concept behind the self-organizing pattern learning system in accordance with the present invention.

FIG. 20 is a schematic view showing the fifth fundamental concept behind the self-organizing pattern learning system in accordance with the present invention.

As illustrated in FIG. 20, the fifth fundamental concept in accordance with the present invention is basically equivalent to the third fundamental concept in accordance with the present invention shown in FIG. 11, except that the position of the optical control means 48 and the position of the pattern input means 41 are reversed. Specifically, in the fifth fundamental concept in accordance with the present invention, the self-organizing pattern learning system comprises the pattern input means 41, the optical modulating device group 42, the correlation detecting device group 43, and the optical control means 48.

The optical modulating device group 42 serves as the pattern storing means and comprises a plurality of the optical modulating devices 42A, 42B, and 42C. The plurality of the optical modulating devices 42A, 42B, and 42C optically store patterns, which are presented thereto by light having a predetermined wavelength distribution. Also, the plurality of the optical modulating devices 42A, 42B, and 42C modulate incident light, which has a wavelength distribution different from the predetermined wavelength distribution, in accordance with the stored patterns. The plurality of the optical modulating devices 42A, 42B, and 42C are arrayed in one direction or in two directions (in this case, three optical modulating devices 42A, 42B, and 42C are arrayed in one direction).

The pattern input means 41 serves as the input pattern displaying means and comprises a plurality of the optical input devices 41A, 41B, and 41C, which are respectively located so as to correspond to the optical modulating devices 42A, 42B, and 42C and which present a new input pattern x to the optical modulating devices 42A, 42B, and 42C. The pattern input means 41 also comprises the input means 45, which presents the input pattern x to each of the optical input devices 41A, 41B, and 41C.

The correlation detecting device group 43 serves as the photo detecting means and comprises a plurality of the correlation detecting devices 43A, 43B, and 43C, which are respectively located at positions adjacent to the optical modulating devices 42A, 42B, and 42C. The correlation detecting devices 43A, 43B, and 43C detect degrees of correlation y between the input pattern x, which has been presented to each of the optical input devices 41A, 41B, and 41C, and the memory patterns, which are stored in the optical modulating devices 42A, 42B, and 42C of the optical modulating device group 42.

The optical control means 48 comprises a plurality of the optical control devices 48A, 48B, and 48C, which are located between the optical modulating devices 42A, 42B, and 42C and the pattern input means 41 such that they may be respectively adjacent to the optical modulating devices 42A, 42B, and 42C. The optical control devices 48A, 48B, and 48C alternately present the light, which has the predetermined wavelength distribution, and the light having the wavelength distribution different from the predetermined wavelength distribution, to the optical modulating devices 42A, 42B, and 42C. The optical control means 48 is provided with the learning pattern creating means and the memory pattern updating means. The learning pattern creating means and the memory pattern updating means weight the intensity of the light, which has the predetermined wavelength distribution, in accordance with degrees of correlation y, which have been detected by the correlation detecting devices 43A, 43B, and 43C. The learning pattern creating means and the memory pattern updating means thus control the intensity of the light, which has the predetermined wavelength distribution, with respect to each of the optical input devices 41A, 41B, and 41C. In this manner, the learning pattern creating means and the memory pattern updating means present the light, which has the predetermined wavelength distribution, as learning patterns corresponding to the degrees of correlation to the optical modulating devices 42A, 42B, and 42C and update the memory patterns, which are stored in the optical modulating devices 42A, 42B, and 42C. In FIG. 20, similar elements are numbered with the same reference numerals with respect to FIG. 11.

First, the input pattern x is presented by the input means 45 to each of the optical input devices 41A, 41B, and 41C of the pattern input means 41. Thereafter, the light having the wavelength distribution different from the predetermined wavelength distribution is irradiated by the optical input devices 41A, 41B, and 41C to the optical control devices 48A, 48B, and 48C of the optical control means 48. At this time, nothing is displayed on the optical control devices 48A, 48B, and 48C. Therefore, the input pattern x, which is displayed on each of the optical input devices 41A, 41B, and 41C, is presented to each of the optical modulating devices 42A, 42B, and 42C of the optical modulating device group 42.

The optical modulating devices 42A, 42B, and 42C store memory patterns, which have been learned in accordance with input patterns having been presented previously. The light 46A, the light 46B, and the light 46C, which have been radiated out of the optical input devices 41A, 41B, and 41C and have passed through the optical control devices 48A, 48B, and 48C, respectively pass through the optical modulating devices 42A, 42B, and 42C. As a result, the optical superposition patterns 47A, 47B, and 47C are obtained from the superposition of the input pattern x upon the memory patterns, which are stored in the optical modulating devices 42A, 42B, and 42C. Each of the correlation detecting devices 43A, 43B, and 43C of the correlation detecting device group 43 detects the sum of the amounts of light carrying the corresponding optical superposition pattern. The sum of the amounts of light carrying each of the optical superposition patterns 47A, 47B, and 47C is thus detected as the degree of correlation y by each of the correlation detecting devices 43A, 43B, and 43C. The signals representing the degrees of correlation y, which have been detected by the correlation detecting devices 43A, 43B, and 43C, are fed into the optical control means 48. In each of the optical control devices 48A, 48B, and 48C of the optical control means 48, the intensity control is carried out such that the light having the predetermined wavelength distribution may be weighted in accordance with each of the degrees of correlation y, which have been detected by the correlation detecting devices 43A, 43B, and 43C. Thereafter, the light having the predetermined wavelength distribution is irradiated to each of the optical input devices 41A, 41B, and 41C and modulated in accordance with the input pattern, which is displayed on each of the optical input devices 41A, 41B, and 41C. The modulated light is presented to each of the optical control devices 48A, 48B, and 48C, in which the intensity modulation has been carried out. The input pattern, the intensity of which has been modulated by each of the optical control devices 48A, 48B, and 48C, is presented to each of the optical modulating devices 42A, 42B, and 42C of the optical modulating device group 42. Each of the optical modulating devices 42A, 42B, and 42C is capable of optically storing a pattern, which is presented by the light having the predetermined wavelength distribution. Therefore, the memory pattern carried by the light having the predetermined wavelength distribution, which has been modulated in each of the optical input devices 41A, 41B, and 41C and each of the optical control devices 48A, 48B, and 48C, is superposed upon the memory pattern stored in each of the optical modulating devices 42A, 42B, and 42C. The superposition pattern resulting from the superposition of the memory patterns upon each other is stored in each of the optical modulating devices 42A, 42B, and 42C. The operations described above are iterated, and the memory patterns, which are stored in the optical modulating devices 42A, 42B, and 42C of the optical modulating device group 42, are thereby updated (i.e. the learning operations are thereby carried out).

Embodiments of the self-organizing pattern learning system in accordance with the present invention, wherein the fifth fundamental concept described above is employed, will be described hereinbelow.

Figure 21:
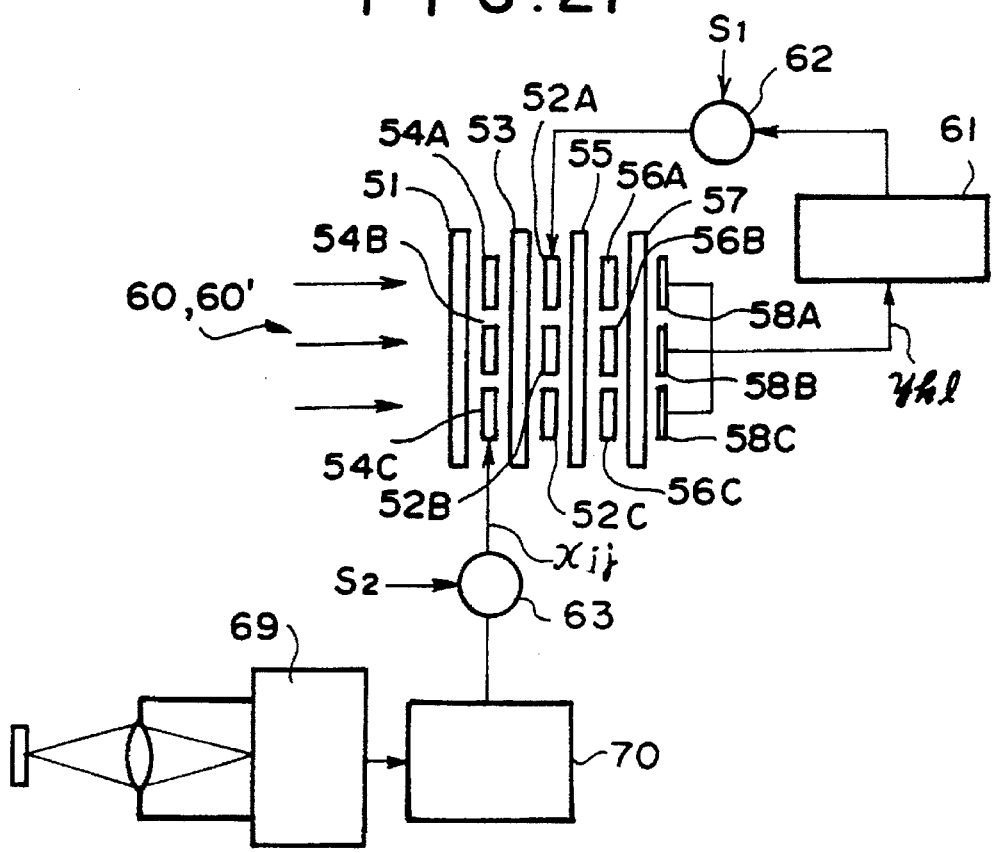
FIG. 21 is a schematic view showing a sixth embodiment of the self-organizing pattern learning system in accordance with the present invention.

FIG. 21 is a schematic view showing a sixth embodiment of the self-organizing pattern learning system in accordance with the present invention, wherein the fifth fundamental concept described above is employed.

In the sixth embodiment, the light having the predetermined wavelength distribution falls within the range of blue light to ultraviolet light. The light having the wavelength distribution different the predetermined wavelength distribution falls within the range of red light to infrared light. As each of the optical modulating devices, a storing/displaying light valve, in which the information can be written with light falling within the range of blue light to ultraviolet light and which transmits light falling within the range of red light to infrared light, is employed. The storing/displaying light valve may be constituted of a bismuth silicon oxide photo refractive optical modulator (BSO-PROM), or the like. Elements constituting the sixth embodiment of the self-organizing pattern learning system shown in FIG. 21 are basically equivalent to those constituting the fourth embodiment shown in FIG. 12. Therefore, in FIG. 21, similar elements are numbered with the same reference numerals with respect to FIG. 12.

With reference to FIG. 21, the sixth embodiment of the self-organizing pattern learning system in accordance with the present invention is provided with an optical system. The optical system comprises the polarizer 51, which receives and polarizes the reading light 60 having been produced by a light source (not shown). The optical system also comprises k×1 number (in this embodiment, 3×1 number) of input light valves 54A, 54B, and 54C, which are arrayed at positions adjacent to the polarizer 51. The optical system further comprises the polarizer 53, which is adjacent to the input light valves 54A, 54B, and 54C. The optical system still further comprises k×1 number (in this embodiment, 3×1 number) of optical control light valves 52A, 52B, and 52C, which have i×j number of picture elements and are arrayed at positions adjacent to the polarizer 53 so as to correspond to the input light valves 54A, 54B, and 54C. The optical system also comprises the polarizer 55, which is adjacent to the optical control light valves 52A, 52B, and 52C. The optical system further comprises k×1 number (in this embodiment, 3×1 number) of storing/displaying light valves 56A, 56B, and 56C, which have i×j number of picture elements and are arrayed at positions adjacent to the polarizer 55 so as to correspond to the optical control light valves 52A, 52B, and 52C. The optical system still further comprises the polarizer 57, which is adjacent to the storing/displaying light valves 56A, 56B, and 56C. The optical system also comprises correlation output detector arrays 58A, 58B, and 58C, which are arrayed at positions adjacent to the polarizer 57 so as to correspond to the storing/displaying light valves 56A, 56B, and 56C. In this embodiment, an input pattern is recorded by a single lens camera 69, and multiple patterns are formed from the single input pattern by an input image multi-pattern buffer 70. Each of the multiple patterns thus formed is presented as an input pattern xij(t).

First, the input pattern xij(t), which has been formed by the input image multi-pattern buffer 70 as one of the multiple patterns from the input pattern recorded by the single lens camera 69, is displayed on each of the input light valves 54A, 54B, and 54C. Thereafter, the reading light 60, which falls within the range of red light to infrared light, is produced by a light source (not shown). The reading light 60 passes through the polarizer 51 and is then irradiated to the input light valves 54A, 54B, and 54C. The reading light 60, which has been irradiated to the input light valves 54A, 54B, and 54C, is modulated with the input pattern xij(t), which is displayed on each of the input light valves 54A, 54B, and 54C. The reading light 60, which has thus been modulated, passes through the optical control light valves 52A, 52B, and 52C and the polarizer 55 and is then irradiated as an optical intensity pattern to each of the storing/displaying light valves 56A, 56B, and 56C. At this time, the uniform signal S1 is fed through the switch 62 into the optical control light valves 52A, 52B, and 52C. Therefore, at this time, no modulation is carried out in the optical control light valves 52A, 52B, and 52C, and the optical control light valves 52A, 52B, and 52C merely transmit light. The storing/displaying light valves 56A, 56B, and 56C store patterns, which have been presented before the time t, as memory patterns mklij (t−1) in accordance with a certain rule. Therefore, in each of the storing/displaying light valves 56A, 56B, and 56C, the optical pattern of the reading light 60, which has passed through each of the input light valves 54A, 54B, and 54C, is superposed upon each of the memory patterns, which are displayed on the storing/displaying light valves 56A, 56B, and 56C. By way of example, as illustrated in FIG. 3, the pattern of the character A is displayed on each of the input light valves 54A, 54B, and 54C, and the patterns of the characters A, B, and C are respectively displayed as the memory patterns on the storing/displaying light valves 56A, 56B, and 56C. In such cases, optical superposition patterns indicated by 3A, 3B, and 3C in FIG. 3 are obtained from the superpositions of the input pattern A upon the memory patterns A, B, and C.

Each of the optical superposition patterns passes through the polarizer 57. Thereafter, the sum of the amounts of light carrying each optical superposition pattern is detected by each of the correlation output detector arrays 58A, 58B, and 58C. By each of the correlation output detector arrays 58A, 58B, and 58C, the information about brightness and darkness of the superposition pattern, i.e. the information representing the brightness of the entire area of the superposition pattern, which is obtained from the superposition of the input pattern xij(t) upon each of the memory patterns mklij(t−1), is detected as the degree of correlation ykl(t) between the input pattern xij(t) and each of the memory patterns mklij(t−1). Specifically, the result of the product calculations represented by the formula $$y_{kl}(t) = \sum_{ij}(x_{ij}(t) \times m_{klij}(t-1)) \qquad (4)$$

is detected as the degree of correlation ykl(t) between the input pattern xij(t) and each of the memory patterns mklij (t−1).

The signals representing the degrees of correlation ykl(t), which have been detected by the correlation output detector arrays 58A, 58B, and 58C, are fed into and temporarily stored in the learning enabling pattern buffer 61 of the processing system.

Thereafter, the setting of the switch 62 is changed over, and the signals representing the degrees of correlation ykl(t), which have been detected by the correlation output detector arrays 58A, 58B, and 58C, are fed from the learning enabling pattern buffer 61 into the optical control light valves 52A, 52B, and 52C. In the optical control light valves 52A, 52B, and 52C, density modulations are carried out in accordance with the degrees of correlation ykl(t), which have been detected by the corresponding correlation output detector arrays 58A, 58B, and 58C. Specifically, in an optical control light valve corresponding to a correlation output detector array, which detected a high degree of correlation, little density modulation is carried out. In an optical control light valve corresponding to a correlation output detector array, which detected a low degree of correlation, density modulation is carried out to a high extent.

Thereafter, the writing light 60', which falls within the range of blue light to ultraviolet light, is produced by a light source (not shown). The writing light 60' passes through the polarizer 51 and is irradiated to each of the input light valves 54A, 54B, and 54C. The writing light 60', which has been irradiated to each of the input light valves 54A, 54B, and 54C, is modulated in accordance with the input pattern xij(t), which is displayed on each of the input light valves 54A, 54B, and 54C. The writing light 60', which has thus been modulated in accordance with the input pattern xij(t), passes through the polarizer 53 and is irradiated to each of the optical control light valves 52A, 52B, and 52C. In each of the optical control light valves 52A, 52B, and 52C, density modulation has been carried out in accordance with the received degree of correlation. Therefore, the intensity of the writing light 60' is modulated in each of the optical control light valves 52A, 52B, and 52C. The writing light 60', the intensity of which has thus been modulated, passes through the polarizer 55 and is presented as an optical intensity pattern to each of the storing/displaying light valves 56A, 56B, and 56C. At this time, to a storing/displaying light valve, which stores a memory pattern that has been detected as having a high degree of correlation with the input pattern, the input pattern, which has a high intensity, i.e. which has been weighted strongly, is presented as a learning pattern by the corresponding optical control light valve 52A, 52B, or 52C. Also, to a storing/displaying light valve, which stores a memory pattern that has been detected as having a low degree of correlation with the input pattern, the input pattern, which has a low intensity, i.e. which has been weighted weakly (or which has not been weighted), is presented as a learning pattern by the corresponding optical control light valve 52A, 52B, or 52C. The writing light 60' falls within the range of blue light to ultraviolet light, and an optical pattern can be written with the writing light 60' in each of the storing/displaying light valves 56A, 56B, and 56C. Therefore, the learning pattern, which has been weighted in accordance with the degree of correlation between each of the memory patterns stored in the storing/ displaying light valves 56A, 56B, and 56C and the input pattern, is written upon each of the memory patterns stored in the storing/displaying light valves 56A, 56B, and 56C. In this manner, the operations for updating the memory patterns, i.e. the learning operations, are carried out.

The operations described above are iterated, and the memory patterns mklij(t−1) are thereby updated with the weights corresponding to the degrees of correlation between various input patterns, which are presented to the input light valves 54A, 54B, and 54C, and the memory patterns, which are stored in the storing/displaying light valves 56A, 56B, and 56C. In this manner, the self-organizing learning operations are carried out.

In the sixth embodiment described above, the input pattern is recorded by the single lens camera 69, and multiple patterns are formed from the single input pattern by the input image multi-pattern buffer 70. Each of the multiple patterns thus formed is presented as the input pattern xij(t) to each of the input light valves 54A, 54B, and 54C. Alternatively, a multiple image forming camera may be employed, and multiple patterns may be optically formed by the multiple image forming camera and presented to the input light valves 54A, 54B, and 54C.

Also, in the sixth embodiment described above, the degrees of correlation between the input pattern and the memory patterns are calculated with Formula (4). Specifically, the degrees of correlation calculated from products are obtained from the input light valves 54A, 54B, and 54C and the storing/displaying light valves 56A, 56B, and 56C. Alternatively, the degrees of correlation calculated from differences may be obtained by modifying the optical system shown in FIG. 21.

Figure 22:
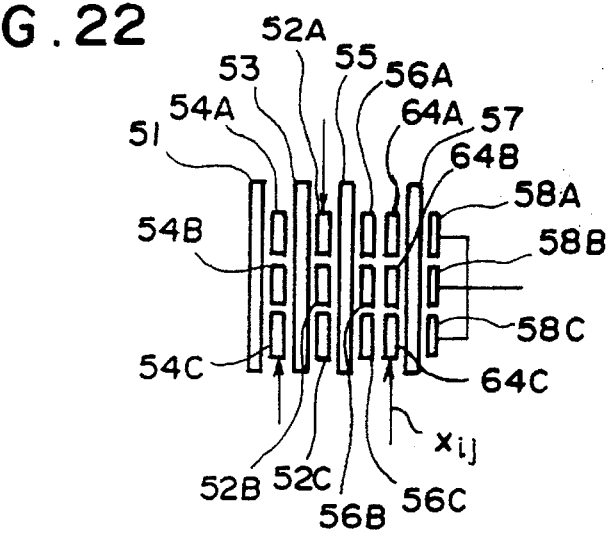
FIG. 22 is a schematic view showing a modification of the sixth embodiment of the self-organizing pattern learning system in accordance with the present invention, wherein difference correlations are detected.

Specifically, as illustrated in FIG. 22, in the same manner as that in the modification of FIG. 13, the second input light valves 64A, 64B, and 64C may be located between the storing/displaying light valves 56A, 56B, and 56C and the polarizer 57 of the self-organizing pattern learning system shown in FIG. 21. The second input light valves 64A, 64B, and 64C are respectively located at positions adjacent to the storing/displaying light valves 56A, 56B, and 56C. When the degrees of correlation are to be detected, a uniform signal is fed into the first input light valves 54A, 54B, and 54C such that they may merely transmit the reading light 60. Also, an input pattern is displayed on each of the second input light valves 64A, 64B, and 64C. With such a modification, as in the second embodiment of the self-organizing pattern learning system in accordance with the present invention, which is shown in FIG. 5, the degrees of correlation, which are calculated from the absolute values of the differences between the memory patterns stored in the storing/displaying light valves 56A, 56B, and 56C and the input pattern displayed on each of the second input light valves 64A, 64B, and 64C, are detected by the correlation output detector arrays 58A, 58B, and 58C.

In this manner, the degrees of correlation may be detected as the absolute values of the differences between the memory patterns, which are stored in the storing/displaying light valves 56A, 56B, and 56C, and the input pattern. In such cases, the learning operations in the storing/displaying light valves 56A, 56B, and 56C, i.e. the operations for updating the memory patterns, can be carried out in the same manner as that in the sixth embodiment.

Further, in the sixth embodiment described above, when the learning operations are iterated, the setting of the switch 63 shown in FIG. 21 may be changed over such that the uniform signal S2 may be fed into the input light valves 54A, 54B, and 54C. When the uniform signal S2 is fed into the input light valves 54A, 54B, and 54C, a uniform pattern is displayed on each of the input light valves 54A, 54B, and 54C. Therefore, the uniform pattern is stored in each of the storing/displaying light valves 56A, 56B, and 56C. In cases where patterns, which were stored at the initial stage of the learning operations of the storing/displaying light valves 56A, 56B, and 56C, remain faintly, the remaining patterns can be erased by presenting the uniform pattern to each of the storing/displaying light valves 56A, 56B, and 56C. In this manner, the patterns stored faintly in the storing/displaying light valves 56A, 56B, and 56C can be erased by feeding the uniform signal S2 into the input light valves 54A, 54B, and 54C during the learning operations. Accordingly, it is possible to eliminate the problems in that, when the learning operations are finished, a pattern other than the final memory pattern is superposed upon the final memory pattern in each of the storing/displaying light valves 56A, 56B, and 56C. Further, in such cases, instead of the uniform electric signal S2 being fed into the input light valves 54A, 54B, and 54C, the erasing of remaining patterns may be carried out by irradiating uniform light to the storing/displaying light valves 56A, 56B, and 56C.

Figure 14:
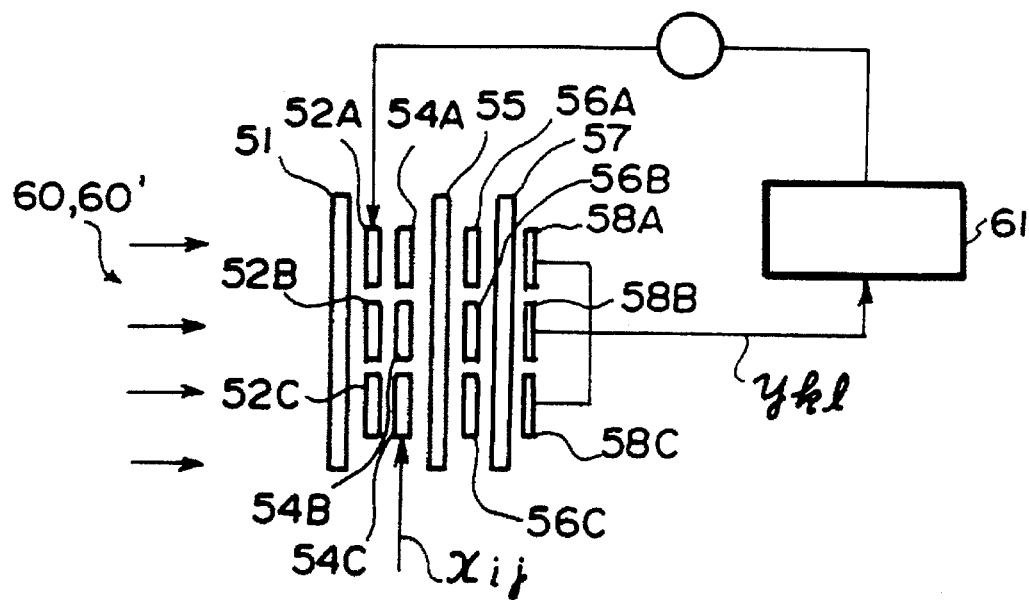
FIG. 14 is a schematic view showing a different modification of the fourth embodiment of the self-organizing pattern learning system in accordance with the present invention, wherein difference correlations are detected.

Moreover, the sixth embodiment described above may be modified in the same manner as that in the modification of FIG. 14 such that the polarizer 53 may be omitted. In such cases, the information representing the degrees of correlation calculated from the absolute values of the differences is transferred from the input light valves 54A, 54B, and 54C to the optical control light valves 52A, 52B, and 52C.

Figure 23:
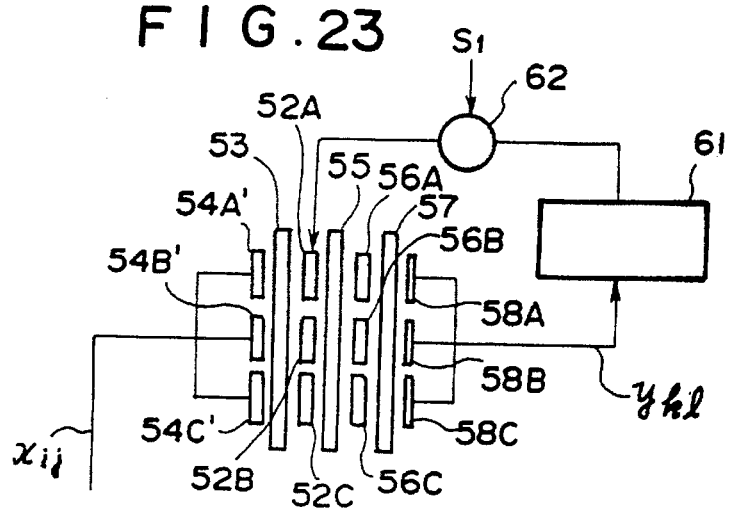
FIG. 23 is a schematic view showing a different modification of the sixth embodiment of the self-organizing pattern learning system in accordance with the present invention, wherein light emitting devices are employed in lieu of input light valves.

Also, the sixth embodiment described above may be modified such that, as illustrated in FIG. 23, in lieu of the input light valves 54A, 54B, and 54C, light emitting devices 54A', 54B', and 54C', which emit light carrying an input pattern, may be located for the corresponding optical control light valves 52A, 52B, and 52C. In this modification, the intensity of the light carrying the input pattern emitted by each of the light emitting devices is modulated by each of the optical control light valves 52A, 52B, and 52C, which have been modulated in accordance with the degrees of correlation. In this manner, learning patterns are created and used in the operations for updating the memory patterns stored in the storing/displaying light valves 56A, 56B, and 56C.

Further, in the sixth embodiment described above, the optical control light valves 52A, 52B, and 52C are modulated in accordance with the degrees of correlation, and the light produced by the light source (not shown) is modulated by the optical control light valves 52A, 52B, and 52C. Alternatively, in lieu of the optical control light valves 52A, 52B, and 52C, light emitting devices, each of which emits light having the intensity corresponding to the degree of correlation, may be located so as to correspond to the input light valves 54A, 54B, and 54C.

Figure 24:
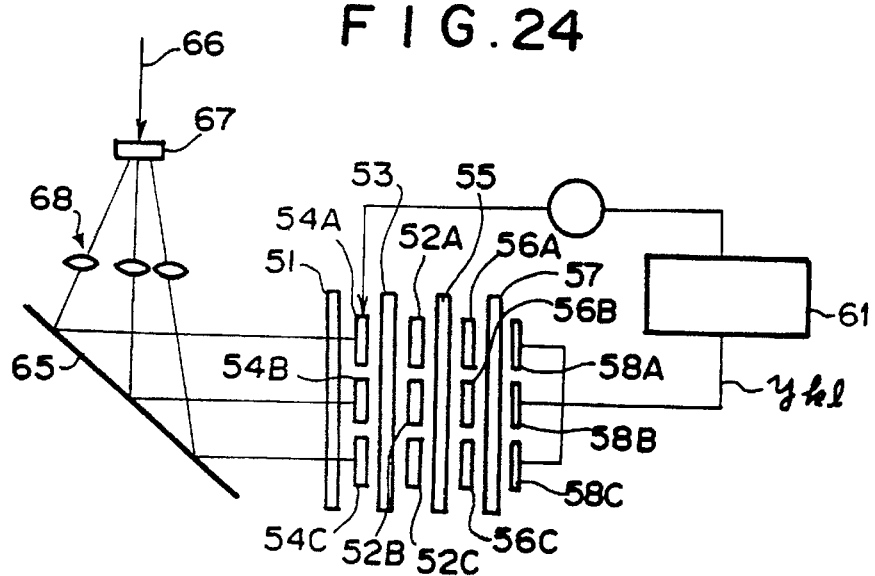
FIG. 24 is a schematic view showing a further different modification of the sixth embodiment of the self-organizing pattern learning system in accordance with the present invention, wherein an input pattern is optically presented to the input light valves.

Moreover, in the sixth embodiment described above, the single lens camera 69 and the input image multi-pattern buffer 70 are employed as the means for displaying the input pattern xij(t) on each of the input light valves 54A, 54B, and 54C. Alternatively, as illustrated in FIG. 24, the input pattern xij(t) may be displayed on the single input light valve 67. The writing light 66, which falls within the range of blue light to ultraviolet light and is capable of writing information in the input light valves 54A, 54B, and 54C, is irradiated to the input light valve 67. The writing light 66 carrying the input pattern xij(t) passes through multiple image forming lenses 68 and is then reflected by a reflection mirror 65. The input pattern xij(t) is thereby displayed on each of the input light valves 54A, 54B, and 54C.

In the aforesaid embodiments of the self-organizing pattern learning system in accordance with the present invention, the BSO-PROM is utilized as each of the optical modulating devices. Alternatively, any of other types of optical modulating devices may be used, in which information can be written with light having a predetermined wavelength distribution and cannot be written with light having a wavelength distribution different from the predetermined wavelength distribution.

With the first to sixth embodiments described above, a multiple lens system need not be used. Therefore, optical axes do not become oblique, and images do not become distorted during the image formation. Also, the number of the storing/displaying light valves can be increased easily.

Also, in the embodiments described above, the LED arrays are employed as the optical control devices. In the fifth and sixth embodiments, any of other means may be employed which are capable of emitting the input pattern. In the first, second, and fourth embodiments, any of other means may be employed which is capable of emitting light.

A seventh embodiment of the self-organizing pattern learning system in accordance with the present invention will be described hereinbelow.

Figure 25:
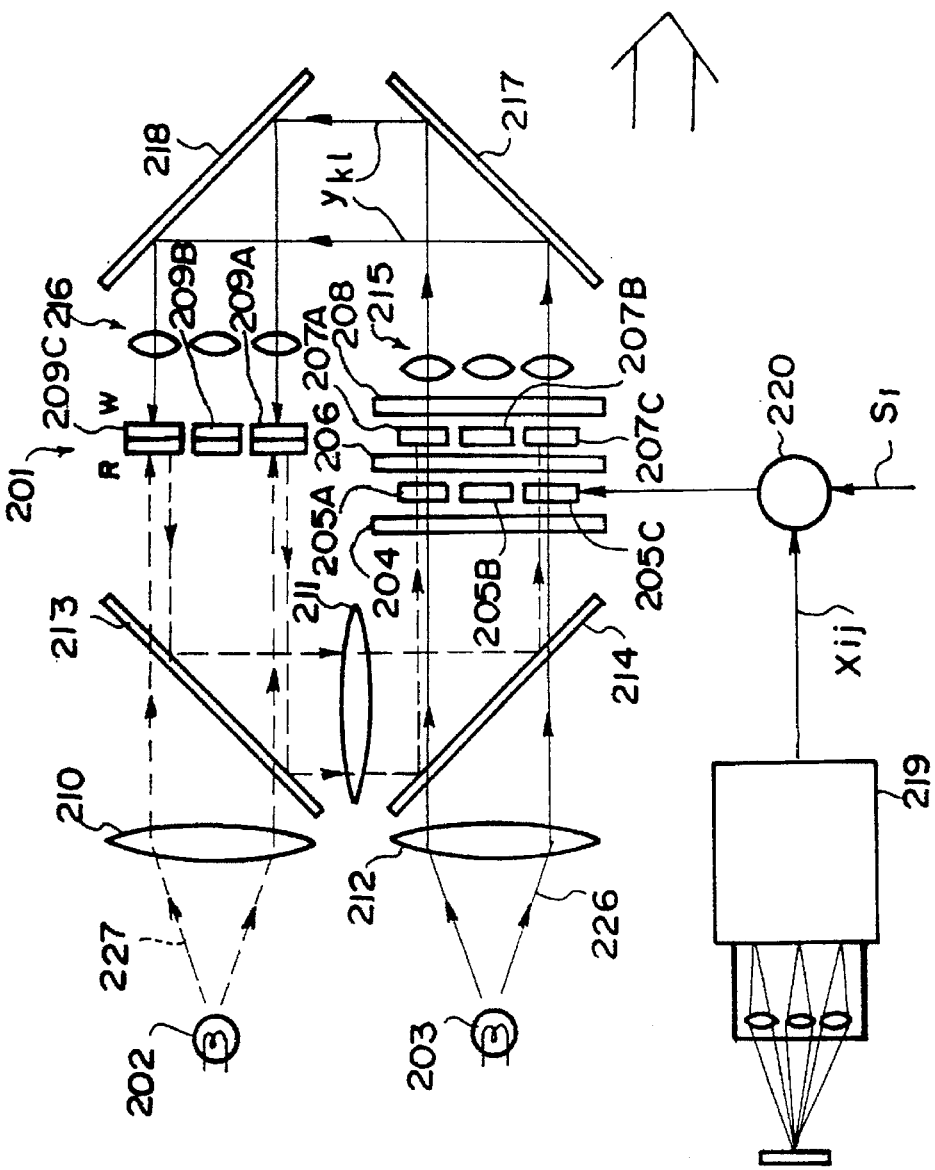
FIG. 25 is a schematic view showing a seventh embodiment of the self-organizing pattern learning system in accordance with the present invention.

FIG. 25 is a schematic view showing the seventh embodiment of the self-organizing pattern learning system in accordance with the present invention.

With reference to FIG. 25, the seventh embodiment of the self-organizing pattern learning system in accordance with the present invention is provided with an optical parallel pattern operating section, a correlation operating optical system, and a memory updating section. The optical parallel pattern operating section comprises a light source 203 for producing reading light 226, which falls within the range of red light to infrared light. The optical parallel pattern operating section also comprises a polarizer 204, which receives and polarizes the reading light 226 having been produced by the light source 203. The optical parallel pattern operating section further comprises k×1 number (in this embodiment, 3×1 number) of input light valves 205A, 205B, and 205C, which have i×j number of picture elements and are arrayed at positions adjacent to the polarizer 204. The input light valves 205A, 205B, and 205C serve as a input pattern displaying means. The optical parallel pattern operating section still further comprises a lens 212, through which the reading light 226 having been produced by the light source 203 is irradiated to the input light valves 205A, 205B, and 205C. The optical parallel pattern operating section also comprises a polarizer 206, which is adjacent to the input light valves 205A, 205B, and 205C. The optical parallel pattern operating section further comprises k×1 number (in this embodiment, 3×1 number) of storing light valves 207A, 207B, and 207C, which have i×j number of picture elements and are arrayed at positions adjacent to the polarizer 206 so as to correspond to the input light valves 205A, 205B, and 205C. The storing light valve 207A, 207B, and 207C serve as a pattern storing means. The optical parallel pattern operating section still further comprises a polarizer 208, which is adjacent to the storing light valves 207A, 207B, and 207C.

The correlation operating optical system serves as a photo detecting means and comprises lens sets 215 and 216 for condensing the reading light patterns, which have passed through the input light valves 205A, 205B, and 205C, the polarizer 206, the storing light valves 207A, 207B, and 207C, and the polarizer 208, to correlation output light valves 209A, 209B, and 209C. The correlation operating optical system also comprises mirrors 217 and 218.

The memory updating section is provided with a learning pattern creating means and a memory pattern updating means. The memory updating section comprises a light source 202 for producing writing light 227, which falls within the range of blue light to ultraviolet light. The memory updating section also comprises the correlation output light valves 209A, 209B, and 209C. The memory updating section further comprises a lens 210, through which the writing light 227 having been produced by the light source 202 is irradiated to the correlation output light valves 209A, 209B, and 209C. The memory updating section still further comprises an optical system constituted of a lens 211 and semi-transparent mirrors 213 and 214. The optical system guides correlation signal light, which is radiated out of each of the correlation output light valves 209A, 209B, and 209C, to each of the input light valves 205A, 205B, and 205C, and the like.

In the seventh embodiment, each of the storing light valves 207A, 207B, and 207C is constituted of a bismuth silicon oxide photo refractive optical modulator (BSO-PROM), in which information can be written with the light falling within the range of blue light to ultraviolet light and cannot be written with light falling within the range of red light to infrared light. Each of the correlation output light valves 209A, 209B, and 209C is constituted of a liquid crystal light valve (LCLV). When optical information is presented to one surface of the LCLV, the LCLV is capable of recording the optical information. When reading light is irradiated to the other surface of the LCLV, the LCLV is capable of modulating the reading light in accordance with the recorded optical information and radiating the modulated reading light. Also, in the seventh embodiment, an input pattern $x_{ij}(t)$ is presented by a multiple image forming camera 219.

Figure 26:
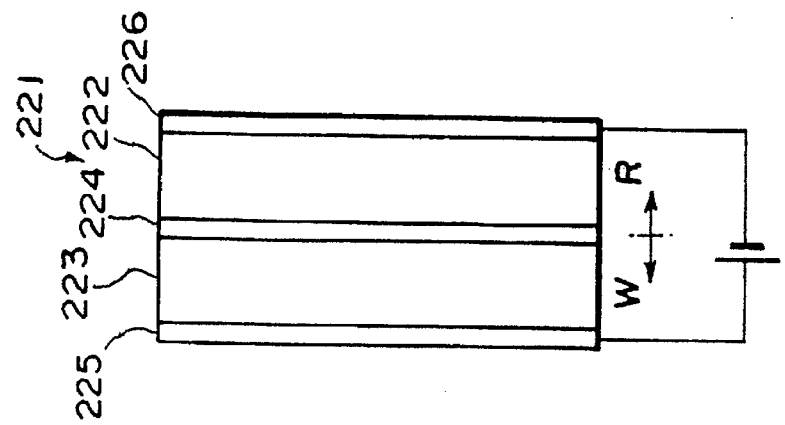
FIG. 26 is a schematic view showing a spatial optical modulating device employed in embodiments of the self-organizing pattern learning system in accordance with the present invention.

How the LCLV works will be described hereinbelow with reference to FIG. 26. An LCLV 221 is a spatial optical modulating device, which is capable of recording optical information when the optical information is presented to one surface, and which is capable of modulating the reading light in accordance with the recorded optical information and radiating the modulated reading light when the reading light is irradiated to the other surface. The LCLV 221 comprises a liquid crystal layer 222, a layer of a photoconductive material 223, which may be constituted of a photo refractive crystal, or the like, a reflection film 224 for reflecting incident light, and transparent electrodes 225 and 226. A direct current voltage is applied across the transparent electrodes 225 and 226. The LCLV 221 is divided into a write side (a W side), to which the optical information is presented, and a read side (an R side), from which the optical information is radiated out. To the LCLV of this type, light can be supplied from the exterior. Therefore, even if the LCLV itself does not have the amplifying function, many constituting units can be connected. When light is irradiated from the side of the transparent electrode 225 to the LCLV 221, a voltage is applied to the liquid crystal layer 222. (Specifically, a difference occurs in the applied voltage between a portion corresponding to the portion of the photoconductive material 223, to which the light is irradiated, and a portion corresponding to the portion of the photoconductive material 223, to which the light is not irradiated.) As a result, the state of orientation of the liquid crystal changes. In this state, the portion of the liquid crystal layer 222 corresponding to the portion of the photoconductive material 223, to which the light is irradiated, becomes black. Specifically, the optical pattern is recorded as the pattern of polarization in the liquid crystal layer 222 of the LCLV 221. Therefore, when optical information, such as a two-dimensional image, is presented from the W side to the LCLV 221, the presented optical information can be recorded directly in the LCLV 221. Also, when the reading light is irradiated from the R side to the LCLV 221, the recorded optical information can be radiated out as a pattern of brightness and darkness. The optical information recorded in the LCLV 221 does not disappear for a long time. When the recorded optical information is to be erased, the electric potential applied across the LCLV 221 is inverted, and uniform light is irradiated to the LCLV 221. In this manner, the recorded optical information can be erased.

How the self-organizing learning operations are carried out will be described hereinbelow.

First, the input pattern xij(t), which has been recorded by the multiple image forming camera 219, is displayed on each of the input light valves 205A, 205B, and 205C. Thereafter, the reading light 226, which falls within the range of red light to infrared light, is produced by the light source 203. The reading light 226 passes through the lens 212, the semi-transparent mirror 214, and the polarizer 204 and is then irradiated to the input light valves 205A, 205B, and 205C. The reading light 226, which has been irradiated to the input light valves 205A, 205B, and 205C, is modulated with the input pattern xij(t), which is displayed on each of the input light valves 205A, 205B, and 205C. The reading light 226, which has thus been modulated, passes through the polarizer 206 and is then irradiated as an optical intensity pattern to each of the storing light valves 207A, 207B, and 207C. The storing light valves 207A, 207B, and 207C store patterns, which have been presented before the time t, as memory patterns mklij(t–1) in accordance with a certain rule. Therefore, in each of the storing light valves 207A, 207B, and 207C, the optical pattern of the reading light 226, which has passed through each of the input light valves 205A, 205B, and 205C, is superposed upon each of the memory patterns, which are stored in the storing light valves 207A, 207B, and 207C. By way of example, as illustrated in FIG. 3, the pattern of the character A is displayed on each of the input light valves 205A, 205B, and 205C, and the patterns of the characters A, B, and C are respectively displayed as the memory patterns on the storing light valves 207A, 207B, and 207C. In such cases, optical superposition patterns indicated by 3A, 3B, and 3C in FIG. 3 are obtained from the superpositions of the input pattern A upon the memory patterns A, B, and C.

Each of the optical superposition patterns passes through the polarizer 208 and the lens set 215, is reflected by the mirrors 217 and 218, and then passes through the lens set 216. Each of the optical superposition patterns is then presented to each of the W sides of the correlation output light valves 209A, 209B, and 209C. In this manner, the sum of the amounts of light carrying each optical superposition pattern is stored as each of degrees of correlation in each of the correlation output light valves 209A, 209B, and 209C. In each of the correlation output light valves 209A, 209B, and 209C, the information about brightness and darkness of the superposition pattern, i.e. the information representing the product sum of the input pattern xij(t) and each of the memory patterns mklij(t–1), is stored as the degree of correlation ykl(t) between the input pattern xij(t) and each of the memory patterns mklij(t–1). Specifically, the result of the product sum calculations represented by the formula $$y_{kl}(t) = \sum_{ij}(x_{ij}(t) \times m_{klij}(t-1)) \qquad (4)$$

is stored as the degree of correlation ykl(t) between the input pattern xij(t) and each of the memory patterns mklij(t–1).

For example, the information representing the degree of correlation between the pattern A and the pattern A is stored in the correlation output light valve 209A. Therefore, strong light is irradiated to the correlation output light valve 209A, and the correlation output light valve 209A is modulated to a high extent. The information representing the degree of correlation between the pattern A and the pattern B is stored in the correlation output light valve 209B. Also, the information representing the degree of correlation between the pattern A and the pattern C is stored in the correlation output light valve 209C. Therefore, the light irradiated to each of the correlation output light valves 209B and 209C is weaker than the light irradiated to the correlation output light valve 209A, and the correlation output light valves 209B and 209C are modulated to a lower extent than the correlation output light valve 209A.

In the manner described above, the information representing the degree of correlation is stored in each of the correlation output light valves 209A, 209B, and 209C. Thereafter, the writing light 227, which falls within the range of blue light to ultraviolet light, is produced by the light source 202. The writing light 227 passes through the lens 210, the semi-transparent mirror 213 and is irradiated to each of the R sides of the correlation output light valves 209A, 209B, and 209C. The writing light 227, which has been irradiated to each of the correlation output light valves 209A, 209B, and 209C, is reflected by each of the correlation output light valves 209A, 209B, and 209C, and the intensity of the writing light 227 is modulated in accordance with the degree of correlation, which is stored in each of the correlation output light valves 209A, 209B, and 209C. As described above, the information representing a high degree of correlation is stored in the correlation output light valve 209A. Also, the information representing the degree of correlation, which is lower than the degree of correlation stored in the correlation output light valve 209A, is stored in each of the correlation output light valves 209B and 209C. Therefore, the writing light 227 irradiated to the correlation output light valve 209A is reflected such that the writing light 227 may have approximately the same intensity. When the writing light 227 irradiated to each of the correlation output light valves 209B and 209C is reflected and modulated thereby, the intensity of the writing light 227 decreases.

The writing light 227, which has been reflected by each of the correlation output light valves 209A, 209B, and 209C and the intensity of which has thus been modulated, passes through the optical system, which comprises the semi-transparent mirror 213, the lens 211, and the semi-transparent mirror 214. The writing lens 227 then passes through the polarizer 204 and is irradiated to each of the input light valves 205A, 205B, and 205C. The writing light 227 is thus modulated in accordance with the input pattern xij(t), which is displayed on each of the input light valves 205A, 205B, and 205C. The writing light 227, which has thus been modulated in accordance with the input pattern xij(t), passes through the polarizer 206 and is presented as an optical intensity pattern to each of the storing light valves 207A, 207B, and 207C. At this time, to a storing light valve, which stores a memory pattern that has a high degree of correlation with the input pattern, the input pattern, which has a high intensity, i.e. which has been weighted strongly, is presented as a learning pattern. Also, to a storing light valve, which stores a memory pattern that has a low degree of correlation with the input pattern, the input pattern, which has a low intensity, i.e. which has been weighted weakly (or which has not been weighted), is presented as a learning pattern. The writing light 227 falls within the range of blue light to ultraviolet light, and an optical pattern can be written with the writing light 227 in each of the storing light valves 207A, 207B, and 207C. Therefore, the learning pattern, which has been weighted in accordance with the degree of correlation between each of the memory patterns stored in the storing light valves 207A, 207B, and 207C and the input pattern, is written upon each of the memory patterns stored in the storing light valves 207A, 207B, and 207C. In this manner, the operations for updating the memory patterns, i.e. the learning operations, are carried out.

The operations described above are iterated, and the memory patterns mklij(t−1) are thereby updated with the weights corresponding to the degrees of correlation between various input patterns, which are presented to the input light valves 205A, 205B, and 205C, and the memory patterns, which are stored in the storing light valves 207A, 207B, and 207C. In this manner, the self-organizing learning operations are carried out.

In the seventh embodiment described above, the input light valves 205A, 205B, and 205C are located at the positions adjacent to the storing light valves 207A, 207B, and 207C. Alternatively, as in the experimental system of Taiwei, et al. shown in FIG. 37, the input light valves may be located at the positions far spaced apart from the storing light valves. The correlation output light valves may be located at the positions adjacent to the storing light valves. Also, a lens system may be located between the input light valves and the storing light valves in order to transmit an optical pattern, and the operations for updating the memory patterns may thereby be carried out.

Also, in the seventh embodiment, when the learning operations are iterated, the setting of a switch 220 shown in FIG. 25 may be changed over such that a uniform signal S1 may be fed into the input light valves 205A, 205B, and 205C. When the uniform signal S1 is fed into the input light valves 205A, 205B, and 205C, a uniform pattern is displayed on each of the input light valves 205A, 205B, and 205C. Therefore, the uniform pattern is stored in each of the storing light valves 207A, 207B, and 207C. In cases where patterns, which were stored at the initial stage of the learning operations of the storing light valves 207A, 207B, and 207C, remain faintly, the remaining patterns can be erased by presenting the uniform pattern to each of the storing light valves 207A, 207B, and 207C. In this manner, the patterns stored faintly in the storing light valves 207A, 207B, and 207C can be erased by feeding the uniform signal S1 into the input light valves 205A, 205B, and 205C during the learning operations. Accordingly, it is possible to eliminate the problems in that, when the learning operations are finished, a pattern other than the final memory pattern is superposed upon the final memory pattern in each of the storing light valves 207A, 207B, and 207C.

In the seventh embodiment described above, the degrees of correlation between the input pattern and the memory patterns are calculated with Formula (4). Specifically, the degrees of correlation calculated from products are obtained from the input light valves 205A, 205B, and 205C and the storing light valves 207A, 207B, and 207C. Alternatively, the degrees of correlation calculated from differences may be obtained by modifying the optical system shown in FIG. 25.

Figure 27:
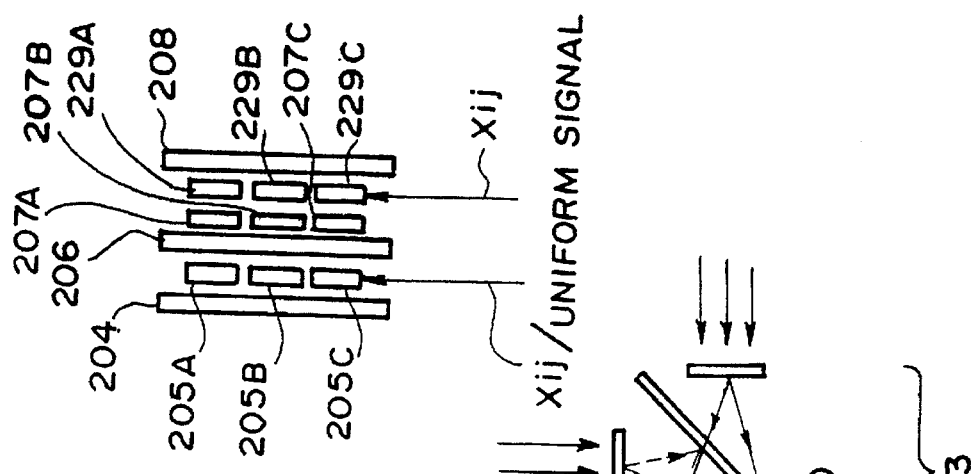
FIG. 27 is a schematic view showing an eighth embodiment of the self-organizing pattern learning system in accordance with the present invention.

For example, as in an eighth embodiment illustrated in FIG. 27, second input light valves 229A, 229B, and 229C may be located between the storing light valves 207A, 207B, and 207C and the polarizer 208 of the self-organizing pattern learning system shown in FIG. 25. The second input light valves 229A, 229B, and 229C are respectively located at positions adjacent to the storing light valves 207A, 207B, and 207C. When the degrees of correlation are to be detected, a uniform signal is fed into the first input light valves 205A, 205B, and 205C such that they may merely transmit the reading light 226. Also, an input pattern is displayed on each of the second input light valves 229A, 229B, and 229C. In the aforesaid seventh embodiment shown in FIG. 25, the reading light 226, which has passed through each of the input light valves 205A, 205B, and 205C, passes through the polarizer 206 and is presented as an optical intensity pattern to each of the storing light valves 207A, 207B, and 207C. In the eighth embodiment shown in FIG. 27, the reading light 226, which has passed through each of the storing light valves 207A, 207B, and 207C, is presented as a polarized optical pattern to each of the second input light valves 229A, 229B, and 229C. Specifically, in the seventh embodiment shown in FIG. 25, the sum of the products xij(t)×mklij(t−1) of the input pattern xij(t) and each of the memory patterns mklij(t−1), which are stored in the storing light valves 207A, 207B, and 207C, is given to each of the correlation output light valves 209A, 209B, and 209C. In the eighth embodiment shown in FIG. 27, as in the aforesaid second embodiment, the sum of the absolute values |xij(t)−mklij(t−1)| of the differences between the input pattern xij(t) and each of the memory patterns mklij (t−1), which are stored in the storing light valves 207A, 207B, and 207C, is given to each of the correlation output light valves 209A, 209B, and 209C.

As described above, in the eighth embodiment of the self-organizing pattern learning system in accordance with the present invention, the degree of correlation is calculated in a manner different from that in the seventh embodiment. However, with the eighth embodiment, the learning operations in the storing light valves 207A, 207B, and 207C, i.e. the operations for updating the memory patterns, can be carried out in the same manner as that in the seventh embodiment.

The operations described above are iterated, and various input patterns, which are presented to the input light valves 205A, 205B, and 205C, are weighted and presented to the storing light valves 207A, 207B, and 207C. The memory patterns stored in the storing light valves 207A, 207B, and 207C are thereby updated. In this manner, the self-organizing learning operations are carried out.

In the seventh and eighth embodiments described above, the information representing each of the degrees of correlation, which have been obtained with the input light valves 205A, 205B, and 205C and the storing light valves 207A, 207B, and 207C, is temporarily stored in each of the correlation output light valves 209A, 209B, and 209C, each of which is constituted of the LCLV. The information representing each of the degrees of correlation is read with the writing light 227, which is produced by the light source 202. Alternatively, the correlation output light valves 209A, 209B, and 209C may be constituted of a group of wavelength converting devices, which convert the light falling within the range of red light to infrared light into the light falling within the range of blue light to ultraviolet light and are located so as to correspond to the storing light valves 207A, 207B, and 207C. In such cases, the light, which falls within the range of red light to infrared light and represents each of the degrees of correlation obtained with the input light valves 205A, 205B, and 205C and the storing light valves 207A, 207B, and 207C, is converted by each of the wavelength converting devices into the light, which falls within the range of blue light to ultraviolet light and represents each of the degrees of correlation. The light, which falls within the range of blue light to ultraviolet light and represents each of the degrees of correlation, is guided by the optical system, passes through the polarizer 204, and is presented to each of the input light valves 205A, 205B, and 205C. The operations for updating the memory patterns stored in the storing light valves 207A, 207B, and 207C, i.e. the learning operations, are thereby carried out in the same manner as those in the seventh and eighth embodiments described above. In cases where the correlation output light valves 209A, 209B, and 209C are constituted of the wavelength converting devices, the light source 202 for producing the light falling within the range of blue light to ultraviolet light need not be provided, and therefore the self-organizing pattern learning system in accordance with the present invention can be kept compact.

Also, with the seventh and eighth embodiments described above, a large number of wires, which are required for transferring the information representing the degrees of correlation in the experimental system of Taiwei, et al., need not be used, and the operations for updating the memory patterns, i.e. the self-organizing learning operations, can be carried out easily by weighting the input pattern. Further, with the seventh and eighth embodiments described above, many pieces of information representing the degrees of correlation are transferred in parallel, and new memory patterns for updating the old memory patterns are created in parallel. Also, the operations for updating the memory patterns, i.e. the operations for writing the new memory patterns, are optically carried out in parallel. Therefore, the self-organizing learning operations can be carried out more quickly than the experimental system of Taiwei, et al. Moreover, with the seventh and eighth embodiments described above, wherein a large number of wires for transferring the information representing the degrees of correlation need not be used, the self-organizing pattern learning system in accordance with the present invention can be kept compact, and the cost of the self-organizing pattern learning system in accordance with the present invention can be kept low.

In the seventh and eighth embodiments described above, the correlation output light valves 209A, 209B, and 209C are located at the positions far spaced apart from the storing light valves 207A, 207B, and 207C. However, the locations of the correlation output light valves 209A, 209B, and 209C are not limited to those in the seventh and eighth embodiments described above. The correlation output light valves 209A, 209B, and 209C may be located at any of other positions, at which they can store the information representing the degrees of correlation between the input pattern and the memory patterns.

A ninth embodiment of the self-organizing pattern learning system in accordance with the present invention will be described hereinbelow.

Figure 28:
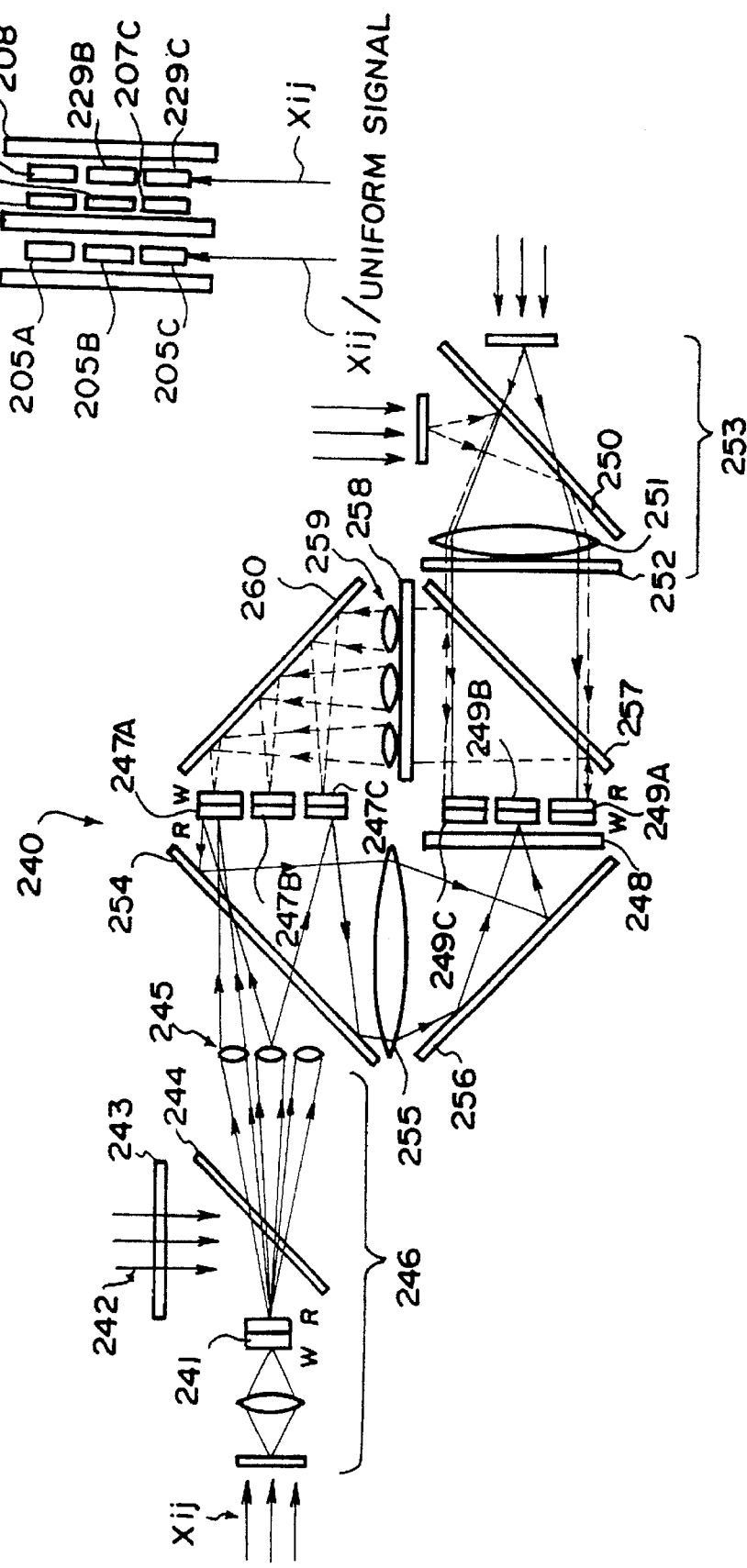
FIG. 28 as a schematic view showing a ninth embodiment of the self-organizing pattern learning system in accordance with the present invention.

FIG. 28 is a schematic view showing the ninth embodiment of the self-organizing pattern learning system in accordance with the present invention.

With reference to FIG. 28, in the ninth embodiment, a self-organizing pattern learning system 240 is provided with a first pattern input means 246. The first pattern input means 246 comprises an input light valve 241, which is constituted of a liquid crystal light valve (LCLV) having i×j number of picture elements. When reading light is irradiated to a side of the LCLV, which stores an optically presented pattern, the LCLV modulates the reading light in accordance with the recorded optical information and radiates the modulated reading light. The first pattern input means 246 also comprises a polarizer 243, which polarizes reading light 242 having been produced by a light source (not shown). The first pattern input means 246 further comprises a semi-transparent mirror 244, which reflects the reading light 242 towards the input light valve 241. The first pattern input means 246 still further comprises a lens set 245 constituted of an array of k×1 number (in this embodiment, 3×1 number) of lenses.

The self-organizing pattern learning system 240 is also provided with k×1 number (in this embodiment, 3×1 number) of storing light valves 247A, 247B, and 247C, which have i×j number of picture elements and are arrayed so as to correspond to the lenses of the lens set 245. The storing light valve 247A, 247B, and 247C serve as a pattern storing means.

The self-organizing pattern learning system 240 is further provided with a polarizer 248, which is located at a position spaced apart from the storing light valves 247A, 247B, and 247C.

The self-organizing pattern learning system 240 is still further provided with an optical system constituted of a semi-transparent mirror 254, a lens 255, and a semi-transparent mirror 256. The optical system presents an input pattern, which has been radiated out of the first pattern input means 246, to each of the storing light valves 247A, 247B, and 247C. The optical system also presents a new optical pattern, which has been reflected from each of the storing light valves 247A, 247B, and 247C, to each of correlation output light valves 249A, 249B, and 249C.

The self-organizing pattern learning system 240 is also provided with k×1 number (in this embodiment, 3×1 number) of correlation output light valves 249A, 249B, and 249C, which have i×j number of picture elements and are arrayed at positions adjacent to the polarizer 248 so as to correspond to the storing light valves 247A, 247B, and 247C. The correlation output light valves 249A, 49B, and 249C serve as a photo detecting means.

The self-organizing pattern learning system 240 is further provided with a second pattern input means 253 serving as a learning pattern creating means. The second pattern input means 253 comprises a semi-transparent mirror 250, a lens 251, and a polarizer 252, which present the input pattern to each of the correlation output light valves 249A, 249B, and 249C.

The self-organizing pattern learning system 240 is still further provided with an optical system, which comprises a semi-transparent mirror 257, a polarizer 258, a lens set 259 constituted of k×1 number (in this embodiment, 3×1 number) of lenses, and a mirror 260. The optical system presents the input pattern, which has been radiated out of the second pattern input means 253, to each of the correlation output light valves 249A, 249B, and 249C. The optical system also presents the input pattern, which has been reflected from each of the correlation output light valves 249A, 249B, and 249C, to each of the storing light valves 247A, 247B, and 247C.

In the ninth embodiment, each of the input light valve 241, the storing light valves 247A, 247B, and 247C and the correlation output light valves 249A, 249B, and 249C is constituted of a liquid crystal light valve (LCLV), which is employed in the seventh and eighth embodiments described above. When optical information is presented to one surface of the LCLV, the LCLV is capable of recording the optical information. When reading light is irradiated to the other surface of the LCLV, the LCLV is capable of modulating the reading light in accordance with the recorded optical information and radiating the modulated reading light.

First, an input pattern $x_{ij}(t)$ is presented to the W side of the input light valve 241 of the first pattern input means 246 and is stored in the input light valve 241. Thereafter, the reading light 242 passes through the polarizer 243, is reflected by the semi-transparent mirror 244, and is irradiated to the R side of the input light valve 241. The reading light 242 is reflected and modulated in accordance with the input pattern xij(t), which is stored in the input light valve 241. The reading light 242, which has thus been modulated, passes through the semi-transparent mirror 244, the lens set 245, and the semi-transparent mirror 254, and is then irradiated to each of the R sides of the storing light valves 247A, 247B, and 247C. The storing light valves 247A, 247B, and 247C store patterns, which have been presented before the time t, as memory patterns mklij(t−1) in accordance with a certain rule. The reading light 242, which carries the input pattern xij(t) and has been irradiated to each of the R sides of the storing light valves 247A, 247B, and 247C, is even further modulated in accordance with each of the memory patterns mklij(t−1), which are stored in the storing light valves 247A, 247B, and 247C. In this manner, the reading light 242 is reflected from each of the storing light valves 247A, 247B, and 247C as an optical superposition pattern resulting from the superposition of the input pattern xij(t) upon each of the memory patterns mklij(t−1). For example, the reading light 242 is reflected as each of the optical patterns indicated by 3A, 3B, and 3C in FIG. 3.

Each of the optical superposition patterns is reflected by the semi-transparent mirror 254, passes through the lens 255, and is then reflected by the semi-transparent mirror 256. Thereafter, each of the optical superposition patterns passes through the polarizer 248 and is presented to each of the W sides of the correlation output light valves 249A, 249B, and 249C. In this manner, the sum of the amounts of light carrying each optical superposition pattern is stored in each of the correlation output light valves 249A, 249B, and 249C as each of degrees of correlation between the input pattern xij(t) and the memory patterns mklij(t−1), which are stored in the storing light valves 247A, 247B, and 247C. In each of the correlation output light valves 249A, 249B, and 249C, the information about brightness and darkness of the superposition pattern, i.e. the information representing the product sum of the input pattern xij(t) and each of the memory patterns mklij(t−1), is stored as the degree of correlation ykl(t) between the input pattern xij(t) and each of the memory patterns mklij(t−1). Specifically, the result of the product sum calculations represented by the formula $$y_{kl}(t) = \sum_{ij} (x_{ij}(t) \times m_{klij}(t-1)) \qquad (4)$$

is stored as the degree of correlation ykl(t) between the input pattern xij(t) and each of the memory patterns mklij(t−1). For example, as illustrated in FIG. 3, the input pattern may be the pattern A, and the patterns A, B, and C may be stored respectively in the storing light valves 247A, 247B, and 247C. In such cases, the information representing the degree of correlation between the pattern A and the pattern A is stored in the correlation output light valve 249A. Therefore, strong light is irradiated to the correlation output light valve 249A, and the correlation output light valve 249A is modulated to a high extent. The information representing the degree of correlation between the pattern A and the pattern B is stored in the correlation output light valve 249B. Also, the information representing the degree of correlation between the pattern A and the pattern C is stored in the correlation output light valve 249C. Therefore, the light irradiated to each of the correlation output light valves 249B and 249C is weaker than the light irradiated to the correlation output light valve 249A, and the correlation output light valves 249B and 249C are modulated to a lower extent than the correlation output light valve 249A.

In the manner described above, the information representing the degree of correlation is stored in each of the correlation output light valves 249A, 249B, and 249C. Thereafter, the input pattern xij(t) is presented by the second pattern input means 253 to each of the correlation output light valves 249A, 249B, and 249C from their R sides. The input pattern xij(t), which has been presented to each of the R sides of the correlation output light valves 249A, 249B, and 249C, is reflected by each of the correlation output light valves 249A, 249B, and 249C, and the intensity of the input pattern xij(t) is modulated in accordance with the degree of correlation, which is stored in each of the correlation output light valves 249A, 249B, and 249C. As described above, the information representing a high degree of correlation is stored in the correlation output light valve 249A. Also, the information representing the degree of correlation, which is lower than the degree of correlation stored in the correlation output light valve 249A, is stored in each of the correlation output light valves 249B and 249C. Therefore, the input pattern xij(t) presented to the correlation output light valve 249A is reflected such that the input pattern xij(t) may have approximately the same intensity. When the input pattern xij(t) presented to each of the correlation output light valves 249B and 249C is reflected and modulated thereby, the intensity of the input pattern xij(t) decreases.

The input pattern xij(t), which has been reflected by each of the correlation output light valves 249A, 249B, and 249C and the intensity of which has thus been modulated, passes through the optical system, which comprises the semi-transparent mirror 257, the polarizer 258, the lens set 259, and the mirror 260. The input pattern xij(t) is thus presented as a learning pattern to each of the W sides of the storing light valves 247A, 247B, and 247C. At this time, to the storing light valve 247A, which stores the memory pattern that has a high degree of correlation with the input pattern, the input pattern, which has a high intensity, i.e. which has been weighted strongly, is presented as a learning pattern. Also, to each of the storing light valves 247B and 247C, which store the memory patterns that have a low degree of correlation with the input pattern, the input pattern, which has a low intensity, i.e. which has been weighted weakly (or which has not been weighted), is presented as a learning pattern. Therefore, the learning pattern, which has been weighted in accordance with the degree of correlation between each of the memory patterns stored in the storing light valves 247A, 247B, and 247C and the input pattern, is written upon each of the memory patterns stored in the storing light valves 247A, 247B, and 247C. In this manner, the operations for updating the memory patterns, i.e. the learning operations, are carried out.

The operations described above are iterated, and various input patterns, which are presented to the input light valve 241, are weighted and presented to the storing light valves 247A, 247B, and 247C. The memory patterns stored in the storing light valves 247A, 247B, and 247C are thereby updated. In this manner, the self-organizing learning operations are carried out.

A tenth embodiment of the self-organizing pattern learning system in accordance with the present invention will be described hereinbelow.

Figure 29:
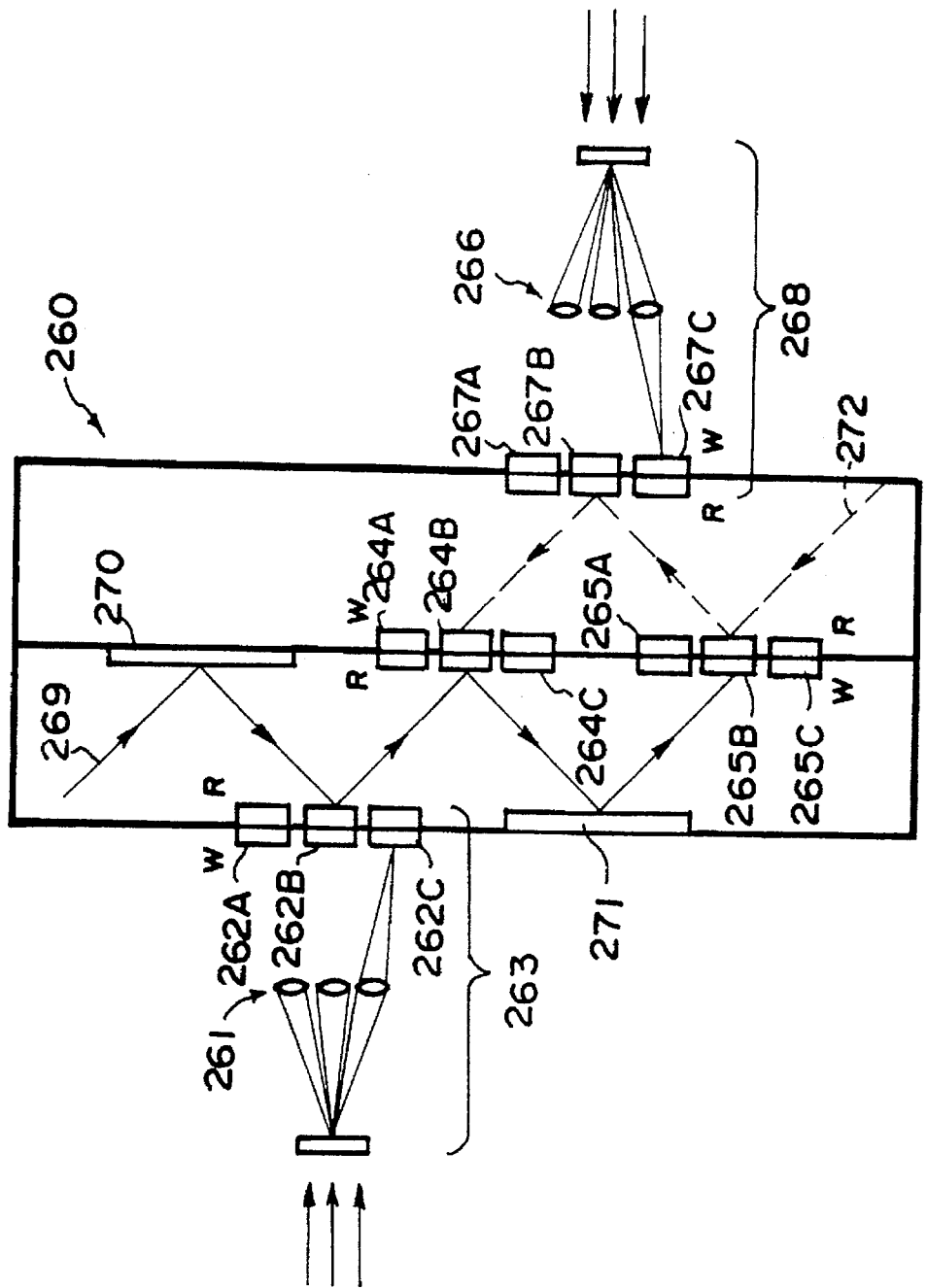
FIG. 29 as a schematic view showing a tenth embodiment of the self-organizing pattern learning system in accordance with the present invention.

FIG. 29 is a schematic view showing the tenth embodiment of the self-organizing pattern learning system in accordance with the present invention.

With reference to FIG. 29, in the tenth embodiment, a self-organizing pattern learning system 260 is provided with a first pattern input means 263 serving as an input pattern displaying means. The first pattern input means 263 comprises a lens set 261 constituted of an array of k×1 number (in this embodiment, 3×1 number) of lenses. The first pattern input means 263 also comprises k×1 number (in this embodiment, 3×1 number) of first input light valves 262A, 262B, and 262C, which have i×j number of picture elements and are arrayed so as to correspond to the lenses of the lens set 261.

The self-organizing pattern learning system 260 is also provided with k×1 number (in this embodiment, 3×1 number) of storing light valves 264A, 264B, and 264C, which have i×j number of picture elements and are arrayed so as to correspond to the first input light valves 262A, 262B, and 262C. The storing light valves 264A, 264B, and 264C are located at positions spaced apart from the first input light valves 262A, 262B, and 262C and serve as a pattern storing means.

The self-organizing pattern learning system 260 is further provided with k×1 number (in this embodiment, 3×1 number) of correlation output light valves 265A, 265B, and 265C, which have i×j number of picture elements and are arrayed so as to correspond to the storing light valves 264A, 264B, and 264C.

The self-organizing pattern learning system 260 is still further provided with a second pattern input means 268 serving as a learning pattern creating means and a memory pattern updating means. The second pattern input means 268 comprises a lens set 266 constituted of an array of k×1 number (in this embodiment, 3×1 number) of lenses. The second pattern input means 268 also comprises k×1 number (in this embodiment, 3×1 number) of second input light valves 267A, 267B, and 267C, which have i×j number of picture elements and are arrayed so as to correspond to the lenses of the lens set 266.

The self-organizing pattern learning system 260 is also provided with a mirror 270, which reflects reading light 269 having been produced by a light source (not shown) towards each of the first input light valves 262A, 262B, and 262C.

The self-organizing pattern learning system 260 is further provided with a mirror 271. The mirror 271 reflects the reading light 269, which has been reflected from each of the storing light valves 264A, 264B, and 264C, towards each of the correlation output light valves 265A, 265B, and 265C.

The aforesaid elements of the self-organizing pattern learning system 260 are supported on plane-parallel plates as illustrated in FIG. 29. In cases where the elements of the self-organizing pattern learning system 260, such as the storing light valves 264A, 264B, and 264C, are supported on the plane-parallel plates, the adjustment of the alignment of the light valves can be carried out easily.

In the tenth embodiment, each of the first input light valves 262A, 262B, and 262C, the storing light valves 264A, 264B, and 264C, the correlation output light valves 265A, 265B, and 265C, and the second input light valves 267A, 267B, and 267C is constituted of a liquid crystal light valve (LCLV), which is employed in the seventh, eighth, and ninth embodiments described above. When optical information is presented to one surface of the LCLV, the LCLV is capable of recording the optical information. When reading light is irradiated to the other surface of the LCLV, the LCLV is capable of modulating the reading light in accordance with the recorded optical information and radiating the modulated reading light.

First, an input pattern xij(t) is presented to each of the W sides of the first input light valves 262A, 262B, and 262C of the first pattern input means 263 and is stored in each of the first input light valves 262A, 262B, and 262C. Thereafter, the reading light 269 is produced by the light source (not shown). The reading light 269 is reflected by the mirror 270, and is irradiated to each of the R sides of the first input light valves 262A, 262B, and 262C. The reading light 269 is reflected and modulated in accordance with the input pattern xij(t), which is stored in each of the first input light valves 262A, 262B, and 262C. The reading light 269, which has thus been modulated, is irradiated to each of the R sides of the storing light valves 264A, 264B, and 264C. The storing light valves 264A, 264B, and 264C store patterns, which have been presented before the time t, as memory patterns mklij(t−1) in accordance with a certain rule. The reading light 269, which carries the input pattern xij(t) and has been irradiated to each of the R sides of the storing light valves 264A, 264B, and 264C, is even further modulated in accordance with each of the memory patterns mklij(t−1), which are stored in the storing light valves 264A, 264B, and 264C. In this manner, the reading light 269 is reflected from each of the storing light valves 264A, 264B, and 264C as an optical superposition pattern resulting from the superposition of the input pattern xij(t) upon each of the memory patterns mklij(t−1). For example, the reading light 269 is reflected as each of the optical patterns indicated by 3A, 3B, and 3C in FIG. 3.

Each of the optical superposition patterns is reflected by the mirror 271 and presented to each of the W sides of the correlation output light valves 265A, 265B, and 265C. In this manner, the sum of the amounts of light carrying each optical superposition pattern is stored in each of the correlation output light valves 265A, 265B, and 265C as each of degrees of correlation between the input pattern xij(t) and the memory patterns mklij(t−1), which are stored in the storing light valves 264A, 264B, and 264C. In each of the correlation output light valves 265A, 265B, and 265C, the information about brightness and darkness of the superposition pattern, i.e. the information representing the product sum of the input pattern xij(t) and each of the memory patterns mklij(t−1), is stored as the degree of correlation ykl(t) between the input pattern xij(t) and each of the memory patterns mklij(t−1). Specifically, the result of the product sum calculations represented by the formula $$y_{kl}(t) = \sum_{ij} (x_{ij}(t) \times m_{klij}(t-1)) \quad (4)$$

is stored as the degree of correlation ykl(t) between the input pattern xij(t) and each of the memory patterns mklij(t−1). For example, as illustrated in FIG. 3, the input pattern may be the pattern A, and the patterns A, B, and C may be stored respectively in the storing light valves 264A, 264B, and 264C. In such cases, the information representing the degree of correlation between the pattern A and the pattern A is stored in the correlation output light valve 265A. Therefore, strong light is irradiated to the correlation output light valve 265A, and the correlation output light valve 265A is modulated to a high extent. The information representing the degree of correlation between the pattern A and the pattern B is stored in the correlation output light valve 265B. Also, the information representing the degree of correlation between the pattern A and the pattern C is stored in the correlation output light valve 265C. Therefore, the light irradiated to each of the correlation output light valves 265B and 265C is weaker than the light irradiated to the correlation output light valve 265A, and the correlation output light valves 265B and 265C are modulated to a lower extent than the correlation output light valve 265A.

In the manner described above, the information representing the degree of correlation is stored in each of the correlation output light valves 265A, 265B, and 265C. Thereafter, the input pattern xij(t) is presented to each of W sides of the second input light valves 267A, 267B, and 267C of the second pattern input means 268 and stored in each of the second input light valves 267A, 267B, and 267C. Writing light 272 is then produced by a light source (not shown) and irradiated to each of the R sides of the correlation output light valves 265A, 265B, and 265C. The writing light 272, which has been irradiated to each of the R sides of the correlation output light valves 265A, 265B, and 265C, is reflected by each of the correlation output light valves 265A, 265B, and 265C, and the intensity of the writing light 272 is modulated in accordance with the degree of correlation, which is stored in each of the correlation output light valves 265A, 265B, and 265C. As described above, the information representing a high degree of correlation is stored in the correlation output light valve 265A. Also, the information representing the degree of correlation, which is lower than the degree of correlation stored in the correlation output light valve 265A, is stored in each of the correlation output light valves 265B and 265C. Therefore, the writing light 272 irradiated to the correlation output light valve 265A is reflected such that the writing light 272 may have approximately the same intensity. When the writing light 272 irradiated to each of the correlation output light valves 265B and 265C is reflected and modulated thereby, the intensity of the writing light 272 decreases.

The writing light 272, which has been reflected by each of the correlation output light valves 265A, 265B, and 265C and the intensity of which has thus been modulated, is irradiated to each of the R sides of the second input light valves 267A, 267B, and 267C. The writing light 272, which has been irradiated to each of the R sides of the second input light valves 267A, 267B, and 267C, is reflected and modulated in accordance with the input pattern xij(t), which is stored in each of the second input light valves 267A, 267B, and 267C. In this manner, the input pattern, which has been read from each of the second input light valves 267A, 267B, and 267C and has been weighted in accordance with each of the degrees of correlation, is presented to each of the W sides of the storing light valves 264A, 264B, and 264C. At this time, to the storing light valve 264A, which stores the memory pattern that has a high degree of correlation with the input pattern, the input pattern, which has a high intensity, i.e. which has been weighted strongly, is presented as a learning pattern. Also, to each of the storing light valves 264B and 264C, which store the memory patterns that have a low degree of correlation with the input pattern, the input pattern, which has a low intensity, i.e. which has been weighted weakly (or which has not been weighted), is presented as a learning pattern. Therefore, the learning pattern, which has been weighted in accordance with the degree of correlation between each of the memory patterns stored in the storing light valves 264A, 264B, and 264C and the input pattern, is written upon each of the memory patterns stored in the storing light valves 264A, 264B, and 264C. In this manner, the operations for updating the memory patterns, i.e. the learning operations, are carried out.

The operations described above are iterated, and the memory patterns mklij(t−1) are thereby updated with the weights corresponding to the degrees of correlation between various input patterns, which are presented to the first input light valves 262A, 262B, and 262C and the second input light valves 267A, 267B, and 267C, and the memory patterns, which are stored in the storing light valves 264A, 264B, and 264C. In this manner, the self-organizing learning operations are carried out.

An eleventh embodiment of the self-organizing pattern learning system in accordance with the present invention will be described hereinbelow.

Figure 30:
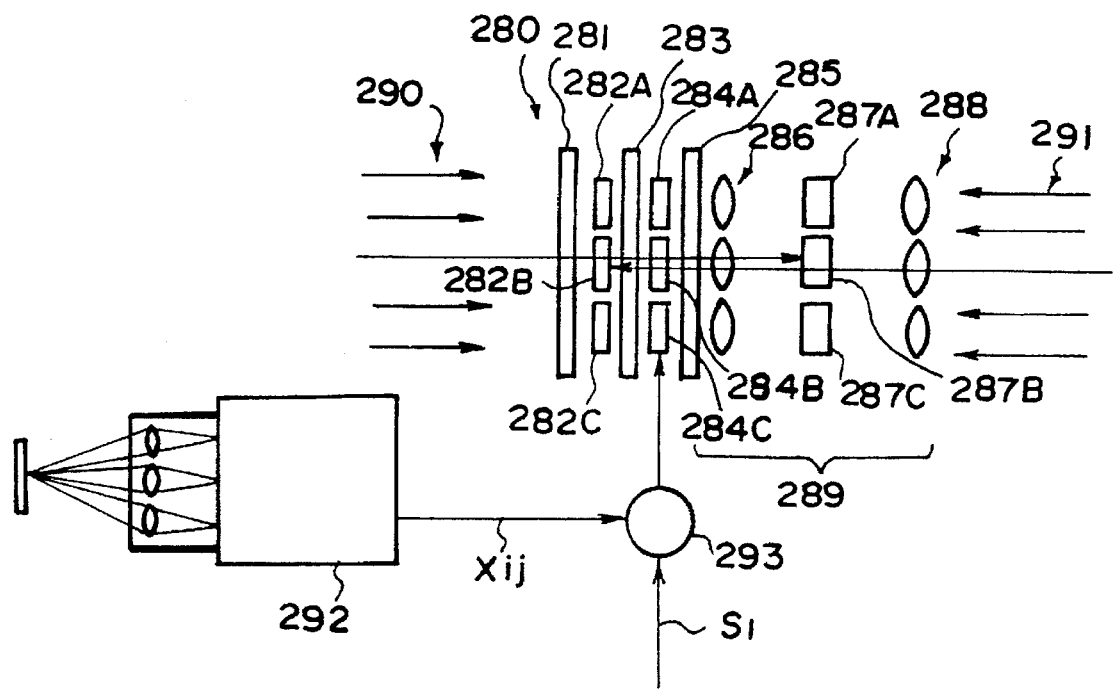
FIG. 30 as a schematic view showing an eleventh embodiment of the self-organizing pattern learning system in accordance with the present invention.

FIG. 30 is a schematic view showing the eleventh embodiment of the self-organizing pattern learning system in accordance with the present invention.

With reference to FIG. 30, the eleventh embodiment of the self-organizing pattern learning system in accordance with the present invention is provided with a correlation information reading means and a memory updating information writing means 289. The correlation information reading means comprises a polarizer 281, which receives and polarizes correlation information reading light 290 having been produced by a light source (not shown). The correlation information reading means also comprises k×1 number (in this embodiment, 3×1 number) of storing light valves 282A, 282B, and 282C, which have i×j number of picture elements and are arrayed at positions adjacent to the polarizer 281. The storing light valves 282A, 282B, and 282C serve as a pattern storing means. The correlation information reading means further comprises a polarizer 283, which is adjacent to the storing light valves 282A, 282B, and 282C. The correlation information reading means still further comprises k×1 number (in this embodiment, 3×1 number) of input light valves 284A, 284B, and 284C, which have i×j number of picture elements and are arrayed at positions adjacent to the polarizer 283 so as to correspond to the storing light valves 282A, 282B, and 282C. The input light valves 284A, 284B, and 284C serve as an input pattern displaying means. The correlation information reading means also comprises a polarizer 285, which is adjacent to the input light valves 284A, 284B, and 284C.

The memory updating information writing means 289 serves as a learning pattern creating means and a memory pattern updating means. The memory updating information writing means 289 comprises k×1 number (in this embodiment, 3×1 number) of correlation degree storing devices 287A, 287B, and 287C, which serve as photo detecting means and are arrayed so as to correspond to the input light valves 284A, 284B, and 284C. The correlation degree storing devices 287A, 287B, and 287C obtain information representing the degrees of correlation between the memory patterns, which are stored in the storing light valves 282A, 282B, and 282C, and an input pattern. The correlation degree storing devices 287A, 287B, and 287C also receive memory updating information writing light 291 having been produced by a light source (not shown) and give the information representing the degrees of correlation to the input light valves 284A, 284B, and 284C. The memory updating information writing means 289 also comprises lens sets 2286 and 288, each of which is constituted of k×1 number (in this embodiment, 3×1 number) of lenses.

In the eleventh embodiment, each of the storing light valves 282A, 282B, and 282C is constituted of a BSO device, in which the information can be written with light having a wavelength distribution falling within the range of 400 to 700 nanometers and cannot be written with light having a wavelength distribution which does not fall within this range. Each of the correlation degree storing devices 287A, 287B, and 287C is constituted of a storing device utilizing GaP, in which the information can be written with light having a wavelength distribution falling within the range of 600 to 900 nanometers and cannot be written with light having a wavelength distribution which does not fall within this range. However, it is only necessary that each of the storing light valves 282A, 282B, and 282C is constituted of an optical recording material, in which the writing/erasing of information can be carried out with light having a certain wavelength distribution, and each of the correlation degree storing devices 287A, 287B, and 287C is constituted of an optical recording material, in which the writing/erasing of information can be carried out with light having a different wavelength distribution. The optical recording materials are not limited to photo refractive crystals and may be selected from other materials, for which the wavelength distributions of light capable of writing or erasing the information are different from each other. In this embodiment, as the correlation information reading light 290, light having a wavelength distribution falling within the range of 700 to 900 nanometers, with which the information cannot be written in the storing light valves 282A, 282B, and 282C and can be written in the correlation degree storing devices 287A, 287B, and 287C, is utilized. Also, as the memory updating information writing light 291, light having a wavelength distribution falling within the range of 400 to 600 nanometers, with which the information can be written in the storing light valves 282A, 282B, and 282C and cannot be written in the correlation degree storing devices 287A, 287B, and 287C, is utilized.

In the eleventh embodiment, an input pattern xij(t) is presented by a multiple image forming camera 292.

First, the input pattern xij(t), which has been recorded by the multiple image forming camera 292, is displayed on each of the input light valves 284A, 284B, and 284C. Thereafter, the correlation information reading light 290 having a wavelength distribution falling within the range of 700 to 900 nanometers is produced by a light source (not shown). The correlation information reading light 290 passes through the polarizer 281 and is then irradiated to the storing light valves 282A, 282B, and 282C. The storing light valves 282A, 282B, and 282C store patterns, which have been presented before the time t, as memory patterns mklij(t−1) in accordance with a certain rule. The correlation information reading light 290, which has been irradiated to the storing light valves 282A, 282B, and 282C, is modulated with each of the memory patterns mklij(t−1), which are stored in each of the storing light valves 282A, 282B, and 282C. The correlation information reading light 290, which has thus been modulated, passes through the polarizer 283 and is then irradiated as an optical intensity pattern to each of the input light valves 284A, 284B, and 284C. As in the embodiments described above, in each of the input light valves 284A, 284B, and 284C, the optical pattern of the correlation information reading light 290, which has passed through each of the storing light valves 282A, 282B, and 282C, is superposed upon the input pattern, which is displayed on each of the input light valves 284A, 284B, and 284C.

Each of the optical superposition patterns thus obtained passes through the polarizer 285 and the lens set 286 and is presented to each of the correlation degree storing devices 287A, 287B, and 287C. In this manner, the sum of the amounts of light carrying each optical superposition pattern is stored by each of the correlation degree storing devices 287A, 287B, and 287C. In each of the correlation degree storing devices 287A, 287B, and 287C, the information about brightness and darkness of the superposition pattern, i.e. the information representing the product sum of the input pattern xij(t) and each of the memory patterns mklij(t−1), is stored as the degree of correlation ykl(t) between the input pattern xij(t) and each of the memory patterns mklij(t−1). Specifically, the result of the product sum calculations represented by the formula $$y_{kl}(t) = \sum_{ij} (x_{ij}(t) \times m_{klij}(t-1)) \quad (4)$$

is stored as the degree of correlation ykl(t) between the input pattern xij(t) and each of the memory patterns mklij(t−1).

In the manner described above, the information representing the degree of correlation is stored in each of the correlation degree storing devices 287A, 287B, and 287C. Thereafter, the memory updating information writing light 291 having a wavelength distribution falling within the range of 400 to 600 nanometers is produced by a light source (not shown). The memory updating information writing light 291 passes through the lens set 288 and is irradiated to each of the correlation degree storing devices 287A, 287B, and 287C. The intensity of the memory updating information writing light 291, which has been irradiated to each of the correlation degree storing devices 287A, 287B, and 287C, is modulated in accordance with the degree of correlation, which is stored in each of the correlation degree storing devices 287A, 287B, and 287C. As described above, the information representing a high degree of correlation is stored in the correlation degree storing device 287A. Also, the information representing the degree of correlation, which is lower than the degree of correlation stored in the correlation degree storing device 287A, is stored in each of the correlation degree storing devices 287B and 287C. Therefore, the memory updating information writing light 291 irradiated to the correlation degree storing device 287A passes through the correlation degree storing device 287A such that the writing light 291 may have approximately the same intensity. The memory updating information writing light 291 irradiated to each of the correlation degree storing devices 287B and 287C is modulated thereby, and the intensity of the writing light 291 decreases.

The memory updating information writing light 291, which has passed through each of the correlation degree storing devices 287A, 287B, and 287C and the intensity of which has thus been modulated, passes through the lens set 286 and the polarizer 285 and is irradiated to each of the input light valves 284A, 284B, and 284C. The writing light 291 is thus modulated in accordance with the input pattern xij(t), which is displayed on each of the input light valves 284A, 284B, and 284C. The writing light 291, which has thus been modulated, passes through the polarizer 283 and is irradiated as an optical intensity pattern to each of the storing light valves 282A, 282B, and 282C. At this time, to the storing light valve, which stores the memory pattern that has a high degree of correlation with the input pattern, the input pattern, which has a high intensity, i.e. which has been weighted strongly, is presented as a learning pattern. Also, to each of the storing light valves, which store the memory patterns that have a low degree of correlation with the input pattern, the input pattern, which has a low intensity, i.e. which has been weighted weakly (or which has not been weighted), is presented as a learning pattern. The writing light 291 has a wavelength distribution falling within the range of 400 to 600 nanometers, and an optical pattern can be written with the writing light 291 in each of the storing light valves 282A, 282B, and 282C. Therefore, the learning pattern, which has been weighted in accordance with the degree of correlation between each of the memory patterns stored in the storing light valves 282A, 282B, and 282C and the input pattern, is written upon each of the memory patterns stored in the storing light valves 282A, 282B, and 282C. In this manner, the operations for updating the memory patterns, i.e. the learning operations, are carried out.

The operations described above are iterated, and the memory patterns mklij(t−1) are thereby updated with the weights corresponding to the degrees of correlation between various input patterns, which are presented to the input light valves 284A, 284B, and 284C, and the memory patterns, which are stored in the storing light valves 282A, 282B, and 282C. In this manner, the self-organizing learning operations are carried out.

In the eleventh embodiment, when the learning operations are iterated, the setting of a switch 293 shown in FIG. 30 may be changed over such that a uniform signal S1 may be fed into the input light valves 284A, 284B, and 284C. When the uniform signal S1 is fed into the input light valves 284A, 284B, and 284C, a uniform pattern is displayed on each of the input light valves 284A, 284B, and 284C. Therefore, the uniform pattern is stored in each of the storing light valves 282A, 282B, and 282C. In cases where patterns, which were stored at the initial stage of the learning operations of the storing light valves 282A, 282B, and 282C, remain faintly, the remaining patterns can be erased by presenting the uniform pattern to each of the storing light valves 282A, 282B, and 282C. In this manner, the patterns stored faintly in the storing light valves 282A, 282B, and 282C can be erased by feeding the uniform signal S1 into the input light valves 284A, 284B, and 284C during the learning operations. Accordingly, it is possible to eliminate the problems in that, when the learning operations are finished, a pattern other than the final memory pattern is superposed upon the final memory pattern in each of the storing light valves 282A, 282B, and 282C.

In the eleventh embodiment, each of the storing light valves 282A, 282B, and 282C is constituted of the BSO device, in which the information can be written with light having a wavelength distribution falling within the range of 400 to 700 nanometers and cannot be written with light having a wavelength distribution which does not fall within this range. Also, each of the correlation degree storing devices 287A, 287B, and 287C is constituted of the storing device utilizing GaP, in which the information can be written with light having a wavelength distribution falling within the range of 600 to 900 nanometers and cannot be written with light having a wavelength distribution which does not fall within this range instead of the different types of photo refractive materials having different writing characteristics with respect to wavelengths being utilized, each storing light valve and each correlation degree storing device may be constituted of the BSO device, and the same operations as those described above may be carried out by utilizing the difference in sensitivity between the front and rear surfaces of the BSO device.

As described in, for example, "Kogaku" (Optics) by Minemoto and Chin, 15 (1986), p. 213, the BSO device has the properties such that it can record an optical pattern with a higher recording sensitivity when the optical pattern is written from the cathode side of the two electrodes of a direct current voltage applied across the two ends than when the optical pattern is written from the anode side. Therefore, the BSO device utilized as the storing light valve is located such that the anode side of the BSO device may stand facing the direction of incidence of the correlation information reading light 290. The BSO device utilized as the correlation degree storing device is located such that the anode side of the BSO device may stand facing the direction of incidence of the memory updating information writing light 291. In this manner, the erasing of the memory information can be reduced when the information representing the degree of correlation is written in the correlation degree storing device. Also, the erasing of the information representing the degree of correlation can be reduced when the memory updating information is written in the storing light valve. Accordingly, even if the optical modulating devices constituted of different materials are not used, various input patterns, which are presented to the input light valves 284A, 284B, and 284C, can be weighted and presented to the storing light valves 282A, 282B, and 282C, and the memory patterns stored in the storing light valves 282A, 282B, and 282C can thereby be updated. In this manner, the self-organizing learning operations can be carried out.

A twelfth embodiment of the self-organizing pattern learning system in accordance with the present invention will be described hereinbelow.

Figure 31:
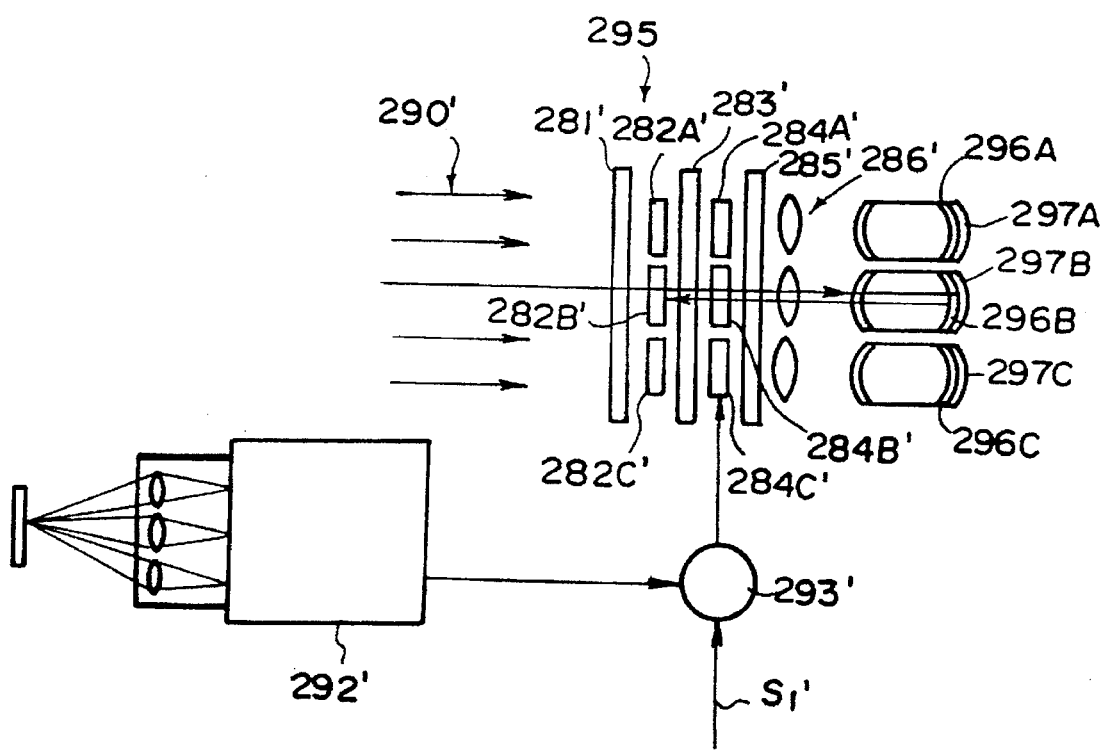
FIG. 31 is a schematic view showing a twelfth embodiment of the self-organizing pattern learning system in accordance with the present invention.

FIG. 31 is a schematic view showing the twelfth embodiment of the self-organizing pattern learning system in accordance with the present invention.

As illustrated in FIG. 31, a self-organizing pattern learning system 295 according to the twelfth embodiment is basically equivalent to the self-organizing pattern learning system 280 according to the eleventh embodiment of FIG. 30, except that, in lieu of the correlation degree storing devices 287A, 287B, and 287C, correlation degree input/output devices 296A, 296B, and 296C are used which convert red light to blue light. The other elements constituting the self-organizing pattern learning system 295 according to the twelfth embodiment are basically equivalent to those constituting the self-organizing pattern learning system 280 according to the eleventh embodiment of FIG. 30, and are therefore numbered with corresponding primed reference numerals in FIG. 31.

The correlation degree input/output devices 296A, 296B, and 296C for carrying out the wavelength conversion will be described hereinbelow.

In this embodiment, each of the correlation degree input/output devices 296A, 296B, and 296C is constituted of a $KNbO_3$ crystal. The two end faces of the $KNbO_3$ crystal are processed such that they may have a radius of curvature of 205 mm. Also, the two end faces are respectively provided with a coating film having a reflectivity of 97% and a coating film having a reflectivity of 99.9% such that the $KNbO_3$ crystal may serve as a standing-wave type of resonator. Non-critical phase matching (NCPM) can be achieved by adjusting the temperature of the $KNbO_3$ crystal at −23° C. With the $KNbO_3$ crystal constituted as the standing-wave type of resonator, the second harmonic of a fundamental wave is radiated out in two directions. Experiments revealed that, in cases where the output power of a light source for producing the fundamental wave is 167 mW, an output power of as high as 24 mW can be obtained per direction. The experiments are described in, for example, "Hacho Hentan eno Oyo" (Application to Wavelength Conversion) by Kondo, et al., Optronics, (1990) No. 2, pp. 132–139. In the experiments carried out by Kondo, et al., wavelength conversion is achieved with a high efficiency by sweeping the wavelength of a laser beam radiated out of a laser and synchronizing with the resonator mode. With the $KNbO_3$ crystal, light having a wavelength of 842 nm is converted into light having a wavelength of 421 nm.

How the self-organizing learning operations are carried out in this embodiment will be described hereinbelow.

First, the input pattern xij(t), which has been recorded by the multiple image forming camera 292', is displayed on each of the input light valves 284A', 284B', and 284C'. Thereafter, reading light 290', which is red light having a wavelength of 842 nm, is produced by a light source (not shown). The reading light 290' passes through the polarizer 281' and is then irradiated to the storing light valves 282A', 282B', and 282C'. The storing light valves 282A', 282B', and 282C' store patterns, which have been presented before the time t, as memory patterns mklij(t−1) in accordance with a certain rule. The reading light 290', which has been irradiated to the storing light valves 282A', 282B', and 282C', is modulated with each of the memory patterns mklij(t−1), which are stored in each of the storing light valves 282A', 282B', and 282C'. The reading light 290', which has thus been modulated, passes through the polarizer 283' and is then irradiated as an optical intensity pattern to each of the input light valves 284A', 284B', and 284C'. As in the embodiments described above, in each of the input light valves 284A', 284B', and 284C', the optical pattern of the reading light 290', which has passed through each of the storing light valves 282A', 282B', and 282C', is superposed upon the input pattern, which is displayed on each of the input light valves 284A', 284B', and 284C'.

Each of the optical superposition patterns thus obtained passes through the polarizer 285' and the lens set 286' and is presented to each of the correlation degree input/output devices 296A, 296B, and 296C. In this manner, the sum of the amounts of light carrying each optical superposition pattern is presented as the degree of correlation to each of the correlation degree input/output devices 296A, 296B, and 296C. To each of the correlation degree input/output devices 296A, 296B, and 296C, the information about brightness and darkness of the superposition pattern, i.e. the information representing the product sum of the input pattern xij(t) and each of the memory patterns mklij(t−1), is presented as the degree of correlation ykl(t) between the input pattern xij(t) and each of the memory patterns mklij(t−1). Specifically, the result of the product sum calculations represented by the formula $$y_{kl}(t) = \sum_{ij} (x_{ij}(t) \times m_{klij}(t-1)) \quad (4)$$

is presented as the degree of correlation ykl(t) between the input pattern xij(t) and each of the memory patterns mklij (t−1). The light having a wavelength of 842 nm, which carries the information representing the degree of correlation and has been irradiated to each of the correlation degree input/output devices 296A, 296B, and 296C, is converted into light having a wavelength of 421 nm. The wavelength-converted light having a wavelength of 421 nm returns through the lens set 286' and the polarizer 285' to each of the input light valves 284A', 284B', and 284C'.

The wavelength-converted light having a wavelength of 421 nm, which carries the information representing the degree of correlation and has been returned to each of the input light valves 284A', 284B', and 284C', is modulated in accordance with the input pattern xij(t), which is displayed on each of the input light valves 284A', 284B', and 284C'. The wavelength-converted light having a wavelength of 421 nm, which has thus been modulated, passes through the polarizer 283' and is irradiated as an optical intensity pattern to each of the storing light valves 282A', 282B', and 282C'. At this time, to the storing light valve, which stores the memory pattern that has a high degree of correlation with the input pattern, the input pattern, which has a high intensity, i.e. which has been weighted strongly, is presented as a learning pattern. Also, to each of the storing light valves, which store the memory patterns that have a low degree of correlation with the input pattern, the input pattern, which has a low intensity, i.e. which has been weighted weakly (or which has not been weighted), is presented as a learning pattern. With the wavelength-converted light having a wavelength of 421 nm, which carries the information representing the degree of correlation, an optical pattern can be written in each of the storing light valves 282A', 282B', and 282C'. Therefore, the learning pattern, which has been weighted in accordance with the degree of correlation between each of the memory patterns stored in the storing light valves 282A', 282B', and 282C' and the input pattern, is written upon each of the memory patterns stored in the storing light valves 282A', 282B', and 282C'. In this manner, the operations for updating the memory patterns, i.e. the learning operations, are carried out.

The operations described above are iterated, and the memory patterns mklij(t−1) are thereby updated with the weights corresponding to the degrees of correlation between various input patterns, which are presented to the input light valves 284A', 284B', and 284C', and the memory patterns, which are stored in the storing light valves 282A', 282B', and 282C'. In this manner, the self-organizing learning operations are carried out.

A thirteenth embodiment of the self-organizing pattern learning system in accordance with the present invention will be described hereinbelow.

Figure 32:
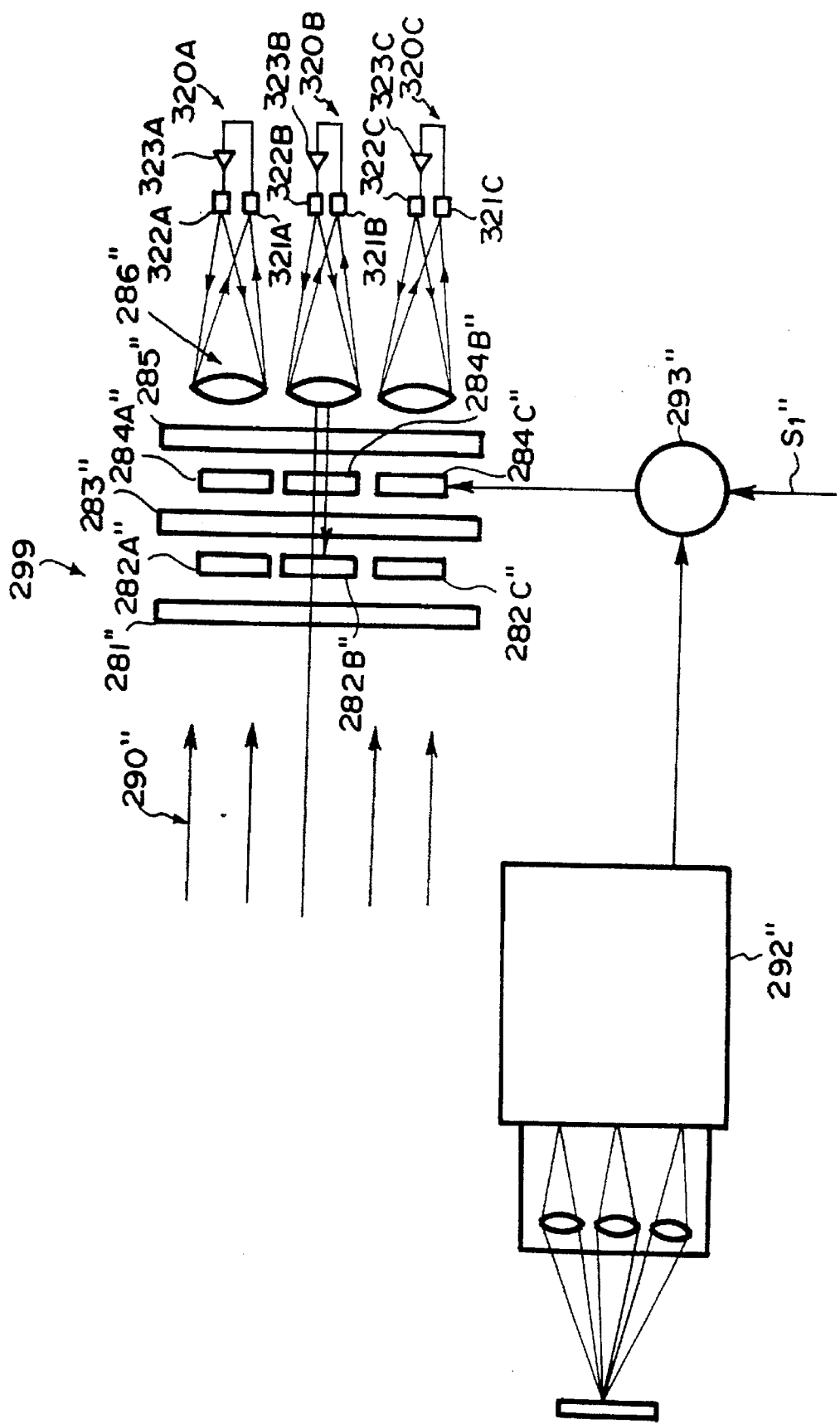
FIG. 32 is a schematic view showing a thirteenth embodiment of the self-organizing pattern learning system in accordance with the present invention.

FIG. 32 is a schematic view showing the thirteenth embodiment of the self-organizing pattern learning system in accordance with the present invention.

As illustrated in FIG. 32, a self-organizing pattern learning system 299 according to the thirteenth embodiment is basically equivalent to the self-organizing pattern learning system 295 according to the twelfth embodiment of FIG. 31, except that, in lieu of the correlation degree input/output devices 296A, 296B, and 296C, optical operation devices 320A, 320B, and 320C are used which receive red light and radiate out blue light in accordance with the intensity of the red light. The other elements constituting the self-organizing pattern learning system 299 according to the thirteenth embodiment are basically equivalent to those constituting the self-organizing pattern learning systems according to the eleventh and twelfth embodiments of FIGS. 30 and 31, and are therefore numbered with corresponding double primed reference numerals in FIG. 32.

How the optical operation devices 320A, 320B, and 320C are constructed and can work will be described hereinbelow. The structures and functions of the optical operation devices 320A, 320B, and 320C are equivalent to one another, and therefore only the structure and the functions of the optical operation device 320A will be described hereinbelow.

The optical operation device 320A comprises a light receiving device 321A which receives red light, a light emitting device 322A which emits blue light and may be constituted of an LED, or the like, and an operation device 323A which controls the intensity of the blue light in accordance with the intensity of the red light.

In the thirteenth embodiment wherein the optical operation devices 320A, 320B, and 320C having the structures described above are utilized, the light, which carries the information representing the degree of correlation and has passed through a polarizer 285" and a lens set 286" in the same manner as that in the aforesaid twelfth embodiment, is received by each of the light receiving devices 321A, 321B, and 321C of the optical operation devices 320A, 320B, and 320C. Each of the light emitting devices 322A, 322B, and 322C emits blue light having a wavelength of 421 nm in accordance with the intensity of the received light, i.e. in accordance with the degree of correlation. The blue light returns through the lens set 286" and the polarizer 285" to each of input light valves 284A", 284B", and 284C". The self-organizing learning operations are carried in the same manner as that in the aforesaid twelfth embodiment.

In the thirteenth embodiment described above, the light emitting devices 322A, 322B, and 322C which emit blue light are used. Alternatively, in lieu of the light emitting devices 322A, 322B, and 322C, optical modulating devices may be employed. The optical modulating devices may be modulated in accordance with the degrees of correlation. Blue light may then be irradiated from an external light source to the optical modulating devices and modulated by the optical modulating devices. The blue light, which has thus been modulated, may be irradiated to the input light valves 284A", 284B", and 284C".

Figure 33:
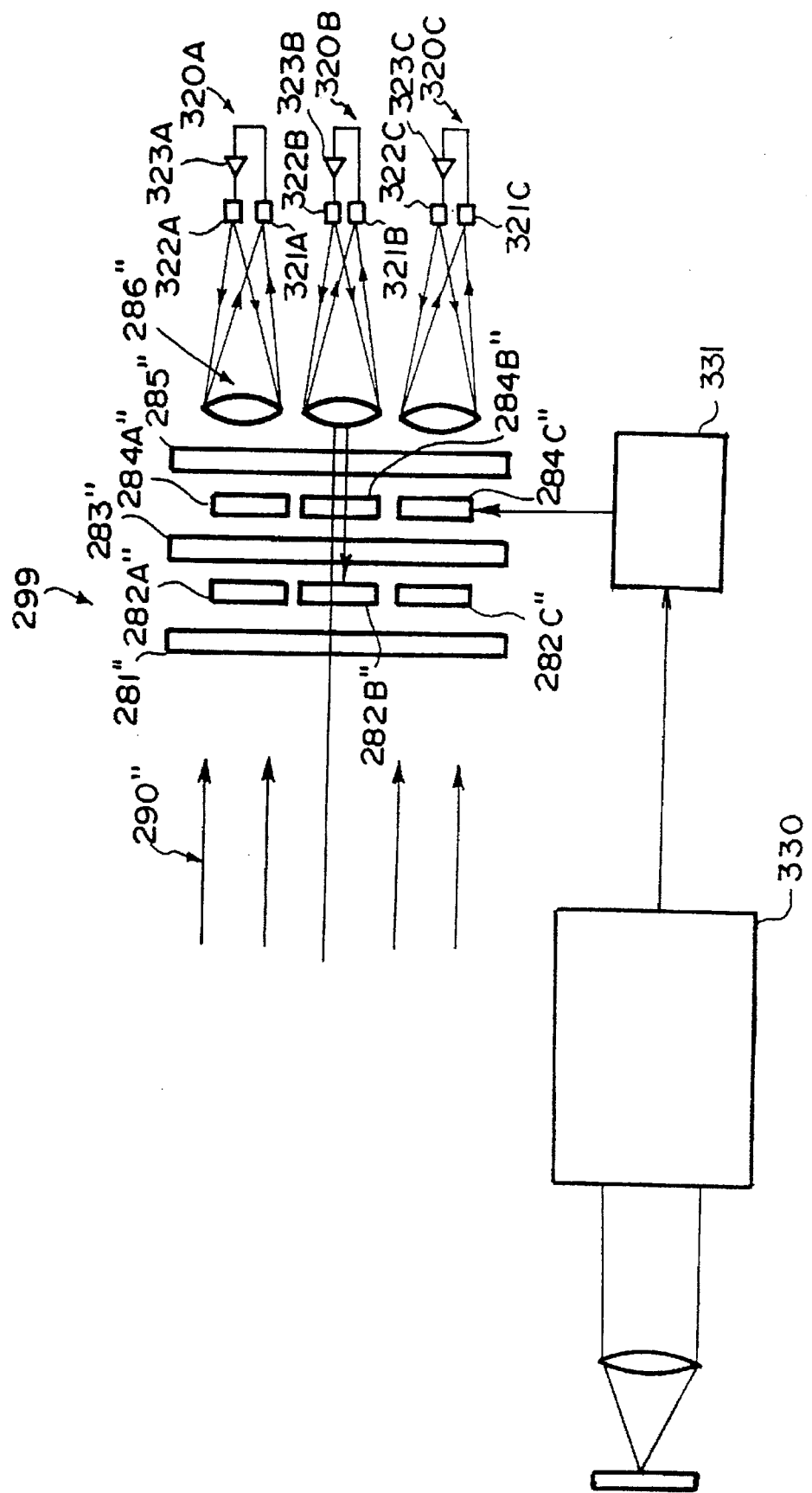
FIG. 33 is a schematic view showing a modification of the thirteenth embodiment of the self-organizing pattern learning system in accordance with the present invention, wherein multiple patterns are electrically formed from a single input pattern.

In the eleventh, twelfth, and thirteenth embodiments described above, the input pattern xij(t) is presented by each of the multiple image forming cameras 292, 292', and 292". Alternatively, for example, as illustrated in FIG. 33, the input pattern may be recorded by a single lens camera 330, and multiple patterns may be formed from the single input pattern by an input image multi-pattern buffer 331. Each of the multiple patterns thus formed may be presented as the input pattern to each of the input light valves 284A", 284B", and 284C".

Also, each of the embodiments described above may be provided with a memory pattern erasing means, which erases all or some of the memory patterns stored in the pattern storing means of the optical pattern correlation degree detecting means.

Figure 36:
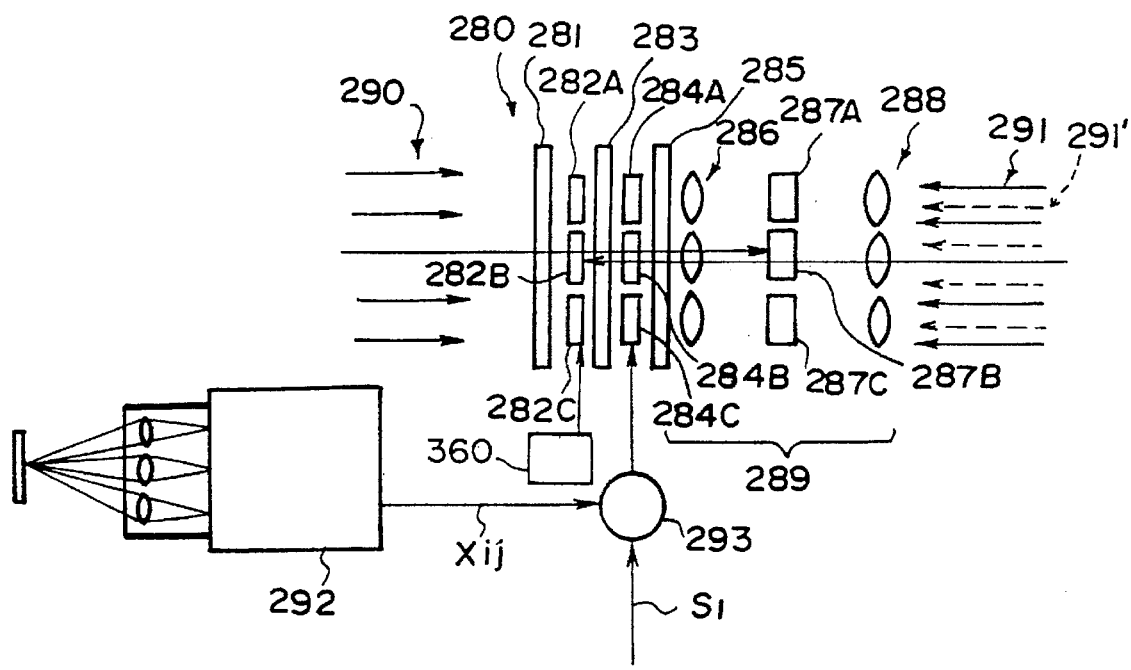
FIG. 36 is a schematic view showing a modification of the eleventh embodiment of the self-organizing pattern learning system in accordance with the present invention, which is provided with a pattern erasing means.

Specifically, as illustrated in FIG. 34, memory patterns, which are stored in optical modulating devices 340A, 340B, and 340C of a pattern storing means 340, may be erased by an erasing signal generated by an erasing means 341. For example, as illustrated in FIG. 35, the self-organizing pattern learning system shown in FIG. 4 may be provided with an erasing signal generating circuit 350, which feeds an erasing signal E into the storing/displaying light valves 14A, 14B, and 14C. Also, as illustrated in FIG. 36, the self-organizing pattern learning system shown in FIG. 30 may be provided with a means for irradiating erasing light 291', which is capable of erasing the memory patterns stored in the storing light valves 282A, 282B, and 282C, to the storing light valves 282A, 282B, and 282C. Alternatively, as illustrated in FIG. 36, the self-organizing pattern learning system shown in FIG. 30 may be provided with a voltage modulating means 360, which modulates the voltage applied across the storing light valves 282A, 282B, and 282C and thereby erases the memory patterns stored in the storing light valves 282A, 282B, and 282C.

In the manner described above, a memory pattern erasing means may be used in order to erase all or some of the memory patterns stored in the pattern storing means. In such cases, as in the fourth embodiment of FIG. 12 and the sixth embodiment of FIG. 21, memory patterns, which were stored at the initial stage of the learning operations and remain faintly in the pattern storing means, can be erased. Therefore, it is possible to eliminate the problems in that, when the learning operations are finished, a pattern other than the final memory pattern is superposed upon the final memory pattern in the pattern storing means.

In the fourth through eighth embodiments and in the eleventh, twelfth, and thirteenth embodiments described above, the BSO device is employed as each storing/displaying light valve or each storing light valve. In lieu of the BSO device, any of other storing light valves may be employed, in which the information can be written with light having a predetermined wavelength distribution and cannot be written with light having a wavelength distribution different from the predetermined wavelength distribution.

In the first to thirteenth embodiments described above, three storing light valves, three optical input devices, and three correlation detecting devices are respectively located in one direction. Alternatively, any number of respective devices may be utilized, and the respective devices may be arrayed in two directions.

What is claimed is:

1. A self-organizing pattern learning system for learning a plurality of different patterns, comprising:

i) an optical pattern correlation degree detecting means, which comprises:
   a pattern storing means for storing a plurality of memory patterns;
   an input pattern displaying means for displaying a presented input pattern; and
   a photo detecting means,
  wherein at least two of said input pattern displaying means, said pattern storing means, and said photo detecting means are located at positions adjacent to each other, and
  wherein said photo detecting means optically detects a degree of pattern correlation between the input pattern displayed on said input pattern displaying means and each of said plurality of memory patterns stored in said pattern storing means, ii) a learning pattern creating means for creating a plurality of learning patterns as a product of said degree of pattern correlation and said input pattern, wherein said product is weighted by said memory patterns and iii) a memory pattern updating means for updating the memory patterns with said learning patterns.

2. A self-organizing pattern learning system as defined in claim 1 wherein said input pattern displaying means, said pattern storing means, and said photo detecting means are located in this order in said optical pattern correlation degree detecting means.

3. A self-organizing pattern learning system as defined in claim 2 wherein the pattern is transferred as intensity pattern light from said input pattern displaying means to said pattern storing means.

4. A self-organizing pattern learning system as defined in claim 2 wherein the pattern is transferred as polarized pattern light from said input pattern displaying means to said pattern storing means.

5. A self-organizing pattern learning system as defined in claim 2, 3, or 4 wherein said input pattern displaying means comprises an illumination means and optical modulating devices, wherein each modulating device modulates light which is produced by said illumination means and thereby produces input pattern light.

6. A self-organizing pattern learning system as defined in claim 2 or 3 wherein said input pattern displaying means comprises a plurality of light emitting devices, each device thereof producing input pattern light.

7. A self-organizing pattern learning system as defined in claim 1 wherein said pattern storing means, said input pattern displaying means, and said photo detecting means are located in this order in said optical pattern correlation degree detecting means.

8. A self-organizing pattern learning system as defined in claim 7 wherein each of the patterns is transferred as intensity pattern light from said pattern storing means to said input pattern displaying means.

9. A self-organizing pattern learning system as defined in claim 7 wherein each of the patterns is transferred as polarized pattern light from said pattern storing means to said input pattern displaying means.

10. A self-organizing pattern learning system as defined in claim 7, 8, or 9 wherein said pattern storing means comprises an illumination means and optical pattern modulating devices, wherein each modulating device modulates light which is produced by said illumination means and thereby produces an optical pattern.

11. A self-organizing pattern learning system as defined in claim 7, 8, or 9 wherein said pattern storing means comprises a plurality of optical pattern emitting devices, each device thereof producing an optical pattern.

12. A self-organizing pattern learning system as defined in claim 1 wherein said learning pattern creating means comprises:
   a) a learning pattern operation means for creating said learning patterns by weighing said input pattern with said degree of pattern correlation and
   b) a learning pattern displaying means for displaying the learning patterns that are created by said learning pattern operation means.

13. A self-organizing pattern learning system as defined in claim 12 wherein said learning pattern displaying means comprises an illumination means and a plurality of optical modulating devices, wherein each modulating device modulates light which is produced by said illumination means and thereby produces one of the learning patterns.

14. A self-organizing pattern learning system as defined in claim 12 wherein said learning pattern displaying means comprises a plurality of light emitting devices, each device thereof radiating one of the learning patterns.

15. A self-organizing pattern learning system as defined in claim 1 wherein said learning pattern creating means comprises:
   a) a correlation degree light output means for radiating a correlation degree light group by weighting said input pattern with said degree of pattern correlation and
   b) a learning pattern displaying means for modulating each correlation degree light of the correlation degree light group into pattern light.

16. A self-organizing pattern learning system as defined in claim 15, wherein said correlation degree light output means comprises an illumination means and a plurality of optical modulating devices, each optical modulating device thereof modulating light which is produced by said illumination means and thereby radiating each correlation degree light of the correlation degree light group.

17. A self-organizing pattern learning system as defined in claim 16 wherein said photo detecting means, comprises a plurality of correlation degree detecting devices, and each of said optical modulating devices is located at a position adjacent to and corresponding to each of said correlation degree detecting devices.

18. A self-organizing pattern learning system as defined in claim 16 wherein said correlation degree light output means is a photo detecting output means, which also serves as said optical pattern correlation degree detecting means.

19. A self-organizing pattern learning system defined in claim 15 wherein said correlation degree light output means comprises a plurality of light emitting devices, each device thereof radiating a respective correlation degree light of said correlation degree light group.

20. A self-organizing pattern learning system as defined in claim 19 wherein said photo detecting means comprises a plurality of correlation degree detecting devices, and each of said light emitting devices is located at a position adjacent to and corresponding to each of said correlation degree detecting devices.

21. A self-organizing pattern learning system as defined in claim 19 wherein said correlation degree light output means is a photo detecting output means, which also serves as said optical pattern correlation degree detecting means.

22. A self-organizing pattern learning system as defined in claim 15 wherein said correlation degree light output means is a photo detecting output means, which also serves as said optical pattern correlation degree detecting means.

23. A self-organizing pattern learning system as defined in claim 15 wherein the input pattern displayed on said learning pattern displaying means is created by an electric operation means.

24. A self-organizing pattern learning system as defined in claim 23 wherein the input pattern created by said electric operation means is written by an electric means into said learning pattern displaying means, and is thereby displayed on said input pattern displaying means.

25. A self-organizing pattern learning system as defined in claim 23 wherein the input pattern created by said electric operation means is written by an optical means into said learning pattern displaying means, and is thereby displayed on said input pattern displaying means.

26. A self-organizing pattern learning system as defined in claim 15 wherein the input pattern displayed on said learning pattern displaying means is created by an optical means.

27. A self-organizing pattern learning system as defined in claim 24 wherein the input pattern created by said optical means is written by an electric means into said learning pattern displaying means and is thereby displayed on said input pattern displaying means.

28. A self-organizing pattern learning system as defined in claim 26 wherein the input pattern created by said optical means is written by an optical means into said learning pattern displaying means and is thereby displayed on said input pattern displaying means.

29. A self-organizing pattern learning system as defined in any of claims 15 through 28 wherein each of the degrees of pattern correlation which is represented by the correlation degree light group is radiated from said correlation degree light output means and is transferred as an optical intensity.

30. A self-organizing pattern learning system as defined in any of claims 15 through 28 wherein each of the degrees of pattern correlation which is represented by the correlation degree light group is radiated from said correlation degree light output means and is transferred as a state of polarization of light.

31. A self-organizing pattern learning system as defined in claim 15 wherein said input pattern displaying means also serves as said learning pattern displaying means.

32. A self-organizing pattern learning system as defined in claim 1 wherein said learning pattern creating means comprises:
   a) an input pattern output means for radiating out input pattern light and
   b) a correlation degree light modulating means for modulating the input pattern light.

33. A self-organizing pattern learning system as defined in claim 32 wherein said input pattern output means comprises pattern display devices, and the input pattern displayed on each of said pattern display devices is created by an electric operation means.

34. A self-organizing pattern learning system as defined in claim 33 wherein the input pattern is written by an electric means into each of said pattern display devices to allow for a display on each of said pattern display devices.

35. A self-organizing pattern learning system as defined in claim 33 wherein the input pattern is written by an optical means into each of said pattern display devices and is thereby to allow for a display on each of said pattern display devices.

36. A self-organizing pattern learning system as defined in claim 32 wherein said input pattern output means comprises pattern display devices, and the input pattern displayed on each of said pattern display devices is created by an optical means.

37. A self-organizing pattern learning system as defined in claim 34 wherein the input pattern is written by an electric means into each of said pattern display devices to allow for a display on each of said pattern display devices.

38. A self-organizing pattern learning system as defined in claim 36 wherein the input pattern is written by an optical means into each of said pattern display devices to allow for a display on each of said pattern display devices.

39. A self-organizing pattern learning system as defined in claim 32 wherein said input pattern output means comprises pattern display devices into which the input pattern is capable of being written electrically, and the input pattern is written by an electric means into each of said pattern display devices and is thereby displayed on each of said pattern display devices.

40. A self-organizing pattern learning system as defined in claim 32 wherein the input pattern is written by an optical means into each of said pattern display devices to allow for a display on each of said pattern display devices.

41. A self-organizing pattern learning system as defined in any one of claims 32 through 40 wherein said input pattern output means comprises an illumination means and a plurality of optical modulating devices for modulating light which is produced by said illumination means and thereby radiating out the input pattern light.

42. A self-organizing pattern learning system as defined in any one of claims 32 through 40 wherein said input pattern output means comprises light emitting devices for radiating the input pattern light.

43. A self-organizing pattern learning system as defined in any of claims 32 through 38 wherein said input pattern displaying means also serves as said input pattern output means.

44. A self-organizing pattern learning system as defined in any of claims 32 through 38 wherein said input pattern output means is located at a position adjacent to said correlation degree light modulating means.

45. A self-organizing pattern learning system as defined in claim 1 wherein said memory pattern updating means updates the memory patterns optically.

46. A self-organizing pattern learning system as defined in claim 45 wherein first and second lights having different wavelength distributions depending upon optical characteristics of said pattern storing means are utilized respectively, wherein said first light is detected by said photo detecting means and said second light updates the memory patterns.

47. A self-organizing pattern learning system as defined in claim 1 wherein said memory pattern updating means electrically updates the memory patterns, which are stored in said pattern storing means.

48. A self-organizing pattern learning system as defined in claim 1 further comprises a memory pattern erasing means for erasing a plurality of the memory patterns which are stored in said pattern storing means.

49. A self-organizing pattern learning system as defined in claim 48 wherein said memory pattern erasing means is an electric means.

50. A self-organizing pattern learning system as defined in claim 48 wherein said memory pattern erasing means comprises a combination of an electric means and an optical means.

51. A self-organizing pattern learning system as defined in claim 1 wherein said memory pattern updating means comprises of said pattern storing means.

* * * * *